US012265209B2

(12) United States Patent
Pandit et al.

(10) Patent No.: US 12,265,209 B2
(45) Date of Patent: Apr. 1, 2025

(54) SMARTPHONE AND/OR OTHER DEVICES WITH HIGH RESOLUTION MICROSCOPIC FEATURES

(71) Applicant: SCOPGENX PRIVATE LIMITED, Ahmedabad (IN)

(72) Inventors: Aniruddha Bhalchandra Pandit, Mumbai (IN); Jayeshkumar Sevantilal Mevada, Gujarat (IN)

(73) Assignee: SCOPGENX PRIVATE LIMITED, Gujarat Ahmedabad (IN)

( * ) Notice: Subject to any disclaimer, the term of this patent is extended or adjusted under 35 U.S.C. 154(b) by 102 days.

(21) Appl. No.: 18/001,579

(22) PCT Filed: Jun. 11, 2021

(86) PCT No.: PCT/IN2021/050570
§ 371 (c)(1),
(2) Date: Dec. 12, 2022

(87) PCT Pub. No.: WO2021/250704
PCT Pub. Date: Dec. 16, 2021

(65) Prior Publication Data
US 2023/0236399 A1 Jul. 27, 2023

(30) Foreign Application Priority Data
Jul. 12, 2020 (IN) .............................. 202021010568

(51) Int. Cl.
*G02B 21/00* (2006.01)
*G02B 13/00* (2006.01)
(Continued)

(52) U.S. Cl.
CPC ..... *G02B 21/0008* (2013.01); *G02B 13/0045* (2013.01); *G02B 21/06* (2013.01); *G02B 21/361* (2013.01)

(58) Field of Classification Search
CPC ....................... G02B 21/0008; G02B 13/0045; G02B 21/06; G02B 21/361; G02B 9/64; G02B 21/02
(Continued)

(56) References Cited

U.S. PATENT DOCUMENTS

2014/0146396 A1* 5/2014 Wu .................. G02B 21/082
359/656
2016/0209635 A1 7/2016 Yan
(Continued)

FOREIGN PATENT DOCUMENTS

CN 110376716 A 10/2019
WO WO-2006083081 A1 8/2006
(Continued)

OTHER PUBLICATIONS

"International Application No. PCT/IN2021/050570, Communication re Publication of Request Under Rule 26bis 2(e) dated Dec. 30, 2021", (Apr. 5, 2022), 3 pgs.
(Continued)

*Primary Examiner* — Thai Q Tran
*Assistant Examiner* — Stephen R Smith
(74) *Attorney, Agent, or Firm* — Schwegman Lundberg & Woessner, P.A.

(57) ABSTRACT

The present subject matter described an optical microscopy device (2) for a portable imaging system, such as a smartphone. The optical microscopy device (2) comprises an optical lens assembly with ten to sixteen lens elements. The optical lens assembly has an optical magnification in a range of about 1× to about 3×, an airy radius in a range of about 3.2 micron to about 15 micron, a depth of field in a range of about 28 micron to about 133 micron, a numerical aperture in a range of about 0.025 to about 0.176, a half field of view
(Continued)

in a range of about 10 degrees to about 39 degrees, and a length in a range of about 6.8 millimeter (mm) to about 18 mm.

18 Claims, 37 Drawing Sheets

(51) Int. Cl.
*G02B 21/06* (2006.01)
*G02B 21/36* (2006.01)

(58) Field of Classification Search
USPC .................................. 348/79; 359/656, 802
See application file for complete search history.

(56) References Cited

U.S. PATENT DOCUMENTS

| | | |
|---|---|---|
| 2016/0282593 A1 | 9/2016 | Yan |
| 2017/0160534 A1* | 6/2017 | Fan ...................... G02B 21/361 |
| 2018/0210173 A1* | 7/2018 | Blahnik ................. H04N 23/57 |
| 2018/0246306 A1* | 8/2018 | Lundin .................. G02B 21/26 |
| 2022/0244492 A1* | 8/2022 | Hosono ..................... G02B 9/62 |
| 2022/0269046 A1* | 8/2022 | Zeng ...................... G02B 13/24 |
| 2022/0317411 A1* | 10/2022 | Wu ......................... G03B 30/00 |
| 2023/0074379 A1* | 3/2023 | Chiang ................ G02B 13/004 |

FOREIGN PATENT DOCUMENTS

| | | |
|---|---|---|
| WO | WO-2021007930 A1 | 1/2021 |
| WO | WO-2021250704 A1 | 12/2021 |

OTHER PUBLICATIONS

"International Application No. PCT/IN2021/050570, International Search Report and Written Opinion mailed Sep. 21, 2021", (Sep. 21, 2021), 13 pgs.

Kheireddine, Sara, et al., "Dual-phone illumination-imaging system for high resolution and large field of view multi-modal microscopy", Lab Chip, 2019, 19, 825-836, (Jan. 30, 2019), 825-836.

* cited by examiner

SMARTPHONE AND/OR OTHER DEVICES WITH HIGH RESOLUTION MICROSCOPIC FEATURES

PRIORITY CLAIM TO RELATED APPLICATIONS

This application is a U.S. national stage filing under 35 U.S.C. § 371 from International Application No. PCT/IN2021/050570, filed on 11 Jun. 2021, and published as WO2021/250704 on 16 Dec. 2021, which claims the benefit under 35 U.S.C. 119 to India application No. 202021010568, filed on 12 Jun. 2020, the benefit of priority of each of which is claimed herein, and which applications and publication are hereby incorporated herein by reference in their entirety.

TECHNICAL FIELD

The present subject matter relates to inbuilt optical microscopy devices for smartphones and other portable imaging systems or devices. More specifically, the present subject matter relates to smartphones or other portable imaging systems or devices with integrated microscopy features with a variable resolution and a wide field of view. The said optical microscopy devices, smartphones, and portable imaging systems can be used for the quantitative and qualitative analysis of micron size objects.

BACKGROUND

The smartphone and other portable computing devices can be considered as the pinnacle of consumer technology of the modern Information Age. A standard smartphone is a portable computer with a digital camera, a high-resolution display, a range of remote sensors, an audio-visual interfacing, and an internet access and interconnectivity. This is all combined in an accessible package with constantly evolving software and associated applications.

Microscopes are generally used to view objects that are too small to be seen by the unaided eye. Optical microscopes use visible light and an assembly of optical lenses to magnify images of small objects. Optical microscopes are used in observing small structures, determining pathology, and diagnosing diseases. The conventional portable microscopy assemblies are available in the form of external optical attachments to the smartphones or other portable computing devices. But it has several limitations. The external optical attachments for the microscopy functionality have limitations as they have limited field of view, are bulky, are not compatible for all digital device, and are not user-friendly for focusing and microscopy. The microscopy performance of the conventional optical attachments varies with respect to different models of smartphones with different quality of cameras. The external optical attachments for smartphones are not user-friendly because the location of the camera varies across smartphones.

Furthermore, most of the external optical attachments for smartphones have a fixed optical system; hence, it has limitation for focusing of objects of variable sizes on the same plane. The external optical attachment for the microscopic functionality makes it inaccessible to users for qualitative & quantitative estimation of objects.

Furthermore, some of the objects has ability to emit light rays of specific wavelengths that are characteristic of the respective objects and are therefore useful for qualitative and quantitative analysis of such objects. This said characteristic feature of light is useful in the diagnosis of many pathological samples, for example, a biomarker-dye complex. Most of the external optical attachments for portable microscopy are not affordable.

Further, conventional optical attachments have a limited resolution for the observing of the micron size of object and the two or three correction lenses. Such attachments are not able to fulfill the high-quality image capturing of objects of micron size.

Therefore, to overcome the problems/limitations said in the prior art, there is a need to develop optical microscopy devices for enabling the inbuilt microscopy feature in smartphones and other portable imaging systems. In addition to the inbuilt microscopy feature, the features of variable imaging resolution, variable depth of field, variable optical magnification, and wide field of view, but without optical and spherical aberrations are also desirable to be enabled. Furthermore, the inbuilt microscopy feature with the variable optical magnification, and the variable depth of field facilitate in increasing the flexibility to view a wide range of objects using the smartphones and the portable imaging systems. The smartphones and other portable imaging systems with the integrated microscopy feature makes them accessible to users, such as researchers, pupils, and professionals for education purposes, onsite diagnosis, and in qualitative and quantitative analysis of objects.

OBJECTS OF THE PRESENT SUBJECT MATTER

The principal object of the present subject matter is to overcome all the mentioned and existed drawbacks of the prior arts by providing inbuilt microscopy to smartphones and other portable imaging systems or devices.

The main objective of the present subject matter is to provide smartphones or other portable imaging systems or devices with inbuilt high-resolution and wide field of view microscopy features without any external attachment.

Another object of the present subject matter is to provide smartphones or other portable imaging systems or devices with integrated high-resolution microscopic features with self or controlled focusing ability for imaging objects of variable sizes.

Another objective of the present subject matter is to provide smartphones or other portable imaging systems or devices with inbuilt high-resolution and wide field of view microscopy features without any aberrations.

Another objective of present subject matter is to provide a smartphone or other portable imaging systems or devices with integrated microscopy features for automated qualitative and quantitative estimation of any object that is not visible to the naked eye.

BRIEF DESCRIPTION OF THE DRAWINGS

The foregoing summary, as well as the following detailed description of the present subject matter, is better understood when read in conjunction with the appended drawings. For the purpose of illustrating the present subject matter, exemplary constructions of the present subject matter are shown in the drawings. However, the present subject matter is not limited to the specific process and structures disclosed herein. The description of a process step or a structure referenced by a numeral in a drawing is applicable to the description of that method step or structure shown by that same numeral in any subsequent drawing herein.

DETAILED DESCRIPTION

Figure 1A:
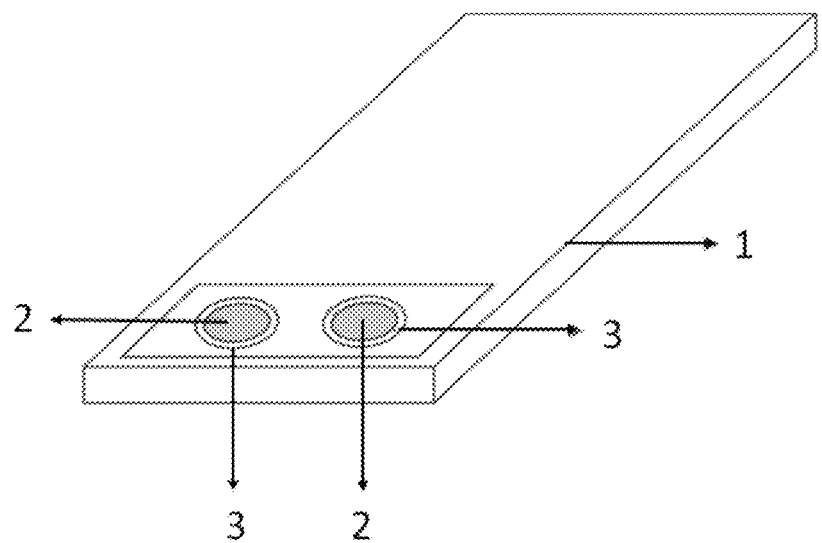
FIGS. 1a and 1b show portable imaging systems with two optical microscopy devices, in accordance with the present subject matter.

Detailed embodiments of the present subject matter are disclosed herein, however, it is to be understood that the disclosed embodiments are merely exemplary of the present subject matter, which may be embodied in various forms. Therefore, specific functional and structural details disclosed herein are not to be interpreted as limiting, but merely as a basis for the claims and as a representative basis for teaching one skilled in the art to variously employ the present subject matter in virtually any appropriately detailed structure.

The present subject matter overcomes the aforesaid drawbacks of conventional devices. The objects, features, and advantages of the present subject matter will now be described in greater detail. Also, the following description includes various specific details and is to be regarded as merely exemplary. Accordingly, those of ordinary skill in the art will recognize that: without departing from the scope and spirit of the present disclosure and its various embodiments there may be any number of changes and modifications described herein.

It must also be noted that as used herein and in the appended claims, the singular forms "a", "an," and "the" include plural references unless the context clearly dictates otherwise. Although any systems and methods similar or equivalent to those described herein can be used in the practice or testing of embodiments of the present subject matter, the preferred, systems are now described.

Unless defined otherwise, all technical and scientific terms used herein have the same meaning as commonly understood by one of ordinary skill in the art to which the present subject matter belongs.

The word "system" and "device" may be used interchangeably through the disclosure.

In addition to the features and components described herein, the systems or the devices may include one or more other components, such as a process, a memory, an interface, a display screen, an image capturing unit, a graphical user interface.

Throughout the disclosure, term 'assembly' or 'smartphone' or 'smartphone with integrated microscopy features' used herein refers to an instrument that contain a built-in camera lens assembly, a camera, and a display screen to produce a simple microscope platform; a digital image capturing assembly; or a device for qualitative or quantitative estimation. The terms 'assembly', 'smartphone' and 'smartphone with integrated microscopy features' can be used interchangeably throughout the specification.

Throughout the disclosure, term 'other device' or 'other device with integrated microscopy features' used herein refers to an image capturing assembly, a digital portable device for image capturing or any of digital device for observation of object. The terms 'other device' and 'other device with integrated microscopy features' can be used interchangeably throughout the specification.

The present subject matter discloses optical microscopy devices for enabling integrated microscopy in a portable imaging system, such as a smartphone and other devices. The integrated microscopy features include variable depth of field, resolution, field of view, and magnification. The integrated microscopy features can be used for the quantitative and qualitative analysis of micron-size objects that emit the light. The term "micron" herein may be understood as micrometer (μm).

The optical microscopy devices of the present subject matter are compact and allow for inbuilt light field and filter field microscopy with variable optical magnification, resolution, field of view, and high depth of field microscopy functionality. The optical microscopy device of the present subject matter is used in a portable imaging system. The portable imaging system may include, but is not limited to, a smartphone, a mobile phone, a portable computing device, a portable medical device, a portable microscope, or a portable analytical instrument. The portable computing device may include, but is not limited to, a laptop, a netbook, a notebook, a sub-notebook, a tablet computing device, and an Ultrabook computer. The portable medical device may include, but is not limited to, a small pocket size medical device, an analytical instrument, a diagnosis device, and a quantitative and qualitative analytical instrument. The portable microscope may include, but is not limited to, a pocket size portable microscope and a portable digital microscope device.

The optical microscopy device of the present subject matter comprises multiple elements, which are sequentially arranged from the object side to the image side for the microscopy functionality in portable imaging systems, such as the smartphones and/or other devices.

In an example of the present subject matter, the optical microscopy device includes an optical lens assembly with ten to sixteen lens elements. The multiple lens element in the optical microscopy device provide microscopy features such as variable optical magnification, resolution, field of view, and high depth of field. The optical lens assembly has an optical magnification in a range of about 1× to about 3×, an airy radius in a range of about 3.2 micron to about 15 micron, a depth of field in a range of about 28 micron to about 133 micron, a numerical aperture in a range of about 0.025 to about 0.176, a half field of view in a range of about 10 degrees to about 39 degrees, and a length in a range of about 6.8 millimeter (mm) to about 18 mm.

In an example, the optical microscopy device includes a focusing unit with focusing mechanism for controlled focusing of object at various depth of fields. The focusing unit has a barrel, where the optical lens assembly of the optical microscopy device is disposed within the barrel of the focusing unit. The focusing unit is to operate the optical lens assembly for focusing while imaging an object.

In an example, the optical microscopy device includes a light source for light field and filter field microscopy. The light source is placed adjacent to the optical lens assembly to emit light such that the emitted light is incident on a sample held within a sample holder, when the sample holder is placed over the optical lens assembly.

In an example, the optical microscopy device includes an image capturing unit adjacent to the optical lens assembly to image an object in field of view of the optical lens assembly. The image capturing unit includes an image sensor or a camera having an image sensor/image sensor with a wavelength specific optical filter or an IR filter for light field and filter field microscopy. The image capturing unit may be a photo sensor or a camera with a pixel size in a range of 0.5 micron to 5 micron. The image capturing unit may be of 0.3 megapixel (MP) to 350 MP.

In an example, one or more optical microscopy devices are embedded in a portable imaging system, such as a smartphone as per the required features/applications, for example, wavelength selectivity, variable optical magnification, variable resolution, variable depth of field, etc. Multiple optical microscopy devices in the portable imaging system increase applicability of the portable imaging system towards imaging of micron-size objects or objects that emit light of a specific wavelength. The smartphones and other devices with the high-resolution microscopic feature can be used for the qualitative and quantitative estimation of wide range of objects for the various applications, such as, but not limited to, diagnosis, analytical applications, research and education applications, etc.

The optical microscopy devices may be embedded in the portable imaging system at any location forming patterns of various shapes, such as circular, hexagonal, square, or any other geometrical shape.

In an example, the lens elements of the optical microscopy device are made of materials, such as, but not limited to, plastic, glass, polymer, or any material having desirable refractive index (higher than 1) and Abbe number.

In an example, the optical microscopy device of the present subject matter includes two or more correction lenses for correction of optical and spherical aberrations. The number, shape, position, spacing, and arrangement of the lens elements in the optical microscopy device of the present subject matter may vary depending on the desirable microscopy features, such as resolutions, field of view, optical magnification, depth of field, etc. The properties of the lens elements of the optical microscopy device, such as, but not limited to, power distribution, lens shapes, positions, materials, shape, thickness, spacing, aperture location, geometry, surface shape of lens element may be selected to reduce the optical, chromatic, spherical aberrations and the effect across the field of view including one or more of but not limited to lens flare, aberrations, field curvature etc. The optical microscopy device of the present subject matter may also include one or more aperture stops, arranged at specific positions between the lens elements, to correct the aberrations.

In an example, the lens elements in the optical microscopy device may have a positive refractive power or a negative refractive power. The lens elements may be aspheric, meniscus concave or convex in peripheral or axial region of any of the image or object side. The inflection point on any of the surfaces of the lens element is located near to the image sensor or the object side. The inflection point may be such that it prevents the aberrations in the optical microscopy device.

In an example, the first and second lens elements collect the light from wide area, while the subsequent lens elements are used for the correction of the aberrations due to first and second lens elements. One or more subsequent lens elements may be used as correction lens element(s) for the better correction of optical and spherical aberrations. The subsequent two lens elements after the correction lens element(s) have positive refractive power and they play key role in optical magnification. These two lens elements have a greater light conversion ability and positive refractive power, hence, a greater chance of correction of optical and chromatic aberrations.

In an example, the optical magnification of the optical microscopy device is greater than 1× and more specifically the optical magnification is in range from 1× to 3×. The optical microscopy device provides a varying optical magnification to view objects of varying sizes and varying surface characteristics. Furthermore, variable magnification from 20× to 1500× or more than 1500× can achieve through the digital magnification or digital zooming. In an example, the image sensor may have a pixel size of about 0.5 to 6 microns.

The present subject matter describes a compact optical microscopy device for microscopy functionality. In an example, the optical microscopy device has a length in a range of about 5 mm to 60 mm, more particularly in a range of about 6.5 mm to about 57 mm, to fulfill demands of the compactness so as to fit within a portable imaging system, such as a smartphone.

In an example, the image capturing element may be an image sensor or a photo sensor made from an integrated circuit technology or a photosensor technology. The image sensor may be, but is not limited to, a CMOS sensor or a CDD sensor.

The present subject matter is further explained in detail with the help of drawings.

Figure 1B:
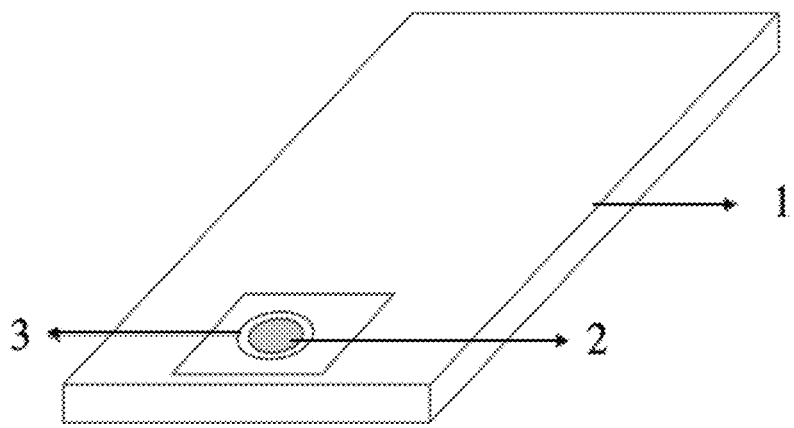

Referring to figures, FIGS. 1a and 1b show portable imaging systems 1 with two optical microscopy devices 2 and one optical microscopy device 2, in accordance with the present subject matter. The portable imaging system 1 may include, but is not limited to, a smartphone, a mobile phone, a portable computing device, a portable medical device, a portable microscope, or a portable analytical instrument. The portable computing device may include, but is not limited to, a laptop, a netbook, a notebook, a sub-notebook, a tablet computing device, and an Ultrabook computer. The portable medical device may include, but is not limited to, a small pocket size medical device, an analytical instrument, a diagnosis device, and a quantitative and qualitative analytical instrument. The portable microscope may include, but is not limited to, a pocket size portable microscope and a portable digital microscope device.

Although FIGS. 1a and 1b show two optical microscopy devices 2 in the portable imaging system 1, in an example, the portable imaging system 1 may include any number of optical microscopy devices 2. In an example, the portable imaging system 1 may include one to six optical microscopy devices 2.

Each optical microscopy device 2 is embedded inside the portable imaging system 1, for example, while manufacturing the portable imaging system 1. The optical microscopy device 2 may replace the existing camera lens assembly within the portable imaging system 1 or may be embedded as an additional unit for enabling microscopy feature in the portable imaging system 1.

In an example, each optical microscopy device 2 comprises a light source 3 arranged in periphery of the optical microscopy device 2. In another example, the light source 3 may be external to the optical microscopy device 2. The light source 3 may be a white light source or a light source of specific and desirable wavelength. Some examples of the optical microscopy device 2 are illustrated and described with reference to FIGS. 2, 3a, and 3b.

Figure 2:
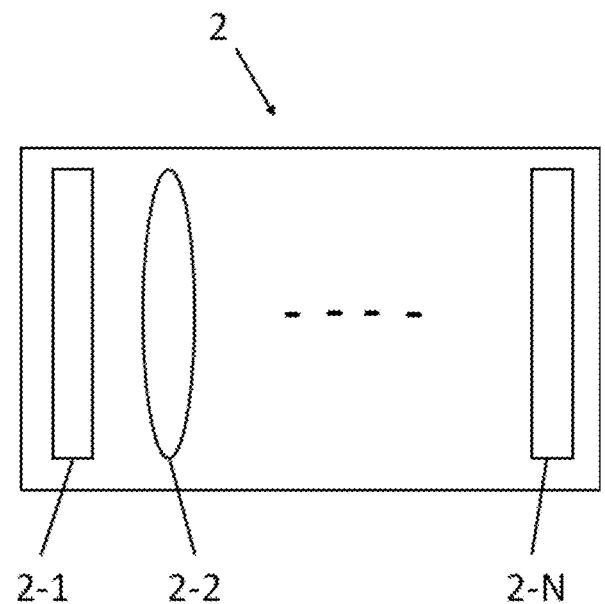
FIG. 2 illustrates an optical microscopy device, in accordance with an example of the present subject matter.

FIG. 2 illustrates an optical microscopy device 2, in accordance with an example of the present subject matter. The optical microscopy device 2 includes an optical lens assembly having a plurality of lens elements 2-1, 2-2, . . . , 2-N, where N ten to sixteen.

In an example, the optical lens assembly of the optical microscopy device 2 may include ten lens elements, eleven lens elements, twelve lens elements, fourteen lens elements, fifteen lens elements, or sixteen lens elements. Various examples of optical microscopy device 2 are described in detail later in the description and illustrated through FIGS. 4 to 14.

The optical lens assembly of the present subject matter enables the optical microscopy device 2 to have an optical magnification in a range of about 1× to about 3×, an airy radius in a range of about 3.2 micron to about 15 micron, a depth of field in a range of about 28 micron to about 133 micron, a numerical aperture in a range of about 0.025 to about 0.176, a half field of view in a range of about 10 degrees to about 39 degrees, and a length in a range of about 6.8 millimeter (mm) to about 18 mm. The optical microscopy device 2 when embedded inside a portable imaging system 1 enables microscopy feature in the portable imaging system 1.

Figure 3A:
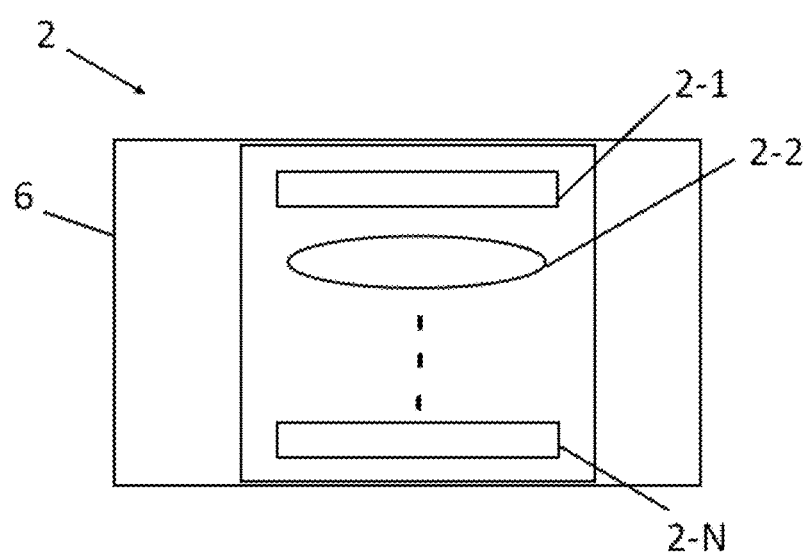
FIG. 3a illustrates an optical microscopy device, in accordance with another example of the present subject matter.

FIG. 3a illustrates an optical microscopy device 2, in accordance with another example of the present subject matter. The optical microscopy device 2 of FIG. 3a includes the optical lens assembly, similar to as described for FIG. 2. Additionally, the optical microscopy device 2 of FIG. 3a includes a focusing unit 6 having a barrel. The optical lens assembly is disposed within the barrel of the focusing unit 6. The focusing unit 6 is configured to operate the optical lens assembly for focusing while imaging an object. In an example, the focusing unit 6 has a controlled movement for focusing an object. The mechanism involved in the movement of the focusing unit 6 may include, but is not limited to, a piezoelectric movement mechanism or an electromagnetic movement mechanism. It may be noted that a software or a mobile application may be utilized for controlling the movement of the focusing unit 6 for focusing of an object.

In an example, the portable imaging system 1 in which the optical microscopy device 2 is embedded may provide an auto-focusing feature. The auto-focusing feature provides flexibility for observing objects of different sizes and located at the various distance with high resolution, wide field of view, and without any spherical and optical aberrations. The auto-focusing and high-resolution image capturing ability of the optical microscopy device 2 provides more user-friendly portable imaging system for viewing objects without any external attachment which is otherwise conventionally used.

Figure 3B:
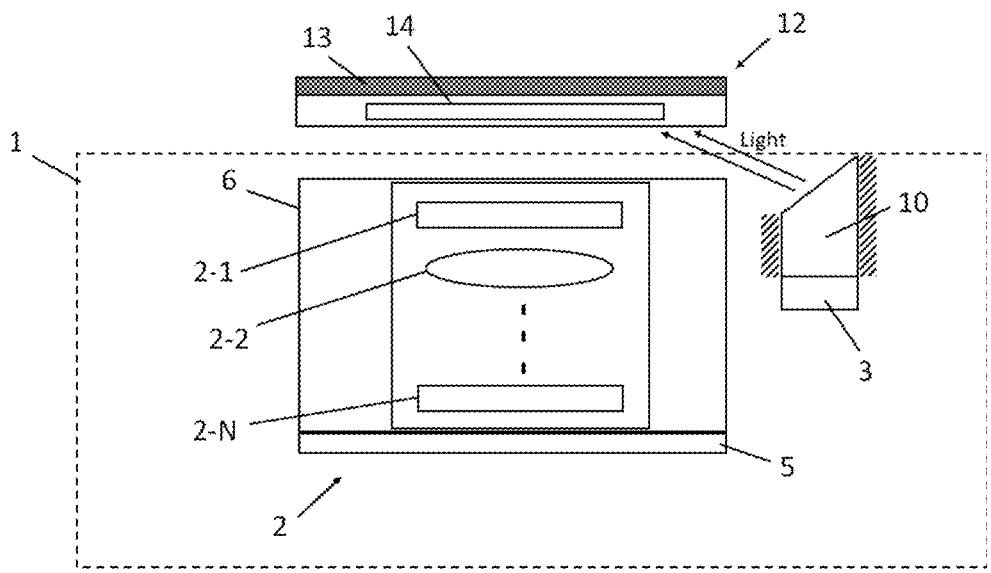
FIG. 3b illustrates an optical microscopy device, in accordance with another example of the present subject matter.

FIG. 3b illustrates an optical microscopy device 2, in accordance with another example of the present subject matter. The optical microscopy device 2 of FIG. 3b includes the optical lens assembly and the focusing unit 6, similar to as described for FIG. 3a. Additionally, the optical microscopy device 2 of FIG. 3b includes a light source 3 placed adjacent to the optical lens assembly to emit light such that the emitted light is incident on a sample held within a sample holder 12, when the sample holder 12 is placed over the optical lens assembly. In an example, the light source 3 may be a white LED with diffuser or an LED with of a specific wavelength. The sample holder 12 is a transparent chamber that can hold a sample. The sample holder 12 may hold a glass slide 14 on which the sample may be placed.

Figure 3C:
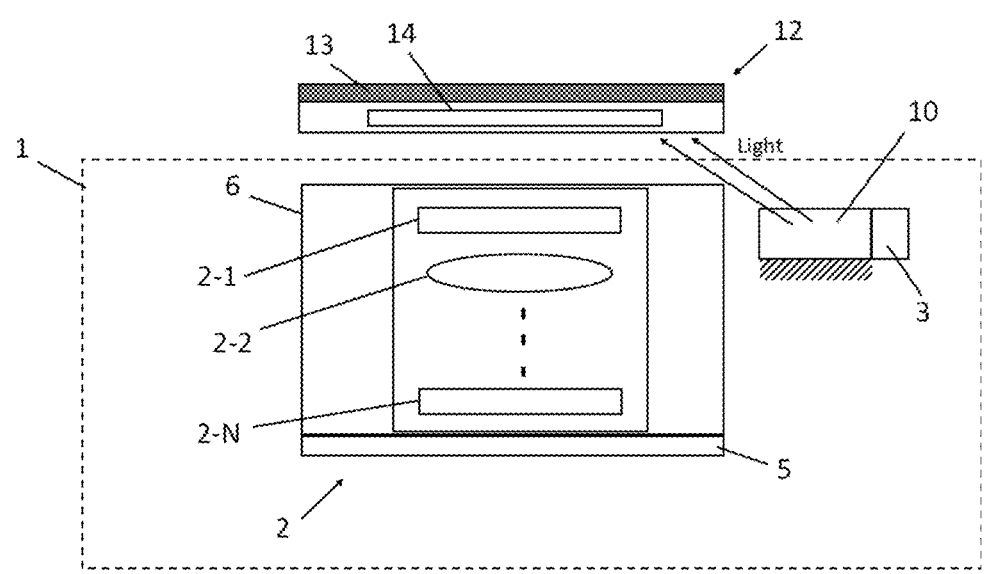
FIG. 3c illustrates an optical microscopy device, in accordance with another example of the present subject matter.

The optical microscopy device 2 also includes a light focusing element 10 to direct the light from the light source 3 to the object in the sample holder 12. The light focusing element 10 may be an optical fiber or an optically transparent rod coated with the reflective materials. Another example of the light focusing element 10 is shown in FIG. 3c. The light focusing element 10 facilitates in directing the light at an angle in such a way that light is incident on the sample holder 12 at critical angle for the total internal reflection of light inside the sample holder or inside the glass slide 14 holding the sample.

Figure 3D:
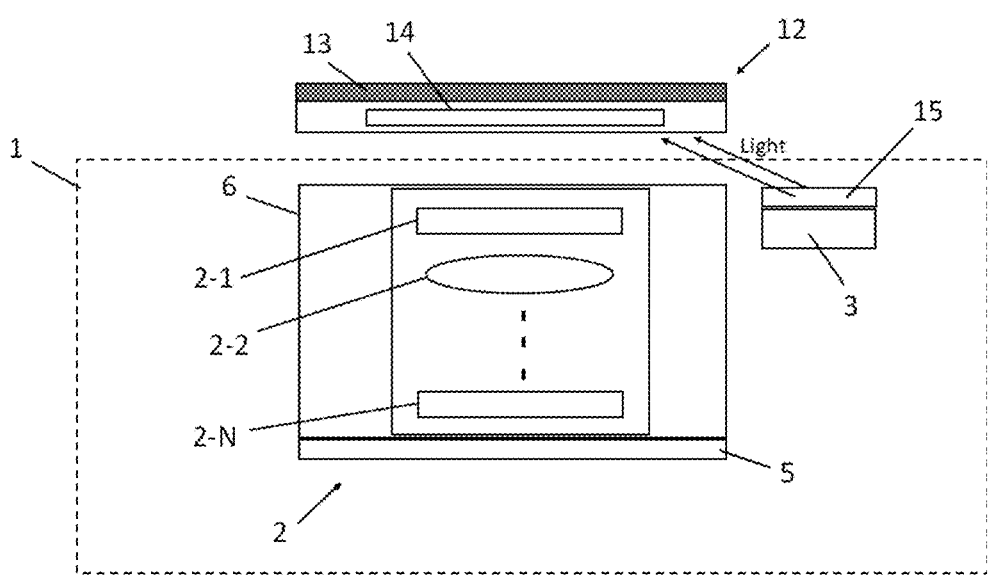
FIG. 3d illustrates an optical microscopy device, in accordance with another example of the present subject matter.

FIG. 3d shows another example of the light focusing element 15. The light focusing element 15 is an optical film or sheet which can direct the light coming at different angles from the light source 3 to the object located above the optical microscopy device 2.

Further, a planar surface 13 of the sample holder 12 may be blackened, as shown in FIGS. 3b, 3c, 3d, and the light is made incident through the other planar surface of the sample holder 12. The sample is placed between the blackened planar surface 13 and the planar surface through which the light is made incident to view the light emit from the object against the dark background.

In an example, the light source 3 provides for a dual mode observation of object under light field and filter field, where the object in the sample illuminates light of a specific wavelength.

Returning to FIG. 3b, the optical microscopy device 2 includes an image capturing unit 5, positioned adjacent to the optical lens assembly of the optical microscopy device 2 to image an object in field of view of the optical lens assembly. The image capturing unit 5 may include an image sensor or a camera having an image sensor/image sensor with/wavelength specific filter or IR filter for light field and filter field microscopy. In an example, the image capturing unit 6 is a photo sensor or a camera with a pixel size in a range of 0.5 micron to 5 micron. The image capturing unit is of 0.3 megapixel (MP) to 350 MP.

In an example, the quantitative and qualitative analysis of the image(s) captured through the optical microscopy device 2 may be performed using a conventional algorithm or software.

The present subject matter was experimented in detail using in the following examples of the optical lens assembly of the optical microscopy device 2. FIG. 4a to FIG. 14c represents example layouts of the optical lens assembly of the optical microscopy devices, and associated distortion plots and modulation transfer function (MTF) plots, results of the individual embodiments of in accordance with the present subject matter. The examples describe and demonstrate embodiments within the scope of the present subject matter. The examples are provided herein solely for the purpose of illustration and is not to be construed as limitations of the present subject matter, as many variations thereof are possible without departing from spirit and scope.

The numeral values provided the present disclosure may include tolerance of about ±5%. The numeral values provided herein may have been rounded-off to the nearest decimal place for the sake of simplicity.

It may be noted that the serial numbering of the rows of the tables for each embodiment has one to one correspondence.

EXAMPLES

Example 1

Figure 4A:
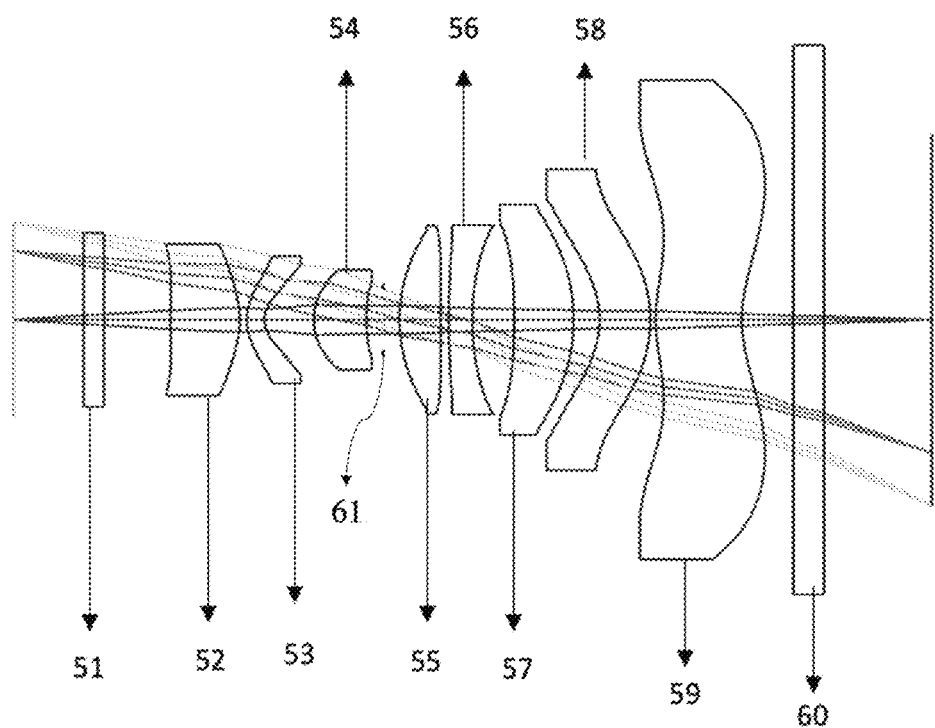
FIG. 4a to FIG. 14c represents example layouts of optical microscopy devices, and associated distortion plots and modulation transfer function (MTF) plots, in accordance with the present subject matter.

The optical lens assembly (2) in the first embodiment comprises ten lens elements which are sequentially arranged from object side to image side. The aperture stop (61) is located between the fourth and fifth lens elements. First four lens elements can act as objective assembly. The layout diagram is shown in FIG. 4a.

Figure 4B:
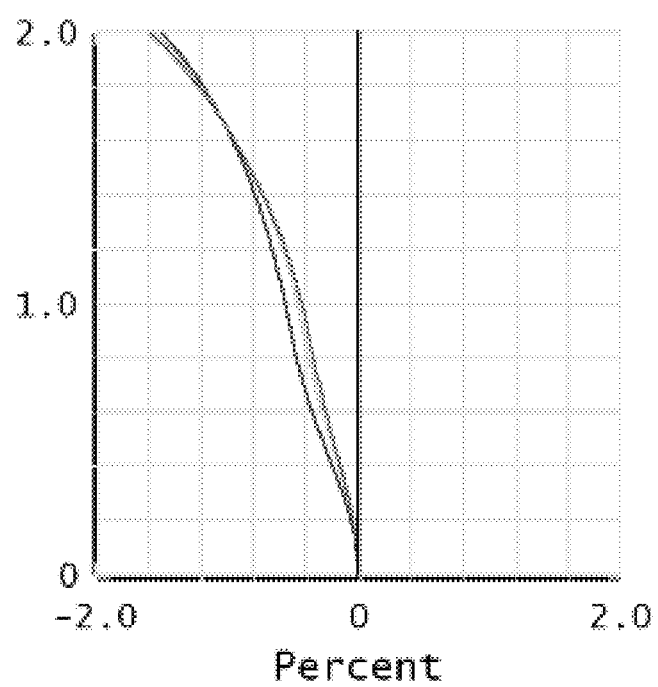
Figure 4C:
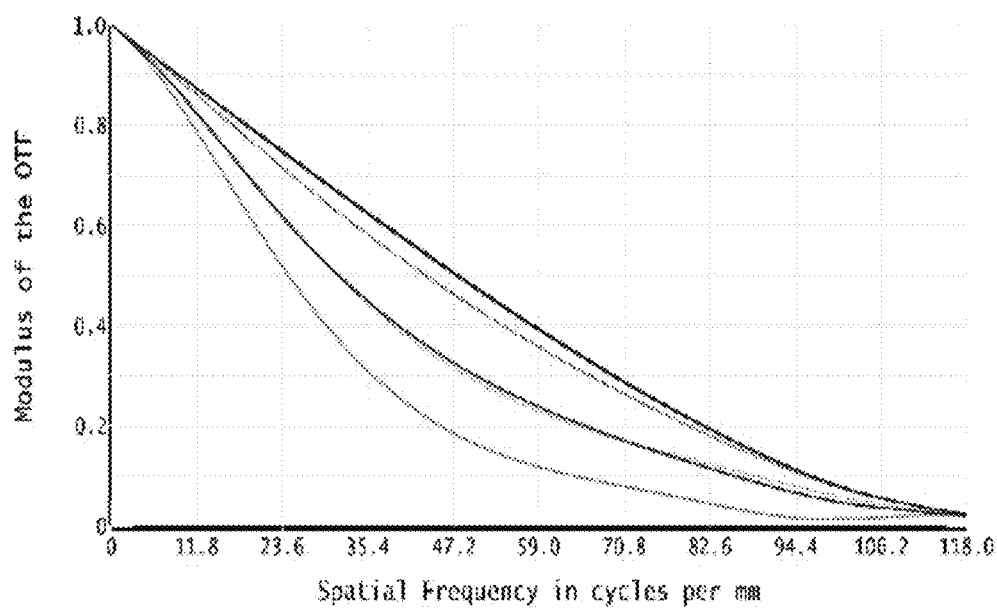

The first lens element (51) is a protective layer or a filter made of glass or plastic or polymer or composite materials having refractive index is greater than 1. The second lens element (52) has a positive refractive power with biconvex surface. The third lens element (53) has a negative refractive power. The object side surface of the third lens element is Convex and image side surface is Concave in vicinity of axis. The fourth lens element (54) has a positive refractive power. The object side surface of the fourth lens element is convex portion in vicinity of axis and image side surface is concave. The fifth lens element (55) has a positive refracting power. The object side surface is a convex surface. The sixth lens element (56) has a negative refracting power. The object side surface is a convex surface, and the image side surface is a concave surface. The seventh lens element (57) has a positive refracting power. The object side surface is a concave surface comprising a concave portion in the vicinity of the optical axis. The image side surface is convex in vicinity of optical axis. The eighth lens element (58) has a negative refracting power. The object side surface is a concave surface, and the image side surface is a convex surface. The ninth lens element (59) has a refracting power. The object side surface comprises a convex portion in the vicinity of the optical axis and a concave portion in the vicinity of the periphery of the ninth lens element. The image side surface comprises a concave portion in the vicinity of the optical axis and a convex portion in the vicinity of the periphery of the ninth lens element. The tenth lens element (60) is a filter or an IR filter. The optical lens assembly data of the first embodiment is shown in Table 1A and the aspheric data is shown in Table 1B. The distortion plot and the MTF plot are shown in FIGS. 4B and 4C. The optical lens assembly (2) of the first embodiment has:

Magnification=2×; Numerical aperture=0.035; Focal Length=3.35 mm; System length=17.90 mm; HFOV=12.6 degree; Depth of field=121.38 micron; Airy radius=10.31 micron.

TABLE 1A

The optical lens assembly data for first embodiment

| S. No. | Lens Element Number | Radius of curvature (mm) | Thickness (mm) of lens element OR air gap (mm) with the previous or next element | Refractive Index | Abbe Number |
|---|---|---|---|---|---|
| 0 | | Infinity | 1.35E+00 | | |
| 1 | 1 | Infinity | 4.00E−01 | 1.52 | 64.2 |
| 2 | | Infinity | 1.30E+00 | | |
| 3 | 2 | 1.31E+01 | 1.35E+00 | 1.53 | 55.8 |
| 4 | | −1.80E+00 | 1.33E−01 | | |
| 5 | 3 | 1.02E+00 | 3.45E−01 | 1.63 | 23.4 |
| 6 | | 5.08E−01 | 9.67E−01 | | |
| 7 | 4 | 1.28E+00 | 1.03E+00 | 1.52 | 52.2 |
| 8 | | 5.20E+00 | 3.21E−01 | | |
| 9 | Aperture Stop | Infinity | 3.21E−01 | | |
| 10 | 5 | 3.37E+00 | 8.06E−01 | 1.54 | 56.1 |
| 11 | | 3.32E+02 | 1.54E−01 | | |
| 12 | 6 | 1.54E+01 | 4.60E−01 | 1.64 | 23.3 |
| 13 | | 5.43E+00 | 8.18E−01 | | |
| 14 | 7 | −1.58E+01 | 1.16E+00 | 1.54 | 56.1 |
| 15 | | −3.91E+00 | 5.08E−01 | | |
| 16 | 8 | −1.82E+00 | 9.88E−01 | 1.64 | 23.3 |
| 17 | | −2.88E+00 | 1.04E−01 | | |
| 18 | 9 | 3.33E+00 | 1.68E+00 | 1.54 | 56.1 |
| 19 | | 2.96E+00 | 1.00E+00 | | |
| 20 | 10 | Infinity | 6.00E−01 | 1.517 | 64.2 |
| 21 | | Infinity | 2.10E+00 | | |

TABLE 1B

The aspheric data for the first embodiment

| S. No. | Conic | order 4 | order 6 | order 8 | order 10 | order 12 | order 14 | order 16 |
|---|---|---|---|---|---|---|---|---|
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | 0.00E+00 | 0.00E+00 | 0.00E+00 | 0.00E+00 | 0.00E+00 | 0.00E+00 | 0.00E+00 | 0.00E+00 |
| 4 | −1.00E+00 | −4.12E−02 | 2.63E−03 | 4.19E−04 | 1.20E−04 | −4.67E−05 | 3.66E−06 | 0.00E+00 |
| 5 | −1.18E+01 | −1.67E−02 | 6.93E−04 | 7.12E−04 | −4.52E−05 | −1.63E−05 | 2.00E−06 | 0.00E+00 |
| 6 | −2.89E+00 | 9.75E−03 | −2.08E−02 | 4.82E−03 | −1.19E−04 | −5.03E−04 | 6.80E−05 | 0.00E+00 |
| 7 | −1.80E+00 | 1.88E−02 | −5.61E−02 | −2.05E−03 | 6.31E−03 | −1.14E−03 | 4.56E−05 | 0.00E+00 |
| 8 | −4.74E−01 | 1.88E−02 | 3.54E−02 | −1.29E−02 | −2.61E−02 | 2.57E−02 | 1.48E−02 | −1.41E−02 |
| 9 | −1.00E+00 | 8.30E−02 | 1.38E−01 | −1.38E−01 | 6.39E−02 | 5.54E−01 | −6.03E−01 | 0.00E+00 |
| 10 | 0.00E+00 | 0.00E+00 | 0.00E+00 | 0.00E+00 | 0.00E+00 | 0.00E+00 | 0.00E+00 | 0.00E+00 |
| 11 | −3.37E−01 | 7.68E−04 | 2.83E−04 | −1.68E−04 | 4.43E−05 | 1.37E−05 | 8.10E−07 | −2.01E−07 |
| 12 | 0.00E+00 | −6.63E−04 | −1.27E−03 | 1.67E−04 | −9.46E−05 | 2.20E−06 | −3.16E−07 | 2.71E−07 |
| 13 | 0.00E+00 | −2.18E−03 | −5.54E−04 | 1.74E−04 | −7.16E−05 | −1.57E−05 | 8.72E−06 | −5.63E−07 |
| 14 | −1.95E+00 | 1.79E−03 | 3.16E−04 | 4.69E−04 | −2.21E−04 | 3.97E−05 | 2.14E−06 | −5.33E−07 |
| 15 | 1.28E+01 | −9.29E−03 | −2.15E−04 | 4.59E−04 | −2.04E−04 | 2.45E−05 | −1.14E−06 | 4.85E−07 |
| 16 | −2.94E+01 | −4.53E−02 | 1.28E−02 | −2.31E−03 | 2.94E−03 | −2.31E−03 | −1.11E−06 | 3.29E−07 |
| 17 | −6.57E+00 | −4.03E−02 | 9.43E−03 | −1.35E−04 | −1.28E−04 | −7.65E−06 | 4.27E−06 | −3.01E−07 |
| 18 | −3.74E+00 | −1.87E−02 | 3.18E−03 | −1.09E−04 | 4.63E−06 | −1.40E−06 | 9.23E−08 | −1.67E−09 |
| 19 | −1.41E+01 | −1.83E−02 | 1.37E−03 | −2.83E−05 | −8.56E−07 | 5.03E−08 | −7.78E−10 | 3.53E−12 |
| 20 | −5.52E+00 | −9.78E−03 | 7.43E−04 | −4.30E−05 | 1.31E−06 | −6.41E−09 | −8.42E−10 | 1.78E−11 |
| 21 | 0.00E+00 | 0.00E+00 | 0.00E+00 | 0.00E+00 | 0.00E+00 | 0.00E+00 | 0.00E+00 | 0.00E+00 |

The optical lens assembly of the first embodiment includes:
  a first lens element having a planar object side surface, a planar image side surface, a thickness of about 0.40 mm, a refractive index of about 1.52, and Abbe number of about 64.2;
  a second lens element having an object side surface of a radius of curvature of about 13.10 mm, an image side surface of a radius of curvature of about −1.80 mm, a thickness of about 1.35 mm, a refractive index of about 1.53, and Abbe number of about 55.8;
  a third lens element having an object side surface of a radius of curvature of about 1.02 mm, an image side surface of a radius of curvature of about 0.508 mm, a thickness of about 0.345 mm, a refractive index of about 1.63, and Abbe number of about 23.4;
  a fourth lens element having an object side surface of a radius of curvature of about 1.28 mm, an image side surface of a radius of curvature of about 5.20 mm, a thickness of about 1.03 mm, a refractive index of about 1.52, and Abbe number of about 52.2;
  a fifth lens element having an object side surface of a radius of curvature of about 3.37 mm, an image side surface of a radius of curvature of about 332 mm, a thickness of about 0.806 mm, a refractive index of about 1.54, and Abbe number of about 56.1;
  a sixth lens element having an object side surface of a radius of curvature of about 15.4 mm, an image side surface of a radius of curvature of about 5.43 mm, a thickness of about 0.46 mm, a refractive index of about 1.64, and Abbe number of about 23.3;
  a seventh lens element having an object side surface of a radius of curvature of about −15.8 mm, an image side surface of a radius of curvature of about −3.91 mm, a thickness of about 1.16 mm, a refractive index of about 1.54, and Abbe number of about 56.1;
  an eighth lens element having an object side surface of a radius of curvature of about −1.82 mm, an image side surface of a radius of curvature of about −2.88 mm, a thickness of about 0.988 mm, a refractive index of about 1.64, and Abbe number of about 23.3;
  a ninth lens element having an object side surface of a radius of curvature of about 3.33 mm, an image side surface of a radius of curvature of about 2.96 mm, a thickness of about 1.68 mm, a refractive index of about 1.54, and Abbe number of about 56.1; and
  a tenth lens element having a planar object side surface, a planar image side surface, a thickness of about 0.6 mm, a refractive index of about 1.517, and Abbe number of about 64.2,
  wherein the optical lens assembly comprises an aperture stop positioned between the fourth lens element and the fifth lens element, wherein the aperture stop is a planar element having a thickness of about 0.321 mm.

Example 2

Figure 5A:
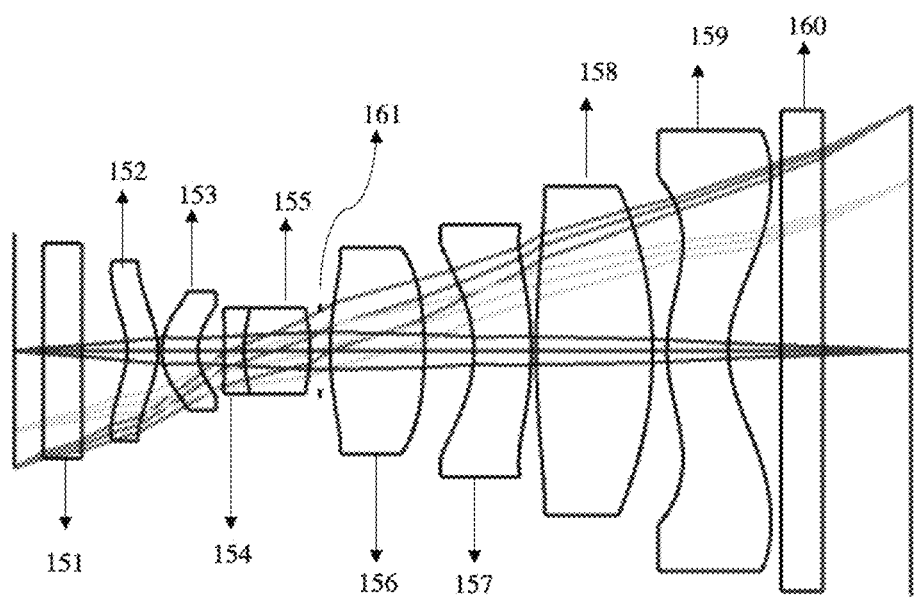

The optical lens assembly (2) in the second embodiment comprises ten lens elements which are sequentially arranged from object side to image side. The aperture stop (161) is located between the fifth and sixth lens elements. First five elements can act as objective assembly. The layout diagram is shown in FIG. 5a.

Figure 5B:
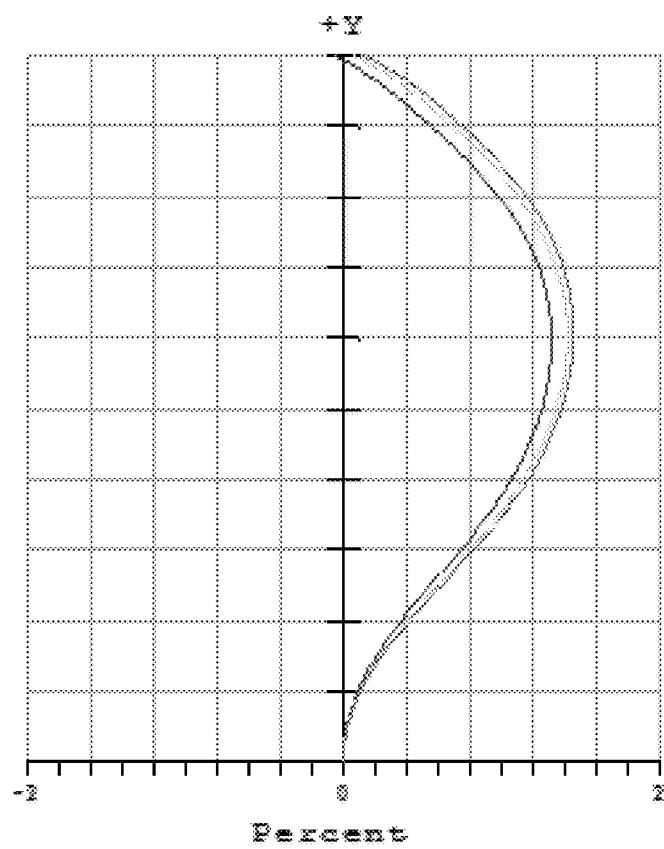
Figure 5C:
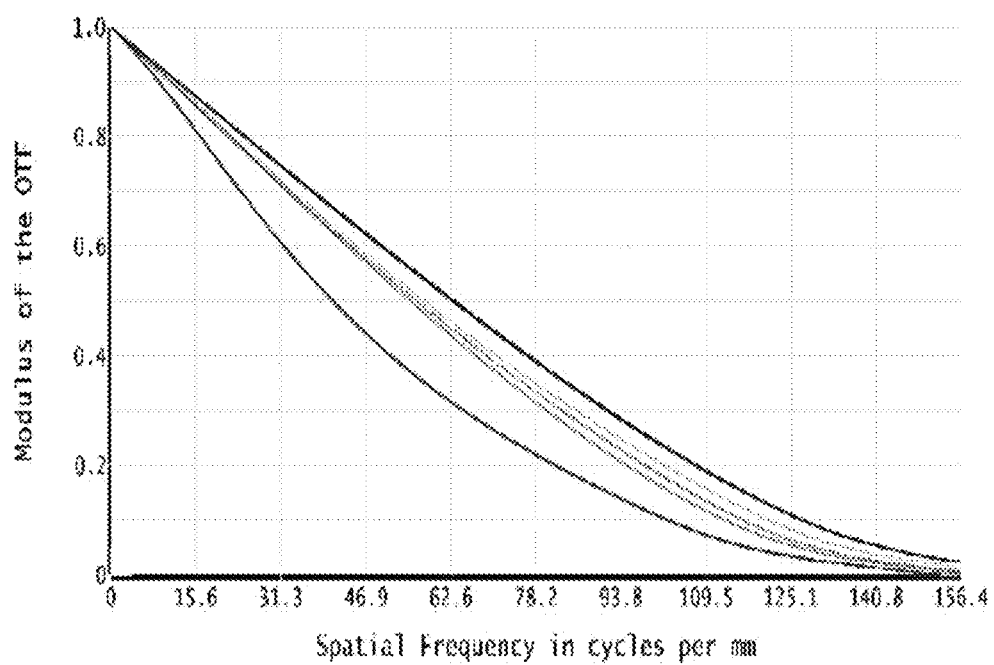

The first lens element (151) is a protective layer or a filter made of glass or plastic or polymer or composite materials having refractive index is greater than 1. The second lens element (152) has a positive refractive power. The object side surface is concave in the vicinity of the axis. The image side surface is convex near the optical axis. The third lens element (153) has a positive refractive power. The object side surface is a convex surface. The image side surface is a concave surface. The fourth and fifth lens elements are doublet and shown as separate element. The fourth lens element (154) has a negative refractive power. The image side surface is concave. The fifth lens element (155) has a positive refractive power. The object side surface is a convex surface and the image side surface is convex. The sixth lens element (156) has a positive refractive power. The image side surface is a convex surface. The seventh lens element (157) has a negative refracting power. The object side surface is a concave surface, and the image side surface is convex. The eighth lens element (158) has a positive refracting power. The image side surface is a convex surface. The ninth lens element (159) has a negative refracting power. The object side surface is a convex surface near the axis and is concave in the vicinity of the periphery. The image side surface comprises a concave portion in the vicinity of optical axis and a convex portion in the vicinity of the periphery of the ninth lens element. The tenth lens element (160) is a filter or an JR filter. The optical lens assembly data of the second embodiment is shown in Table 2A and the aspheric data is shown in Table 2B. The distortion plot and the MTF plot are shown in FIGS. 5b and 5c. The optical assembly of second embodiment has:

Magnification=2×; Numerical aperture=0.046; Focal Length=1.49093 mm; System length=8.7613 mm; HFOV=20-degree highest HFOV; Depth of field=69.99 micron; Airy radius=7.828 micron.

TABLE 2A

The optical assembly data of second embodiment

| S. No. | Lens Element Number | Radius of curvature (mm) | Thickness (mm) of lens element OR air gap (mm) with the previous or next element | Refractive index | Abbe Number |
| --- | --- | --- | --- | --- | --- |
| 0 | | Infinity | 2.90E−01 | | |
| 1 | 1 | Infinity | 4.00E−01 | 1.52 | 64.2 |
| 2 | | Infinity | 4.50E−01 | | |
| 3 | 2 | −1.42E+00 | 3.10E−01 | 1.51 | 56.4 |
| 4 | | −1.24E+00 | 4.00E−02 | | |
| 5 | 3 | 1.92E+00 | 3.65E−01 | 1.51 | 56.4 |
| 6 | | 2.11E+00 | 2.65E−01 | | |
| 7 | 4 | −3.87E−02 | 2.00E−01 | 1.85 | 23.8 |
| 8 | 5 | 6.95E−01 | 6.70E−01 | 1.74 | 49.2 |
| 9 | | −6.95E−01 | 1.00E−01 | | |
| 10 | Aperture Stop | Infinity | 1.00E−01 | | |
| 11 | 6 | 3.33E−01 | 9.49E−01 | 1.54 | 56.1 |
| 12 | | −2.43E−01 | 4.99E−01 | | |
| 13 | 7 | −6.85E−01 | 5.81E−01 | 1.64 | 23. |
| 14 | | −2.99E−01 | 5.10E−02 | | |
| 15 | 8 | 1.04E−01 | 1.17E+00 | 1.54 | 56.1 |
| 16 | | −2.41E−01 | 1.49E−01 | | |
| 17 | 9 | 6.11E−01 | 6.16E−01 | 1.53 | 56 |
| 18 | | 8.81E−01 | 5.35E−01 | | |
| 19 | 10 | Infinity | 4.20E−01 | 1.52 | 64.2 |
| 20 | | Infinity | 8.90E−01 | | |

TABLE 2B

The aspheric data of the second embodiment

| S. No. | Conic | Order 4 | Order 6 | Order 8 | Order 10 | Order 12 | Order 14 | Order 16 |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −6.98E+00 | 1.91E−01 | 2.84E−03 | −1.97E−01 | 8.84E−02 | 3.44E−01 | −2.04E−01 | −2.00E−02 |
| 4 | −3.63E+00 | 3.61E−01 | −4.26E−01 | 6.81E−02 | 3.11E−01 | 4.13E−02 | 1.59E−02 | −1.36E−01 |
| 5 | −2.22E+00 | 2.69E−01 | 1.79E+00 | −1.30E+01 | 3.36E+01 | −9.58E+01 | 1.76E+02 | −1.14E+02 |
| 6 | −4.25E+00 | 1.87E+00 | −4.34E+00 | −1.02E+01 | 1.61E+01 | 5.05E+01 | −8.27E+01 | 2.98E+02 |
| 7 | 0.00E+00 | 0.00E+00 | 0.00E+00 | 0.00E+00 | 0.00E+00 | 0.00E+00 | 0.00E+00 | 0.00E+00 |
| 8 | 0.00E+00 | 0.00E+00 | 0.00E+00 | 0.00E+00 | 0.00E+00 | 0.00E+00 | 0.00E+00 | 0.00E+00 |
| 9 | 0.00E+00 | 0.00E+00 | 0.00E+00 | 0.00E+00 | 0.00E+00 | 0.00E+00 | 0.00E+00 | 0.00E+00 |
| 10 | 0.00E+00 | 0.00E+00 | 0.00E+00 | 0.00E+00 | 0.00E+00 | 0.00E+00 | 0.00E+00 | 0.00E+00 |
| 11 | −2.20E+00 | −1.79E−02 | −2.26E−02 | 8.46E−04 | −1.28E−02 | 1.44E−03 | −1.30E−03 | 0.00E+00 |
| 12 | 7.23E+00 | −5.81E−02 | −7.77E−03 | −7.70E−05 | 6.18E−03 | −2.86E−03 | −5.27E−04 | 0.00E+00 |
| 13 | −8.19E−01 | −9.62E−03 | 6.24E−02 | 1.41E−03 | −5.20E−03 | −1.21E−03 | 7.09E−04 | 1.26E−05 |
| 14 | 1.73E+00 | −9.56E−05 | 4.88E−02 | −5.22E−03 | −1.93E−03 | 5.11E−04 | 9.68E−05 | −3.72E−05 |
| 15 | −3.79E+01 | 8.28E−03 | −8.62E−03 | 2.48E−03 | −1.39E−04 | −8.90E−05 | −9.82E−06 | 7.83E−06 |
| 16 | 0.00E+00 | 0.00E+00 | 0.00E+00 | 0.00E+00 | 0.00E+00 | 0.00E+00 | 0.00E+00 | 0.00E+00 |
| 17 | −4.64E+00 | −8.55E−02 | −3.92E−03 | 6.03E−03 | −1.03E−03 | −2.53E−05 | 1.56E−05 | −1.32E−06 |
| 18 | −2.61E+00 | −8.11E−02 | 1.94E−02 | −2.89E−03 | 1.70E−04 | 5.02E−06 | −8.37E−07 | −9.90E−09 |
| 19 | 0.00E+00 | 0.00E+00 | 0.00E+00 | 0.00E+00 | 0.00E+00 | 0.00E+00 | 0.00E+00 | 0.00E+00 |
| 20 | 0.00E+00 | 0.00E+00 | 0.00E+00 | 0.00E+00 | 0.00E+00 | 0.00E+00 | 0.00E+00 | 0.00E+00 |

The optical lens assembly of the second embodiment includes:
a first lens element having a planar object side surface, a planar image side surface, a thickness of about 0.40 mm, a refractive index of about 1.52, and Abbe number of about 64.2;
a second lens element having an object side surface of a radius of curvature of about −1.42 mm, an image side surface of a radius of curvature of about −1.24 mm, a thickness of about 0.31 mm, a refractive index of about 1.51, and Abbe number of about 56.4;
a third lens element having an object side surface of a radius of curvature of about 1.92 mm, an image side surface of a radius of curvature of about 2.11 mm, a thickness of about 0.365 mm, a refractive index of about 1.51, and Abbe number of about 56.4;
a fourth lens element having an object side surface of a radius of curvature of about −0.0387 mm, an image side surface of a radius of curvature of about −0.695 mm, a thickness of about 0.2 mm, a refractive index of about 1.85, and Abbe number of about 23.8;
a fifth lens element juxtaposed with the fourth lens and having an object side surface of a radius of curvature of about 0.695 mm, an image side surface of a radius of curvature of about −0.695 mm, a thickness of about 0.67 mm, a refractive index of about 1.74, and Abbe number of about 49.2;
a sixth lens element having an object side surface of a radius of curvature of about 0.333 mm, an image side surface of a radius of curvature of about −0.243 mm, a thickness of about 0.949 mm, a refractive index of about 1.54, and Abbe number of about 56.1;
a seventh lens element having an object side surface of a radius of curvature of about −0.685 mm, an image side surface of a radius of curvature of about −0.299 mm, a thickness of about 0.581 mm, a refractive index of about 1.64, and Abbe number of about 23;
an eighth lens element having an object side surface of a radius of curvature of about 0.104 mm, an image side surface of a radius of curvature of about −0.241 mm, a thickness of about 1.17 mm, a refractive index of about 1.54, and Abbe number of about 56.1;
a ninth lens element having an object side surface of a radius of curvature of about 0.611 mm, an image side surface of a radius of curvature of about 0.881 mm, a thickness of about 0.616 mm, a refractive index of about 1.53, and Abbe number of about 56;
a tenth lens element having a planar object side surface, a planar image side surface, a thickness of about 0.42 mm, a refractive index of about 1.52, and Abbe number of about 64.2,
wherein the optical lens assembly comprises an aperture stop positioned between the fifth lens element and the sixth lens element, wherein the aperture stop is a planar element having a thickness of about 0.1 mm.

Example 3

Figure 6A:
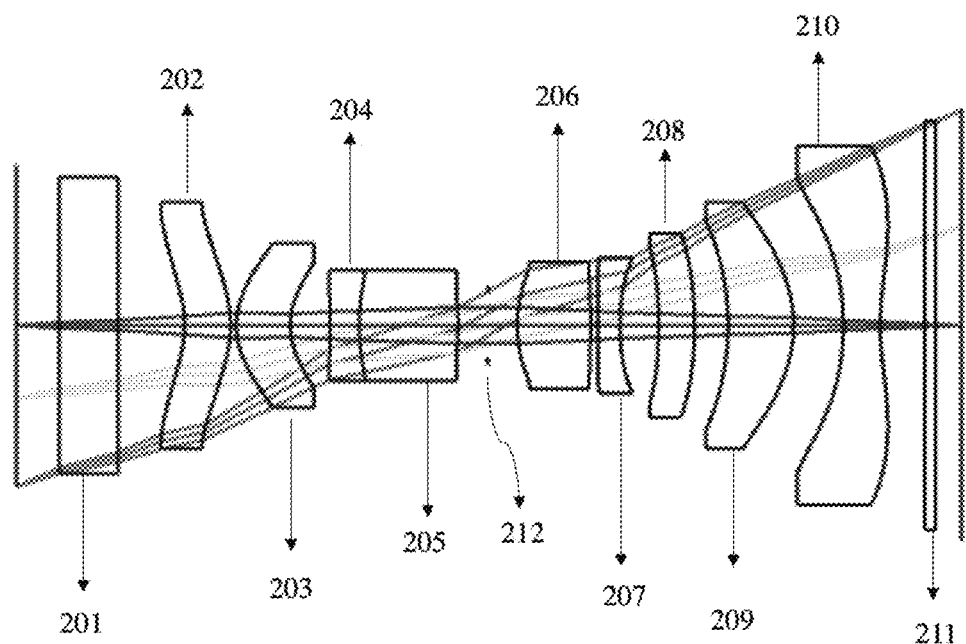

The optical lens assembly (2) in the third embodiment comprises eleven lens elements which are sequentially arranged from object side to image side. The aperture stop (212) is located between the fifth and sixth lens elements. First five lens elements can act as objective assembly. The layout diagram is shown in FIG. 6a.

Figure 6B:
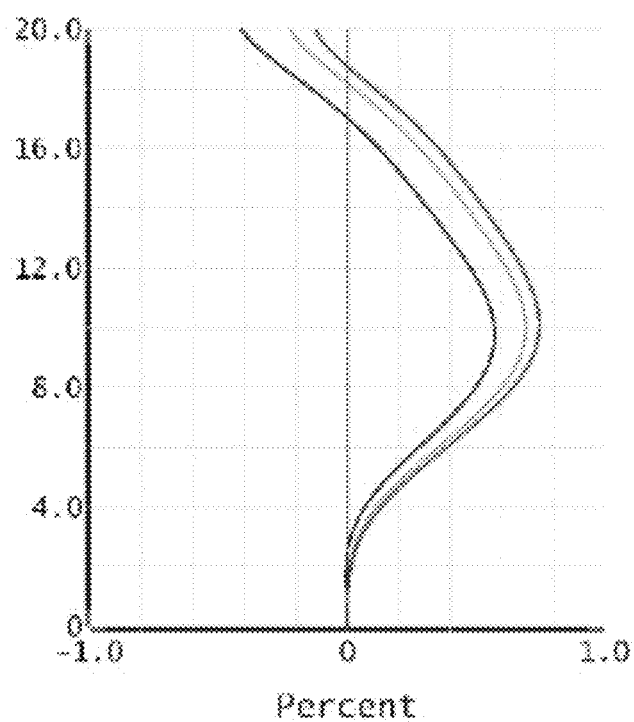
Figure 6C:
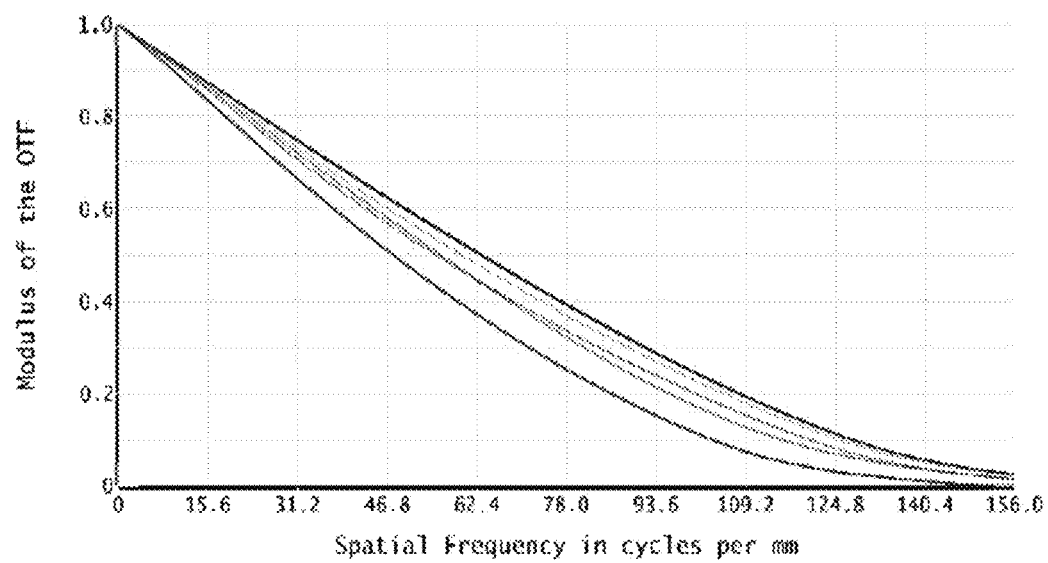

The first lens element (201) is a proactive layer or a filter made of glass or plastic or polymer or composite) materials having refractive index is greater than 1. The second lens element (202) has a refractive power. The object side surface is concave in the vicinity of the axis. The image side surface is concave near the optical axis. The third lens element (203) has a refractive power. The object side surface is a convex surface. The image side surface is a concave surface. The fourth and fifth lens elements are doublet and shown as separate element. The fourth lens element (204) has a refractive power. The image side surface is concave. The fifth lens element (205) has a refractive power. The object side surface is a convex surface and the image side surface is convex. The sixth lens element (206) has a positive refractive power. The object side surface is a convex surface and the image side surface is a concave surface. The seventh lens element (207) has a negative refracting power. The image side surface is a convex surface. The eighth lens element (208) has a refracting power. The object side surface is a concave surface. The ninth lens element (209) has a positive refracting power. The image side surface is a convex surface near the optical axis. The tenth lens element (210) has a negative refracting power. The object side surface comprises a convex portion in the vicinity of the optical axis and is concave near the periphery of the tenth lens element. The image side surface comprises a concave portion in the vicinity of optical axis and a convex portion in the vicinity of the periphery of the tenth lens element. The eleventh lens element (211) is a filter or an IR filter. The optical lens assembly data of the third embodiment is shown in Table 3A and the aspheric data is shown in Table 3B. The distortion plot and the MTF plot are shown in FIGS. 6B and 6C. The optical lens assembly (2) of the third embodiment has:

Magnification=1×; Numerical aperture=0.046; Focal Length=2.05; System length=12.211 mm; HFOV=20 degree; Depth of field=278.24 micron; Airy radius=7.803 micron.

TABLE 3A

The optical lens assembly for the third embodiment

| S. No. | Lens Element Number | Radius of curvature (mm) | Thickness (mm) of lens element OR air gap (mm) with the previous or next element | Refractive Index | Abbe No. |
|---|---|---|---|---|---|
| 0 |   | Infinity | 5.80E−01 |   |   |
| 1 | 1 | Infinity | 8.00E−01 | 1.5168 | 64.2 |
| 2 |   | Infinity | 9.00E−01 |   |   |
| 3 | 2 | −1.41E+00 | 6.20E−01 | 1.50914 | 56.4 |
| 4 |   | −1.61E+00 | 8.00E−02 |   |   |
| 5 | 3 | 1.04E+00 | 7.30E−01 | 1.50914 | 56.4 |
| 6 |   | 9.49E−01 | 5.30E−01 |   |   |
| 7 | 4 | −5.17E+01 | 4.00E−01 | 1.84666 | 23.8 |
| 8 | 5 | 2.88E+00 | 1.34E+00 | 1.743 | 49.2 |
| 9 |   | −2.88E+00 | 4.00E−01 |   |   |
| 10 | Aperture stop | Infinity | 4.00E−01 |   |   |
| 11 | 6 | 1.87E+00 | 9.90E−01 | 1.5447 | 56.2 |
| 12 |   | −1.29E+01 | 1.00E−01 |   |   |
| 13 | 7 | −7.78E+01 | 3.00E−01 | 1.632 | 23.4 |
| 14 |   | 3.13E+00 | 5.20E−01 |   |   |
| 15 | 8 | −7.80E+00 | 4.90E−01 | 1.632 | 23.4 |
| 16 |   | −5.36E+00 | 4.50E−01 |   |   |
| 17 | 9 | −3.73E+00 | 8.90E−01 | 1.5447 | 56.2 |
| 18 |   | −1.73E+00 | 6.70E−01 |   |   |
| 19 | 10 | −3.74E+00 | 5.00E−01 | 1.5447 | 56.2 |
| 20 |   | 3.35E+00 | 6.00E−01 |   |   |
| 21 | 11 | Infinity | 1.50E−01 | 1.5163 | 64.1 |
| 22 |   | Infinity | 3.52E−01 |   |   |

TABLE 3B the aspheric data for the third embodiment

| S. No. | Element | Conic | Order 2 | Order 3 | Order 4 | Order 5 | Order 6 | Order 7 | Order 8 |
|---|---|---|---|---|---|---|---|---|---|
| 0 |   | 0.00E+00 | 0.00E+00 | 0.00E+00 | 0.00E+00 | 0.00E+00 | 0.00E+00 | 0.00E+00 | 0.00E+00 |
| 1 | 1 | 0.00E+00 | 0.00E+00 | 0.00E+00 | 0.00E+00 | 0.00E+00 | 0.00E+00 | 0.00E+00 | 0.00E+00 |
| 2 |   | 0.00E+00 | 0.00E+00 | 0.00E+00 | 0.00E+00 | 0.00E+00 | 0.00E+00 | 0.00E+00 | 0.00E+00 |
| 3 | 2 | −6.98E+00 | 2.39E−02 | 8.89E−05 | −1.54E−03 | 1.73E−04 | 1.68E−04 | −2.49E−05 | −6.09E−07 |
| 4 |   | −3.63E+00 | 4.51E−02 | −1.33E−02 | 5.32E−04 | 6.08E−04 | 2.02E−05 | 1.94E−06 | −4.16E−06 |
| 5 | 3 | −2.22E+00 | 3.36E−02 | 5.60E−02 | −1.01E−01 | 6.56E−02 | −4.68E−02 | 2.14E−02 | −3.48E−03 |
| 6 |   | −4.25E+00 | 2.34E−01 | −1.36E−01 | −7.96E−02 | 3.15E−02 | 2.47E−02 | −1.01E−02 | 9.10E−03 |
| 7 | 4 | 0.00E+00 | 0.00E+00 | 0.00E+00 | 0.00E+00 | 0.00E+00 | 0.00E+00 | 0.00E+00 | 0.00E+00 |
| 8 | 5 | 0.00E+00 | 0.00E+00 | 0.00E+00 | 0.00E+00 | 0.00E+00 | 0.00E+00 | 0.00E+00 | 0.00E+00 |
| 9 |   | 0.00E+00 | 0.00E+00 | 0.00E+00 | 0.00E+00 | 0.00E+00 | 0.00E+00 | 0.00E+00 | 0.00E+00 |
| 10 | Aperture stop | 0.00E+00 | 0.00E+00 | 0.00E+00 | 0.00E+00 | 0.00E+00 | 0.00E+00 | 0.00E+00 | 0.00E+00 |
| 11 | 6 | 8.61E−02 | −3.69E−03 | −1.14E−03 | −2.92E−03 | 6.64E−04 | 3.53E−04 | −7.12E−04 | 0.00E+00 |
| 12 |   | −3.00E+01 | 4.47E−03 | 5.94E−03 | −2.09E−03 | −8.74E−03 | −4.98E−03 | 6.91E−03 | 0.00E+00 |
| 13 | 7 | −3.00E+01 | 8.27E−03 | 4.19E−02 | −2.66E−02 | −6.90E−03 | 9.56E−03 | 7.35E−05 | 0.00E+00 |
| 14 |   | −2.30E+00 | 2.27E−02 | 5.44E−02 | −3.29E−02 | 2.42E−02 | −1.22E−03 | 2.94E−04 | 0.00E+00 |
| 15 | 8 | 8.25E+00 | −4.32E−02 | −4.03E−03 | 1.57E−02 | −3.75E−03 | −8.88E−03 | 7.63E−03 | 0.00E+00 |
| 16 |   | 2.99E+00 | −2.26E−02 | 3.04E−03 | 2.19E−03 | −2.68E−04 | −1.46E−04 | 1.06E−04 | 0.00E+00 |
| 17 | 9 | 3.07E−01 | −8.54E−03 | 2.67E−03 | −6.87E−04 | 4.38E−05 | 8.97E−05 | 2.90E−07 | 0.00E+00 |
| 18 |   | −3.57E+00 | −3.59E−02 | 1.03E−02 | −2.05E−03 | 3.62E−04 | −3.27E−06 | −7.47E−07 | 0.00E+00 |
| 19 | 10 | −2.03E+00 | −3.54E−02 | 9.40E−03 | −4.07E−04 | −1.45E−04 | 2.68E−05 | −1.43E−06 | 0.00E+00 |
| 20 |   | −2.14E+01 | −2.92E−02 | 4.93E−03 | −6.84E−04 | 6.24E−05 | −4.40E−06 | 1.88E−07 | 0.00E+00 |
| 21 | 11 | 0.00E+00 | 0.00E+00 | 0.00E+00 | 0.00E+00 | 0.00E+00 | 0.00E+00 | 0.00E+00 | 0.00E+00 |
| 22 |   | 0.00E+00 | 0.00E+00 | 0.00E+00 | 0.00E+00 | 0.00E+00 | 0.00E+00 | 0.00E+00 | 0.00E+00 |

The optical lens assembly of the third embodiment includes:

a first lens element having a planar object side surface, a planar image side surface, a thickness of about 0.8 mm, a refractive index of about 1.5168, and Abbe number of about 64.2;

a second lens element having an object side surface of a radius of curvature of about −1.41 mm, an image side surface of a radius of curvature of about −1.61 mm, a thickness of about 0.62 mm, a refractive index of about 1.50914, and Abbe number of about 56.4;

a third lens element having an object side surface of a radius of curvature of about 1.04 mm, an image side surface of a radius of curvature of about 0.949 mm, a thickness of about 0.73 mm, a refractive index of about 1.50914, and Abbe number of about 56.4;

a fourth lens element having an object side surface of a radius of curvature of about −51.7 mm, an image side surface of a radius of curvature of about −2.88 mm, a thickness of about 0.4 mm, a refractive index of about 1.84666, and Abbe number of about 23.8;

a fifth lens element juxtaposed with the fourth lens and having an object side surface of a radius of curvature of about 2.88 mm, an image side surface of a radius of curvature of about −2.88 mm, a thickness of about 1.34 mm, a refractive index of about 1.743, and Abbe number of about 49.2;

a sixth lens element having an object side surface of a radius of curvature of about 1.87 mm, an image side surface of a radius of curvature of about −12.90 mm, a thickness of about 0.99 mm, a refractive index of about 1.5447, and Abbe number of about 56.2;

a seventh lens element having an object side surface of a radius of curvature of about −77.8 mm, an image side surface of a radius of curvature of about 3.13 mm, a thickness of about 0.30 mm, a refractive index of about 1.632, and Abbe number of about 23.4;

an eighth lens element having an object side surface of a radius of curvature of about −7.80 mm, an image side surface of a radius of curvature of about −5.36 mm, a thickness of about 0.49 mm, a refractive index of about 1.632, and Abbe number of about 23.4;

a ninth lens element having an object side surface of a radius of curvature of about −3.73 mm, an image side surface of a radius of curvature of about −1.73 mm, a thickness of about 0.89 mm, a refractive index of about 1.5447, and Abbe number of about 56.2;

a tenth lens element having an object side surface of a radius of curvature of about −3.74 mm, an image side surface of a radius of curvature of about 3.35 mm, a thickness of about 0.50 mm, a refractive index of about 1.5447, and Abbe number of about 56.2; and an eleventh lens element having a planar object side surface, a planar image side surface, a thickness of about 0.15 mm, a refractive index of about 1.5163, and Abbe number of about 64.1, wherein the optical lens assembly comprises an aperture stop positioned between the fifth lens element and the sixth lens element, wherein the aperture stop is a planar element having a thickness of about 0.40 mm.

Example 4

Figure 7A:
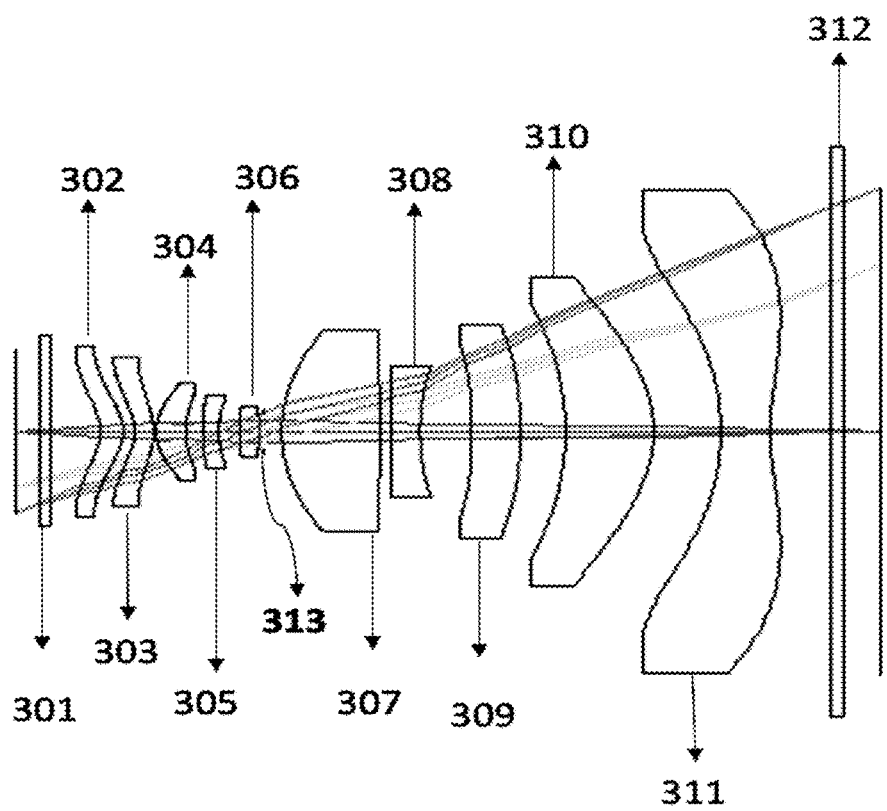

The optical lens assembly (2) in the fourth embodiment comprises twelve lens elements which are sequentially arranged from object side to image side. The aperture stop (313) is located between the sixth and seventh lens elements. First six elements can act as objective assembly. The layout diagram is shown in FIG. 7a.

Figure 7B:
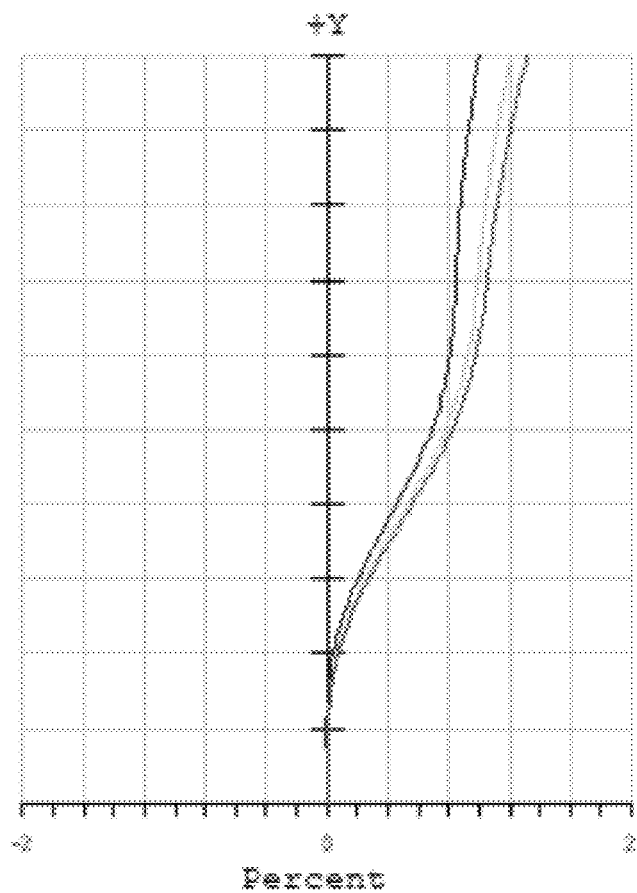
Figure 7C:
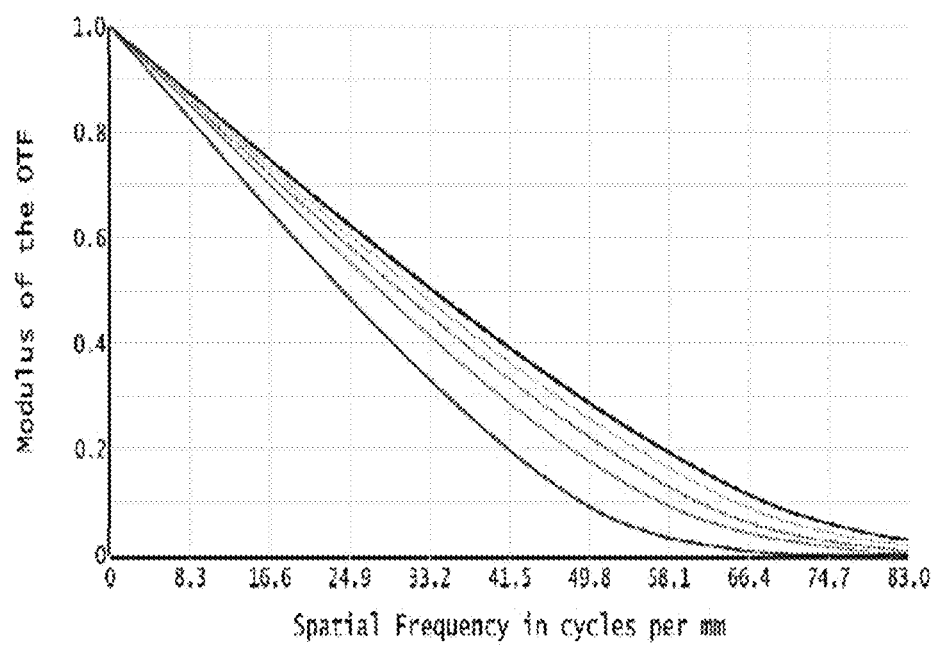

The first lens element (301) is a protective layer or a filter made of glass or plastic or polymer or composite materials having refractive index is greater than 1. The second lens element (302) has a positive refractive power. The image side surface of the second lens element is Convex portion in vicinity of optical axis, concave portion in the vicinity of a periphery of the lens element. The object side surface of second lens element is Concave portion in vicinity of optical axis and convex in the vicinity of a periphery. The third lens element (303) has a negative refractive power. The image side surface of the third lens element is Convex near optical axis and object side surface is Concave near optical axis. The fourth lens element (304) has a positive refractive power. The image side surface of fourth lens element is Concave and object side surface is Convex. The fifth lens element (305) has a negative refractive power. The image side surface of the fifth lens element is concave. The sixth lens element (306) has a positive refractive power. The image side surface of the sixth lens element is Convex and object side surface is Plane or convex. The seventh lens element (307) has a positive refracting power. The object-side surface is convex surfaces. The eighth lens element (308) has a negative refracting power. The image side surface is a concave surface. The ninth lens element (309) has a refracting power. The object side surface is a concave surface, and the image side surface is a convex surface. The tenth lens element (310) has a positive refracting power. The object side surface is a concave surface near the vicinity of the optical axis and the image side surface is a convex surface near the optical axis. The eleventh lens element (311) element has a negative refracting power. The object side surface comprises a concave portion in the vicinity of the optical axis. The image side surface comprises a concave portion in the vicinity of the optical axis and a convex portion in the vicinity of a periphery of the eleventh lens element. The twelfth lens element (312) is a filter or a IR filter. The optical lens assembly data of the fourth embodiment is shown in Table 4A and the aspheric data is shown in Table 4B. The distortion plot and the MTF plot are shown in FIGS. 7B and 7C. The optical lens assembly of the fourth embodiment has:

Magnification=3×; Numerical aperture=0.025; Focal Length=1.02207; System length=8.44428 mm; HFOV=25 degree; Depth of field=109.85 micron; Airy radius=14.71 micron.

TABLE 4A

The optical assembly data for the fourth embodiment

| S. No. | Lens Element Number | Radius of curvature (mm) | Thickness (mm) of lens element OR air gap (mm) with the previous or next element | Refractive Index | Abbe No. |
|---|---|---|---|---|---|
| 0 |   | Infinity | 2.49E−01 |   |   |
| 1 | 1 | Infinity | 1.05E−01 | 1.52 | 64.2 |
| 2 |   | Infinity | 5.01E−01 |   |   |
| 3 | 2 | −1.70E+00 | 2.30E−01 | 1.53 | 55.8 |
| 4 |   | −2.11E+00 | 1.20E−01 |   |   |
| 5 | 3 | −2.08E+00 | 1.87E−01 | 1.53 | 55.8 |
| 6 |   | −1.37E+00 | 2.50E−02 |   |   |
| 7 | 4 | 1.53E+00 | 2.92E−01 | 1.53 | 55.8 |
| 8 |   | 1.28E+00 | 1.92E−01 |   |   |
| 9 | 5 | 8.97E−02 | 1.50E−01 | 1.63 | 23.4 |
| 10 |   | 5.45E−01 | 2.10E−01 |   |   |
| 11 | 6 | 6.56E−02 | 2.02E−01 | 1.54 | 55.9 |

TABLE 4A-continued

The optical assembly data for the fourth embodiment

| S. No. | Lens Element Number | Radius of curvature (mm) | Thickness (mm) of lens element OR air gap (mm) with the previous or next element | Refractive Index | Abbe No. |
|---|---|---|---|---|---|
| 12 |  | −9.63E−01 | 3.20E−02 |  |  |
| 13 | Aperture stop | Infinity | 1.86E−01 |  |  |
| 14 | 7 | 5.35E−01 | 9.90E−01 | 1.54 | 56.2 |
| 15 |  | −7.77E−02 | 1.00E−01 |  |  |
| 16 | 8 | −1.29E−02 | 3.00E−01 | 1.63 | 23.4 |
| 17 |  | 3.19E−01 | 5.20E−01 |  |  |
| 18 | 9 | −1.28E−01 | 4.90E−01 | 1.63 | 23.4 |
| 19 |  | −1.86E−01 | 4.50E−01 |  |  |
| 20 | 10 | −2.68E−01 | 8.90E−01 | 1.54 | 56.2 |
| 21 |  | −5.79E−01 | 6.70E−01 |  |  |
| 22 | 11 | −2.67E−01 | 5.00E−01 | 1.54 | 56.2 |
| 23 |  | 2.98E−01 | 6.00E−01 |  |  |
| 24 | 12 | Infinity | 1.50E−01 | 1.52 | 64.1 |
| 25 |  | Infinity | 3.55E−01 |  |  |

TABLE 4B

The aspheric data for the fourth embodiment

| S. No | Conic | 4th order | 6th order | 8th order | 10th order | 12th order | 14th order | 16th order |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −4.10E+00 | 1.68E−01 | 5.01E−03 | −5.44E−03 | −4.59E−03 | −5.31E−04 | 0.00E+00 | 0.00E+00 |
| 4 | −4.10E+00 | 1.26E−01 | 2.32E−02 | −5.16E−03 | −1.88E−03 | −2.64E−03 | 0.00E+00 | 0.00E+00 |
| 5 | −5.54E+00 | 2.11E−01 | −1.21E−01 | 1.09E−01 | −3.56E−02 | −7.38E−04 | 1.27E−03 | 0.00E+00 |
| 6 | −7.55E+00 | 2.94E−01 | −3.52E−01 | 3.04E−01 | −1.46E−01 | −2.09E−02 | 4.53E−02 | 0.00E+00 |
| 7 | −1.09E+00 | 3.09E−01 | −1.05E+00 | 3.82E−01 | −5.46E+00 | 1.90E+00 | 6.41E+00 | 0.00E+00 |
| 8 | −9.88E+00 | 7.94E−01 | −5.19E+00 | 1.13E+01 | −1.18E+01 | 3.77E+01 | −5.34E+01 | −1.12E+02 |
| 9 | 1.00E+00 | −3.14E−01 | 1.42E+00 | −1.61E−01 | −8.23E+00 | −1.31E+01 | −2.45E+02 | 4.79E+02 |
| 10 | 4.79E−01 | 7.85E−01 | 3.55E+00 | 4.56E+00 | −1.22E+01 | −4.54E+02 | −1.72E+03 | 5.46E+03 |
| 11 | 1.00E+00 | 9.98E−01 | 4.93E+00 | 3.22E+00 | 7.63E+00 | 5.20E+02 | 2.80E+03 | −5.18E+04 |
| 12 | −2.35E+00 | 1.49E−01 | 2.61E+00 | 9.55E+00 | 5.65E+01 | 1.28E+02 | 9.01E+02 | 8.23E+03 |
| 13 | 0.00E+00 | 0.00E+00 | 0.00E+00 | 0.00E+00 | 0.00E+00 | 0.00E+00 | 0.00E+00 | 0.00E+00 |
| 14 | 8.61E−02 | −3.69E−03 | −1.14E−03 | −2.92E−03 | 6.64E−04 | 3.53E−04 | −7.12E−04 | 0.00E+00 |
| 15 | −3.00E+01 | 4.47E−03 | 5.94E−03 | −2.09E−03 | −8.74E−03 | −4.98E−03 | 6.91E−03 | 0.00E+00 |
| 16 | −3.00E+01 | 8.27E−03 | 4.19E−02 | −2.66E−02 | −6.90E−03 | 9.56E−03 | 7.35E−05 | 0.00E+00 |
| 17 | −2.30E+00 | 2.27E−02 | 5.44E−02 | −3.29E−02 | 2.42E−02 | −1.22E−03 | 2.94E−04 | 0.00E+00 |
| 18 | 8.25E+00 | −4.32E−02 | −4.03E−03 | 1.57E−02 | −3.75E−03 | −8.88E−03 | 7.63E−03 | 0.00E+00 |
| 19 | 2.99E+00 | −2.26E−02 | 3.04E−03 | 2.19E−03 | −2.68E−04 | −1.46E−04 | 1.06E−04 | 0.00E+00 |
| 20 | 3.07E−01 | −8.54E−03 | 2.67E−03 | −6.87E−04 | 4.38E−05 | 8.97E−05 | 2.90E−07 | 0.00E+00 |
| 21 | −3.57E+00 | −3.59E−02 | 1.03E−02 | −2.05E−03 | 3.62E−04 | −3.27E−06 | −7.47E−07 | 0.00E+00 |
| 22 | −2.03E+00 | −3.54E−02 | 9.40E−03 | −4.07E−04 | −1.45E−04 | 2.68E−05 | −1.43E−06 | 0.00E+00 |
| 23 | −2.14E+01 | −2.92E−02 | 4.93E−03 | −6.84E−04 | 6.24E−05 | −4.40E−06 | 1.88E−07 | 0.00E+00 |
| 24 | 0.00E+00 | 0.00E+00 | 0.00E+00 | 0.00E+00 | 0.00E+00 | 0.00E+00 | 0.00E+00 | 0.00E+00 |
| 25 | 0.00E+00 | 0.00E+00 | 0.00E+00 | 0.00E+00 | 0.00E+00 | 0.00E+00 | 0.00E+00 | 0.00E+00 |

The optical lens assembly of the fourth embodiment includes:

a first lens element having a planar object side surface, a planar image side surface, a thickness of about 0.105 mm, a refractive index of about 1.52, and Abbe number of about 64.2;

a second lens element having an object side surface of a radius of curvature of about −1.7 mm, an image side surface of a radius of curvature of about −2.11 mm, a thickness of about 0.23 mm, a refractive index of about 1.53, and Abbe number of about 55.8;

a third lens element having an object side surface of a radius of curvature of about −2.08 mm, an image side surface of a radius of curvature of about −1.37 mm, a thickness of about 0.187 mm, a refractive index of about 1.53, and Abbe number of about 55.8;

a fourth lens element having an object side surface of a radius of curvature of about 1.53 mm, an image side surface of a radius of curvature of about 1.28 mm, a thickness of about 0.292 mm, a refractive index of about 1.53, and Abbe number of about 55.8;

a fifth lens element having an object side surface of a radius of curvature of about 0.0897 mm, an image side surface of a radius of curvature of about 0.0545 mm, a thickness of about 0.15 mm, a refractive index of about 1.63, and Abbe number of about 23.4;

a sixth lens element having an object side surface of a radius of curvature of about 0.0656 mm, an image side surface of a radius of curvature of about −0.963 mm, a thickness of about 0.202 mm, a refractive index of about 1.54, and Abbe number of about 55.9;

a seventh lens element having an object side surface of a radius of curvature of about 0.535 mm, an image side surface of a radius of curvature of about −0.0777 mm, a thickness of about 0.99 mm, a refractive index of about 1.54, and Abbe number of about 56.2;

an eighth lens element having an object side surface of a radius of curvature of about −0.0129 mm, an image side surface of a radius of curvature of about 0.319 mm, a thickness of about 0.3 mm, a refractive index of about 1.63, and Abbe number of about 23.4;

a ninth lens element having an object side surface of a radius of curvature of about −0.128 mm, an image side surface of a radius of curvature of about −0.186 mm, a thickness of about 0.49 mm, a refractive index of about 1.63, and Abbe number of about 23.4;

a tenth lens element having an object side surface of a radius of curvature of about −0.268 mm, an image side surface of a radius of curvature of about −0.579 mm, a thickness of about 0.89 mm, a refractive index of about 1.54, and Abbe number of about 56.2;

an eleventh lens element having an object side surface of a radius of curvature of about −0.267 mm, an image side surface of a radius of curvature of about 0.298 mm, a thickness of about 0.5 mm, a refractive index of about 1.54, and Abbe number of about 56.2; and a twelfth lens element having a planar object side surface, a planar image side surface, a thickness of about 0.15 mm, a refractive index of about 1.52, and Abbe number of about 64.1, wherein the optical lens assembly comprises an aperture stop positioned between the sixth lens element and the seventh lens element, wherein the aperture stop is a planar element having a thickness of about 0.186 mm.

Example 5

Figure 8A:
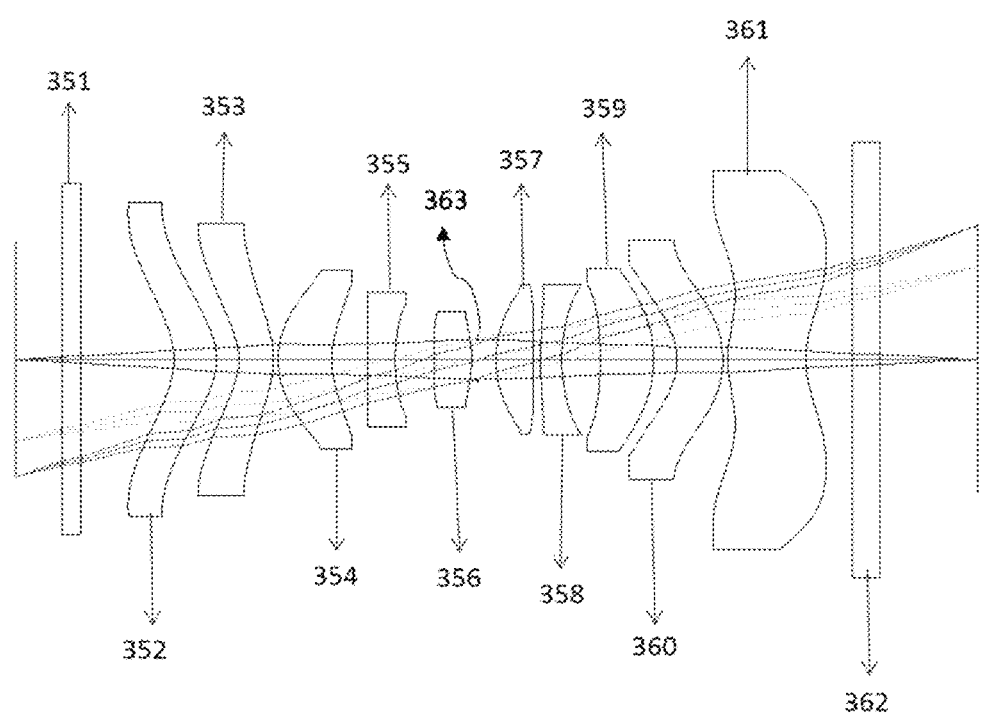

The optical lens assembly (2) in the fifth embodiment comprises twelve lens elements which are sequentially arranged from object side to image side. The aperture stop (363) is located between the sixth and seventh lens elements. First six elements can act as objective assembly. The layout diagram is shown in FIG. 8a.

Figure 8B:
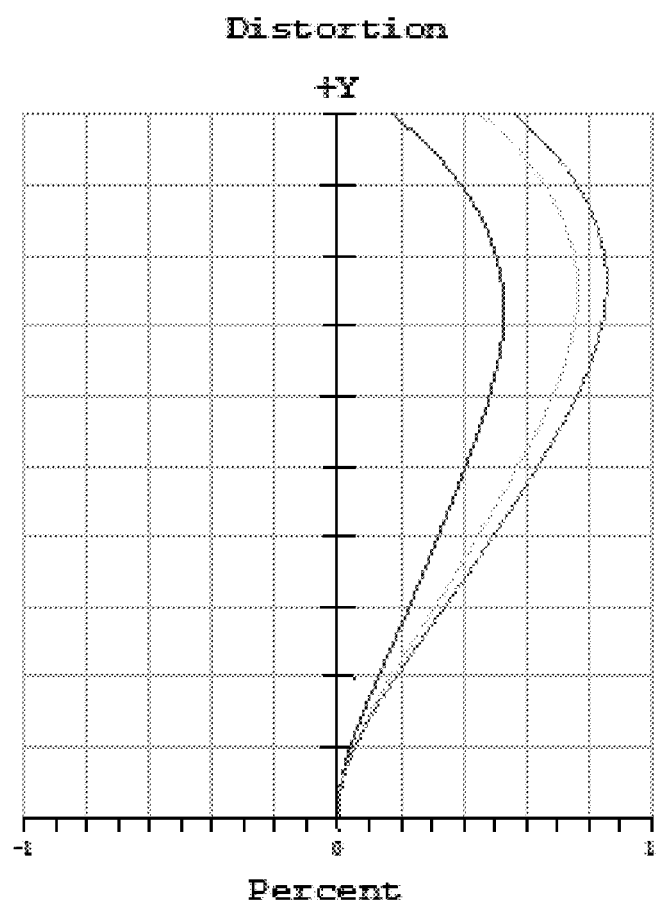
Figure 8C:
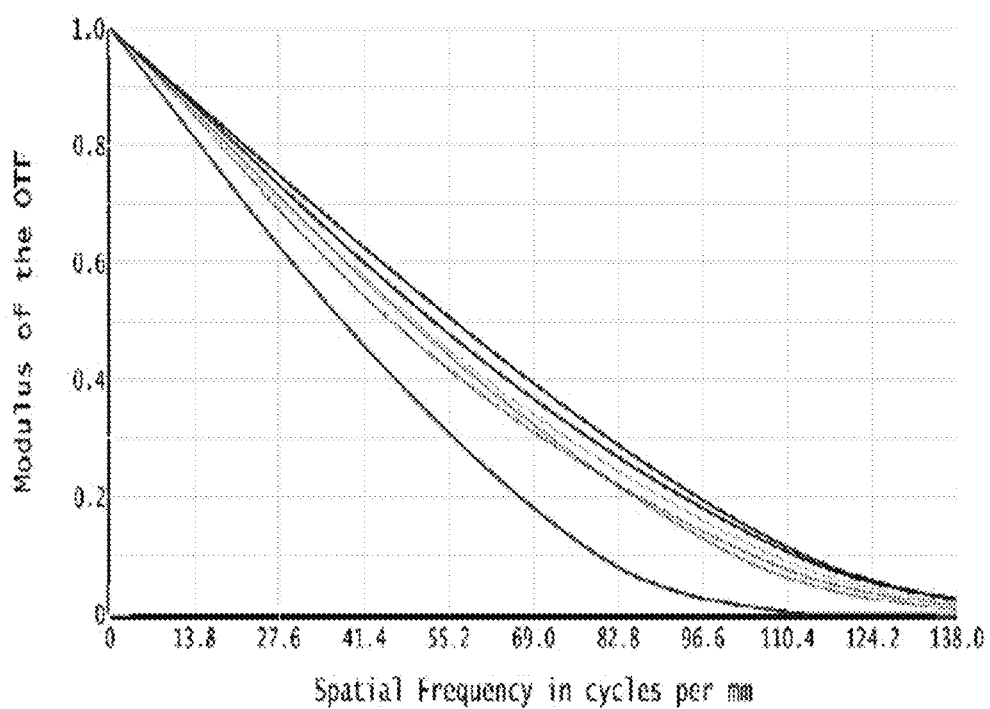

The first lens element (351) is a protective layer or a filter made of glass or plastic or polymer or composite materials having refractive index is greater than 1. The second lens element (352) has a positive refractive power. The image side surface of the second lens element is Convex portion in vicinity of optical axis, concave portion in the vicinity of a periphery of the lens element. The object side surface of second lens element is Concave portion in vicinity of optical axis and convex in the vicinity of a periphery. The third lens element (353) has a negative refractive power. The image side surface of the third lens element is Convex near optical axis and object side surface is Concave near optical axis. The fourth lens element (354) has a positive refractive power. The image side surface of fourth lens element is Concave and object side surface is Convex. The fifth lens element (355) has a negative refractive power. The image side surface of the fifth lens element is concave. The sixth lens element (356) has a positive refractive power. The image side surface of the sixth lens element is Convex and object side surface is Plane or convex. The seventh lens element (357) has a positive refracting power. The object side surface is a convex surface. The eighth lens element (358) has a negative refracting power. The object side surface is a convex surface, and the image side surface is a concave surface. The ninth lens element (359) has a positive refracting power. The object side surface is a concave surface comprising a concave portion in the vicinity of the optical axis. The image side surface is a convex in vicinity of optical axis. The tenth lens element (360) has a negative refracting power. The object side surface is a concave surface, and the image side surface is a convex surface. The eleventh lens element (361) has a refracting power. The object side surface comprises a convex portion in the vicinity of the optical axis and a concave portion in the vicinity of a periphery of the eleventh lens element. The image side surface comprises a concave portion in the vicinity of the optical axis and a convex portion in the vicinity of a periphery of the eleventh lens element. Twelfth lens element (362) is a filter or an IR filter. The optical lens assembly data of the fifth embodiment is shown in Table 5A and the aspheric data is shown in Table 5B. The distortion plot and the MTF plot are shown in FIGS. 8b and 8c. The optical lens assembly of the fifth embodiment has:

Magnification=2×; Numerical aperture=0.041; Focal Length=1.29847 mm; System length=7.63525 mm; HFOV=20 degree; Airy radius=8.818 micron; Depth of field=88.83 micron

TABLE 5A

The optical assembly data for the fifth embodiment

| S. No. | Lens Element Number | Radius of curvature (mm) | Thickness (mm) of lens element OR air gap (mm) with the previous or next element | Refractive Index | Abbe No. |
|---|---|---|---|---|---|
| 0 |  | Infinity | 2.49E−01 |  |  |
| 1 | 1 | Infinity | 1.05E−01 | 1.52 | 64.2 |
| 2 |  | Infinity | 5.01E−01 |  |  |
| 3 | 2 | −1.70E+00 | 2.30E−01 | 1.53 | 55.8 |
| 4 |  | −2.11E+00 | 1.20E−01 |  |  |
| 5 | 3 | −2.08E+00 | 1.87E−01 | 1.53 | 55.8 |
| 6 |  | −1.37E+00 | 2.50E−02 |  |  |
| 7 | 4 | 1.53E+00 | 2.92E−01 | 1.53 | 55.8 |
| 8 |  | 1.28E+00 | 1.92E−01 |  |  |
| 9 | 5 | 8.97E−02 | 1.50E−01 | 1.63 | 23.4 |
| 10 |  | 5.45E−01 | 2.10E−01 |  |  |
| 11 | 6 | 6.56E−02 | 2.02E−01 | 1.54 | 55.9 |
| 12 |  | −9.63E−01 | 3.15E−02 |  |  |
| 13 | Aperture Stop | Infinity | 2.00E−01 |  |  |
| 14 | 7 | 5.93E−01 | 4.03E−01 | 1.54 | 56.1 |
| 15 |  | 6.03E−03 | 7.70E−02 |  |  |
| 16 | 8 | 1.30E−01 | 2.30E−01 | 1.64 | 23.3 |
| 17 |  | 3.68E−01 | 4.09E−01 |  |  |
| 18 | 9 | −1.26E−01 | 5.80E−01 | 1.54 | 56.1 |
| 19 |  | −5.12E−01 | 2.54E−01 |  |  |
| 20 | 10 | −1.10E+00 | 4.94E−01 | 1.64 | 23.3 |
| 21 |  | −6.93E−01 | 5.20E−02 |  |  |
| 22 | 11 | 6.00E−01 | 8.42E−01 | 1.54 | 56.1 |
| 23 |  | 6.76E−01 | 5.00E−01 |  |  |
| 24 | 12 | Infinity | 3.00E−01 | 1.517 | 64.2 |
| 25 |  | Infinity | 1.05E+00 |  |  |

TABLE 5B

The aspheric data for the fifth embodiment

| S.No | Conic | order 4 | order 6 | order 8 | order 10 | order 12 | order 14 | order 16 |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −4.10E+00 | 1.68E−01 | 5.01E−03 | −5.44E−03 | −4.59E−03 | −5.31E−04 | 0.00E+00 | 0.00E+00 |
| 4 | −4.10E+00 | 1.26E−01 | 2.32E−02 | −5.16E−03 | −1.88E−03 | −2.64E−03 | 0.00E+00 | 0.00E+00 |
| 5 | −5.54E+00 | 2.11E−01 | −1.21E−01 | 1.09E−01 | −3.56E−02 | −7.38E−04 | 1.27E−03 | 0.00E+00 |
| 6 | −7.55E+00 | 2.94E−01 | −3.52E−01 | 3.04E−01 | −1.46E−01 | −2.09E−02 | 4.53E−02 | 0.00E+00 |
| 7 | −1.09E+00 | 3.09E−01 | −1.05E+00 | 3.82E−01 | −5.46E+00 | 1.90E+00 | 6.41E+00 | 0.00E+00 |
| 8 | −9.88E+00 | 7.94E−01 | −5.19E+00 | 1.13E+01 | −1.18E+01 | 3.77E+01 | −5.34E+01 | −1.12E+02 |
| 9 | 1.00E+00 | −3.14E−01 | 1.42E+00 | −1.61E−01 | −8.23E+00 | −1.31E+01 | −2.45E+02 | 4.79E+02 |
| 10 | 4.79E−01 | 7.85E−01 | 3.55E+00 | 4.56E+00 | −1.22E+01 | −4.54E+02 | −1.72E+03 | 5.46E+03 |
| 11 | 1.00E+00 | 9.98E−01 | 4.93E+00 | 3.22E+00 | 7.63E+00 | 5.20E+02 | 2.80E+03 | −5.18E+04 |

TABLE 5B-continued

The aspheric data for the fifth embodiment

| S.No | Conic | order 4 | order 6 | order 8 | order 10 | order 12 | order 14 | order 16 |
|---|---|---|---|---|---|---|---|---|
| 12 | 2.35E+00 | 1.49E−01 | 2.61E+00 | 9.55E+00 | 5.65E+01 | 1.28E+02 | 9.01E+02 | 8.23E+03 |
| 13 | 0.00E+00 | 0.00E+00 | 0.00E+00 | 0.00E+00 | 0.00E+00 | 0.00E+00 | 0.00E+00 | 0.00E+00 |
| 14 | −3.37E−01 | 6.14E−03 | 9.04E−03 | −2.16E−02 | 2.27E−02 | −2.81E−02 | 6.64E−03 | −6.60E−03 |
| 15 | 0.00E+00 | −5.30E−03 | −4.06E−02 | 2.14E−02 | −4.85E−02 | 4.50E−03 | −2.59E−03 | 8.88E−03 |
| 16 | 0.00E+00 | −1.74E−02 | −1.77E−02 | 2.22E−02 | −3.67E−02 | −3.22E−02 | 7.15E−02 | −1.85E−02 |
| 17 | −1.95E+00 | 1.43E−02 | 1.01E−02 | 6.00E−02 | −1.13E−01 | 8.13E−02 | 1.76E−02 | −1.75E−02 |
| 18 | 1.28E+01 | −7.43E−02 | −6.88E−03 | 5.88E−02 | −1.05E−01 | 5.02E−02 | −9.33E−03 | 1.59E−02 |
| 19 | −2.94E+01 | −3.63E−01 | 4.11E−01 | −2.96E−01 | 1.50E−01 | −4.73E−02 | −9.06E−03 | 1.08E−02 |
| 20 | −6.57E+00 | −3.22E−01 | 3.02E−01 | −1.73E−02 | −6.57E−02 | −1.57E−02 | 3.50E−02 | −9.88E−03 |
| 21 | −3.74E+00 | −1.50E−01 | 1.02E−01 | −1.39E−02 | 2.37E−03 | −2.86E−03 | 7.57E−04 | −5.47E−05 |
| 22 | −1.41E+01 | −1.46E−01 | 4.38E−02 | −3.63E−03 | −4.38E−04 | 1.03E−04 | −6.37E−06 | 1.16E−07 |
| 23 | −5.52E+00 | −7.82E−02 | 2.38E−02 | −5.50E−03 | 6.72E−04 | −1.31E−05 | −6.90E−06 | 5.82E−07 |
| 24 | 0.00E+00 | 0.00E+00 | 0.00E+00 | 0.00E+00 | 0.00E+00 | 0.00E+00 | 0.00E+00 | 0.00E+00 |
| 25 | 0.00E+00 | 0.00E+00 | 0.00E+00 | 0.00E+00 | 0.00E+00 | 0.00E+00 | 0.00E+00 | 0.00E+00 |

The optical lens assembly of the fifth embodiment includes:
a first lens element having a planar object side surface, a planar image side surface, a thickness of about 0.105 mm, a refractive index of about 1.52, and Abbe number of about 64.2;
a second lens element having an object side surface of a radius of curvature of about −1.70 mm, an image side surface of a radius of curvature of about −2.11 mm, a thickness of about 0.23 mm, a refractive index of about 1.53, and Abbe number of about 55.8;
a third lens element having an object side surface of a radius of curvature of about −2.08 mm, an image side surface of a radius of curvature of about −1.37 mm, a thickness of about 0.187 mm, a refractive index of about 1.53, and Abbe number of about 55.8;
a fourth lens element having an object side surface of a radius of curvature of about 1.53 mm, an image side surface of a radius of curvature of about 1.28 mm, a thickness of about 0.292 mm, a refractive index of about 1.53, and Abbe number of about 55.8;
a fifth lens element having an object side surface of a radius of curvature of about 0.0897 mm, an image side surface of a radius of curvature of about 0.545 mm, a thickness of about 0.15 mm, a refractive index of about 1.63, and Abbe number of about 23.4;
a sixth lens element having an object side surface of a radius of curvature of about 0.0656 mm, an image side surface of a radius of curvature of about −0.963 mm, a thickness of about 0.202 mm, a refractive index of about 1.54, and Abbe number of about 55.9;
a seventh lens element having an object side surface of a radius of curvature of about 0.593 mm, an image side surface of a radius of curvature of about 0.00603 mm, a thickness of about 0.403 mm, a refractive index of about 1.54, and Abbe number of about 56.1;
an eighth lens element having an object side surface of a radius of curvature of about 0.13 mm, an image side surface of a radius of curvature of about 0.368 mm, a thickness of about 0.23 mm, a refractive index of about 1.64, and Abbe number of about 23.3;
a ninth lens element having an object side surface of a radius of curvature of about −0.126 mm, an image side surface of a radius of curvature of about −0.512 mm, a thickness of about 0.58 mm, a refractive index of about 1.54, and Abbe number of about 56.1;
a tenth lens element having an object side surface of a radius of curvature of about −1.1 mm, an image side surface of a radius of curvature of about −0.693 mm, a thickness of about 0.494 mm, a refractive index of about 1.64, and Abbe number of about 23.3;
an eleventh lens element having an object side surface of a radius of curvature of about 0.6 mm, an image side surface of a radius of curvature of about 0.676 mm, a thickness of about 0.842 mm, a refractive index of about 1.54, and Abbe number of about 56.1; and
a twelfth lens element having a planar object side surface, a planar image side surface, a thickness of about 0.3 mm, a refractive index of about 1.517, and Abbe number of about 64.2,
wherein the optical lens assembly comprises an aperture stop positioned between the sixth lens element and the seventh lens element, wherein the aperture stop is a planar element having a thickness of about 0.2 mm.

Example 6

Figure 9A:
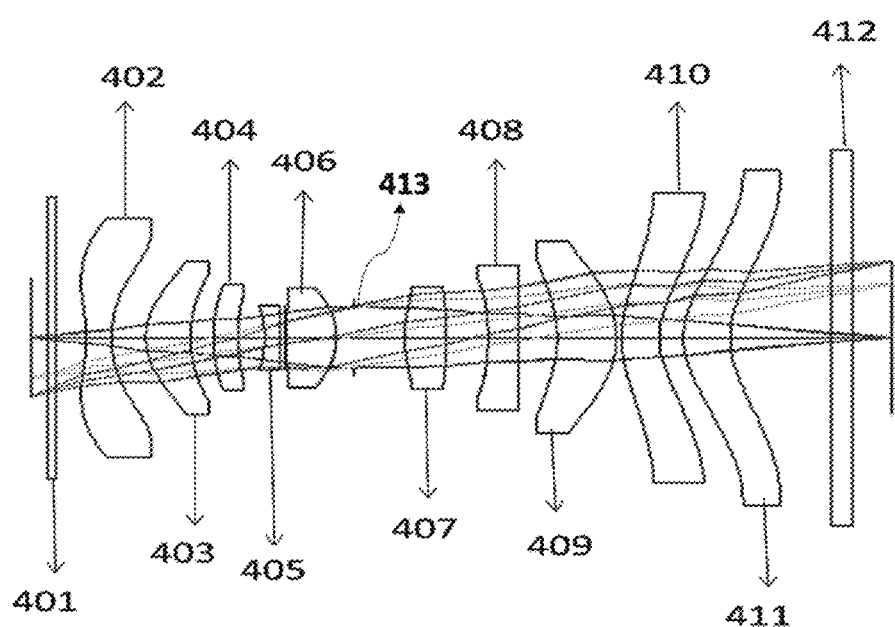

The optical lens assembly (2) in the sixth embodiment comprises twelve lens elements which are sequentially arranged from object side to image side. The aperture stop (413) is located between the sixth and seventh lens elements. First six elements can act as objective assembly. The layout diagram is shown in FIG. 9a.

Figure 9B:
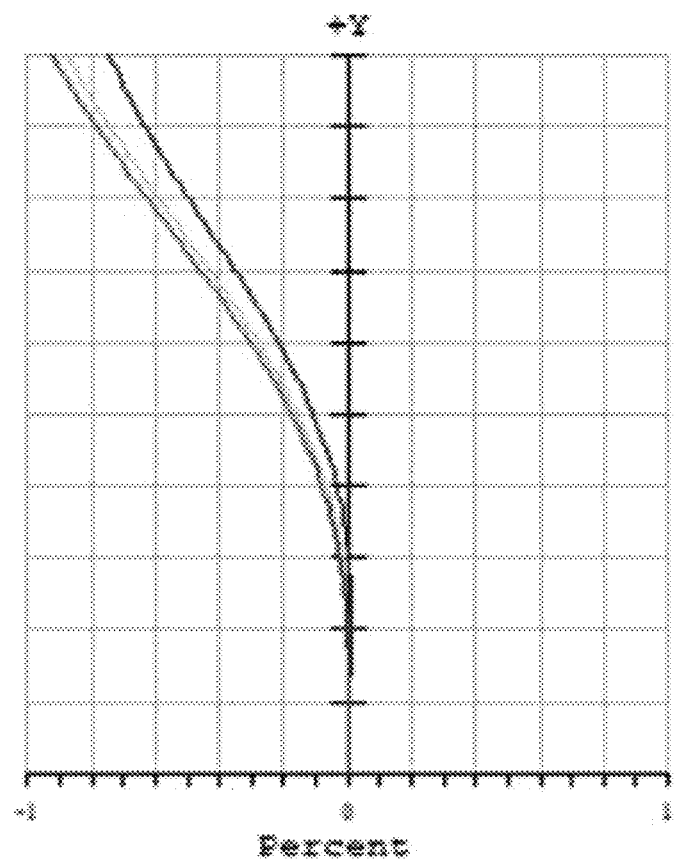
Figure 9C:
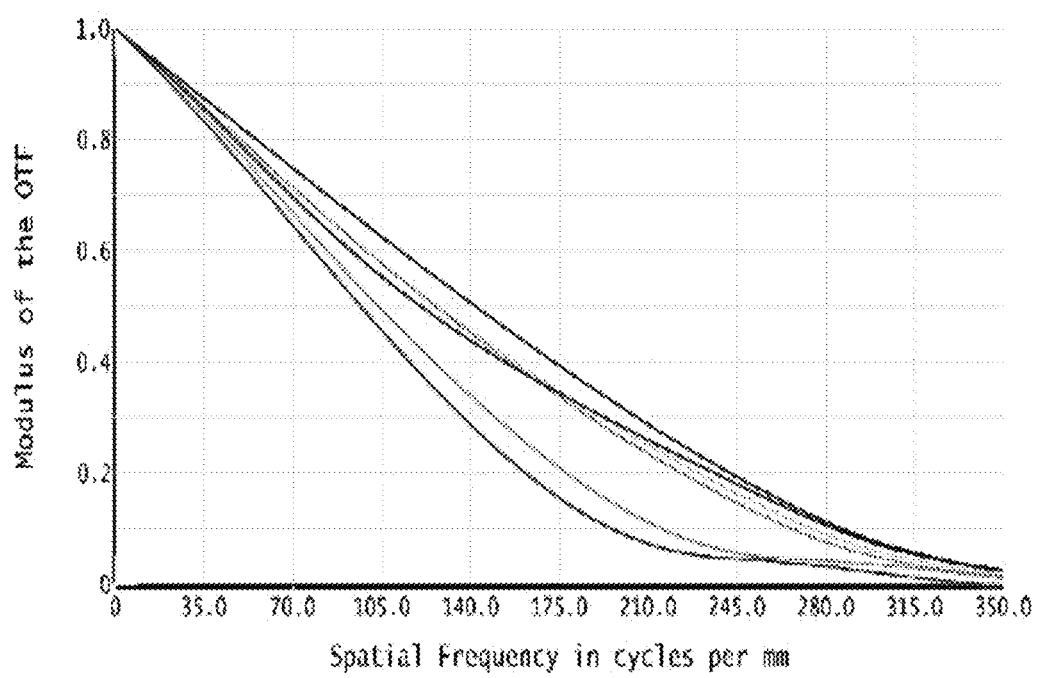

The first lens element (401) is a protective layer or a filter made of glass or plastic or polymer or composite materials having refractive index is greater than 1. The second lens element (402) has negative refractive power. The image side surface of the second lens element is Concave portion in vicinity of optical axis and the object-side is concave in the vicinity of optical axis but convex in the vicinity of periphery. The third lens element (403) has positive refractive power. The object side surface of the third lens element is Convex and image side surface is Concave in vicinity of axis. The fourth lens element (404) has a refractive power. The object side surface of fourth lens element is Convex portion in vicinity of axis and image side surface is concave. The fifth lens element (405) has negative refractive power. The object side surface of the fifth lens element is concave and image side surface is concave surface. The sixth lens element (406) has positive refractive power. The image side surface is Convex portion in vicinity of periphery. The seventh lens element (407) has positive refracting power. The object-side surface is a convex surface and meniscus. The eighth lens element (408) has negative refracting power. The object side surface is a concave surface comprising a concave portion in the vicinity of the optical and is meniscus. The image side surface is a convex surface comprising a convex portion in the vicinity of a periphery of the eighth lens element and is meniscus. The ninth lens element (409) has positive refracting power. The object side surface is a concave surface near the vicinity of the optical axis and is meniscus. The image side surface is convex near the optical axis. The tenth lens element (410) has negative refracting power. The object side surface comprises a convex portion in the vicinity of the optical axis and a concave portion in the vicinity of a periphery of the tenth lens element. The eleventh lens element (411) has positive refracting power. The image side surface comprises a concave portion in the vicinity of the optical axis and a convex portion in the vicinity of a periphery of the eleventh lens element. Twelfth lens element (412) is a filter or an IR filter. The optical lens assembly data of the sixth embodiment is shown in Table 6A and the aspheric data is shown in Table 6B. The distortion plot and the MTF plot are shown in FIGS. 9*b* and 9*c*. The optical lens assembly of the sixth embodiment has:

Magnification=1×; Numerical aperture=0.103; Focal Length=1.45725; System length=8.33162 mm; HFOV=21 degree; Depth of field=55.51 micron; Airy radius=3.487 micron.

TABLE 6A

The optical assembly data for sixth embodiment

| S. No. | Lens Element Number | Radius of curvature (mm) | Thickness (mm) of lens element OR air gap (mm) with the previous or next element | Refractive Index | Abbe No. |
|---|---|---|---|---|---|
| 0 | | Infinity | 1.76E−01 | | |
| 1 | 1 | Infinity | 7.50E−02 | 1.52 | 64.1 |
| 2 | | Infinity | 3.00E−01 | | |
| 3 | 2 | −5.96E−01 | 2.50E−01 | 1.54 | 56.2 |
| 4 | | 5.35E−01 | 3.35E−01 | | |
| 5 | 3 | 1.16E+00 | 4.45E−01 | 1.54 | 56.2 |
| 6 | | 5.36E−01 | 2.25E−01 | | |
| 7 | 4 | 3.73E−01 | 2.45E−01 | 1.63 | 23.4 |
| 8 | | 2.56E−01 | 2.60E−01 | | |
| 9 | 5 | −6.39E−01 | 1.50E−01 | 1.63 | 23.4 |
| 10 | | 2.57E−02 | 6.50E−02 | | |
| 11 | 6 | 1.55E−01 | 4.95E−01 | 1.54 | 56.2 |
| 12 | | −1.07E+00 | 1.75E−01 | | |
| 13 | Aperture stop | Infinity | 5.00E−01 | | |
| 14 | 7 | 4.81E−01 | 4.03E−01 | 1.54 | 55.9 |
| 15 | | −3.28E−02 | 4.19E−01 | | |
| 16 | 8 | −2.72E−01 | 3.00E−01 | 1.63 | 23.4 |
| 17 | | −4.48E−02 | 3.83E−01 | | |
| 18 | 9 | −6.40E−01 | 5.83E−01 | 1.53 | 55.8 |
| 19 | | −7.63E−01 | 5.00E−02 | | |
| 20 | 10 | 6.86E−01 | 3.73E−01 | 1.53 | 55.8 |
| 21 | | 1.04E+00 | 2.39E−01 | | |
| 22 | 11 | 1.05E+00 | 4.60E−01 | 1.53 | 55.8 |
| 23 | | 8.49E−01 | 1.00E+00 | | |
| 24 | 12 | Infinity | 2.10E−01 | 1.52 | 64.2 |
| 25 | | Infinity | 3.89E−01 | | |

TABLE 6B

The Aspheric data for sixth embodiment

| S. No | Conic | $4^{th}$ order | $6^{th}$ order | $8^{th}$ order | $10^{th}$ order | $12^{th}$ order | $14^{th}$ order | $16^{th}$ order |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −2.14E+01 | 2.34E−01 | −1.58E−01 | 8.75E−02 | −3.19E−02 | 9.02E−03 | −1.54E−03 | 0.00E+00 |
| 4 | −2.03E+00 | 2.83E−01 | −3.01E−01 | 5.21E−02 | 7.44E−02 | −5.49E−02 | 1.17E−02 | 0.00E+00 |
| 5 | −3.57E+00 | 2.87E−01 | −3.31E−01 | 2.62E−01 | −1.85E−01 | 6.69E−03 | 6.12E−03 | 0.00E+00 |
| 6 | 3.07E−01 | 6.83E−02 | −8.54E−02 | 8.80E−02 | −2.25E−02 | −1.84E−01 | −2.37E−03 | 0.00E+00 |
| 7 | 2.99E+00 | 1.81E−01 | −9.73E−02 | −2.81E−01 | 1.37E−01 | 2.99E−01 | −8.68E−01 | 0.00E+00 |
| 8 | 8.25E+00 | 3.46E−01 | 1.29E−01 | −2.01E+00 | 1.92E+00 | 1.82E+01 | −6.25E+01 | 0.00E+00 |
| 9 | −2.30E+00 | −1.81E−01 | −1.74E+00 | 4.21E+00 | −1.24E+01 | 2.50E+00 | −2.41E+00 | 0.00E+00 |
| 10 | −3.00E+01 | −6.62E−02 | −1.34E+00 | 3.40E+00 | 3.53E+00 | −1.96E+01 | −6.02E−01 | 0.00E+00 |
| 11 | −3.00E+01 | −3.58E−02 | −1.90E−01 | 2.68E−01 | 4.47E+00 | 1.02E+01 | −5.66E+01 | 0.00E+00 |
| 12 | 8.61E−02 | 2.95E−02 | 3.66E−02 | 3.74E−01 | −3.40E−01 | −7.22E−01 | 5.84E+00 | 0.00E+00 |
| 13 | 0.00E+00 | 0.00E+00 | 0.00E+00 | 0.00E+00 | 0.00E+00 | 0.00E+00 | 0.00E+00 | 0.00E+00 |
| 14 | −2.35E+00 | −1.86E−02 | −8.14E−02 | −7.46E−02 | −1.10E−01 | −6.27E−02 | −1.10E−01 | 2.51E−01 |
| 15 | 1.00E+00 | −1.25E−01 | −1.54E−01 | −2.52E−02 | −1.49E−02 | −2.54E−01 | −3.42E−01 | 1.58E+00 |
| 16 | 4.79E−01 | −9.81E−02 | −1.11E−01 | −3.56E−02 | 2.38E−02 | 2.22E−01 | 2.09E−01 | −1.67E−01 |
| 17 | 1.00E+00 | 3.93E−02 | −4.43E−02 | 1.25E−03 | 1.61E−02 | 6.40E−03 | 2.99E−02 | −1.46E−02 |
| 18 | −9.88E+00 | −9.92E−02 | 1.62E−01 | −8.81E−02 | 2.30E−02 | −1.84E−01 | 6.52E−03 | 3.43E−03 |
| 19 | −1.09E+00 | −3.86E−02 | 3.29E−02 | −2.99E−03 | 1.07E−02 | −9.28E−04 | −7.82E−04 | 0.00E+00 |
| 20 | −7.55E+00 | −3.67E−02 | 1.10E−02 | −2.38E−03 | 2.84E−04 | 1.02E−05 | −5.54E−06 | 0.00E+00 |
| 21 | −5.54E+00 | −2.63E−02 | 3.80E−03 | −8.51E−04 | 6.95E−05 | 3.60E−07 | −1.55E−07 | 0.00E+00 |
| 22 | −4.10E+00 | −1.58E−02 | −7.24E−04 | 4.03E−05 | 3.68E−06 | 1.29E−06 | 0.00E+00 | 0.00E+00 |
| 23 | −4.10E+00 | −2.10E−02 | −1.57E−04 | 4.25E−05 | 8.96E−06 | 2.59E−07 | 0.00E+00 | 0.00E+00 |
| 24 | 0.00E+00 | 0.00E+00 | 0.00E+00 | 0.00E+00 | 0.00E+00 | 0.00E+00 | 0.00E+00 | 0.00E+00 |
| 25 | 0.00E+00 | 0.00E+00 | 0.00E+00 | 0.00E+00 | 0.00E+00 | 0.00E+00 | 0.00E+00 | 0.00E+00 |

The optical lens assembly of the sixth embodiment includes:
a first lens element having a planar object side surface, a planar image side surface, a thickness of about 0.075 mm, a refractive index of about 1.52, and Abbe number of about 64.1;
a second lens element having an object side surface of a radius of curvature of about −0.596 mm, an image side surface of a radius of curvature of about 0.535 mm, a thickness of about 0.25 mm, a refractive index of about 1.54, and Abbe number of about 56.2;
a third lens element having an object side surface of a radius of curvature of about 1.16 mm, an image side surface of a radius of curvature of about 0.536 mm, a thickness of about 0.445 mm, a refractive index of about 1.54, and Abbe number of about 56.2;
a fourth lens element having an object side surface of a radius of curvature of about 0.373 mm, an image side surface of a radius of curvature of about 0.256 mm, a thickness of about 0.245 mm, a refractive index of about 1.63, and Abbe number of about 23.4;
a fifth lens element having an object side surface of a radius of curvature of about −0.639 mm, an image side surface of a radius of curvature of about 0.0257 mm, a thickness of about 0.15 mm, a refractive index of about 1.63, and Abbe number of about 23.4;
a sixth lens element having an object side surface of a radius of curvature of about 0.155 mm, an image side surface of a radius of curvature of about −1.07 mm, a thickness of about 0.495 mm, a refractive index of about 1.54, and Abbe number of about 56.2;
a seventh lens element having an object side surface of a radius of curvature of about 0.481 mm, an image side surface of a radius of curvature of about −0.0328 mm, a thickness of about 0.403 mm, a refractive index of about 1.54, and Abbe number of about 55.9;
an eighth lens element having an object side surface of a radius of curvature of about −0.272 mm, an image side surface of a radius of curvature of about −0.0448 mm, a thickness of about 0.30 mm, a refractive index of about 1.63, and Abbe number of about 23.4;
a ninth lens element having an object side surface of a radius of curvature of about −0.64 mm, an image side surface of a radius of curvature of about −0.763 mm, a thickness of about 0.583 mm, a refractive index of about 1.53, and Abbe number of about 55.8;
a tenth lens element having an object side surface of a radius of curvature of about 0.686 mm, an image side surface of a radius of curvature of about 1.04 mm, a thickness of about 0.373 mm, a refractive index of about 1.53, and Abbe number of about 55.8;
an eleventh lens element having an object side surface of a radius of curvature of about 1.05 mm, an image side surface of a radius of curvature of about 0.849 mm, a thickness of about 0.46 mm, a refractive index of about 1.53, and Abbe number of about 55.8; and
a twelfth lens element having a planar object side surface, a planar image side surface, a thickness of about 0.21 mm, a refractive index of about 1.52, and Abbe number of about 64.2,
wherein the optical lens assembly comprises an aperture stop positioned between the sixth lens element and the seventh lens element, wherein the aperture stop is a planar element having a thickness of about 0.50 mm.

Example 7

Figure 10A:
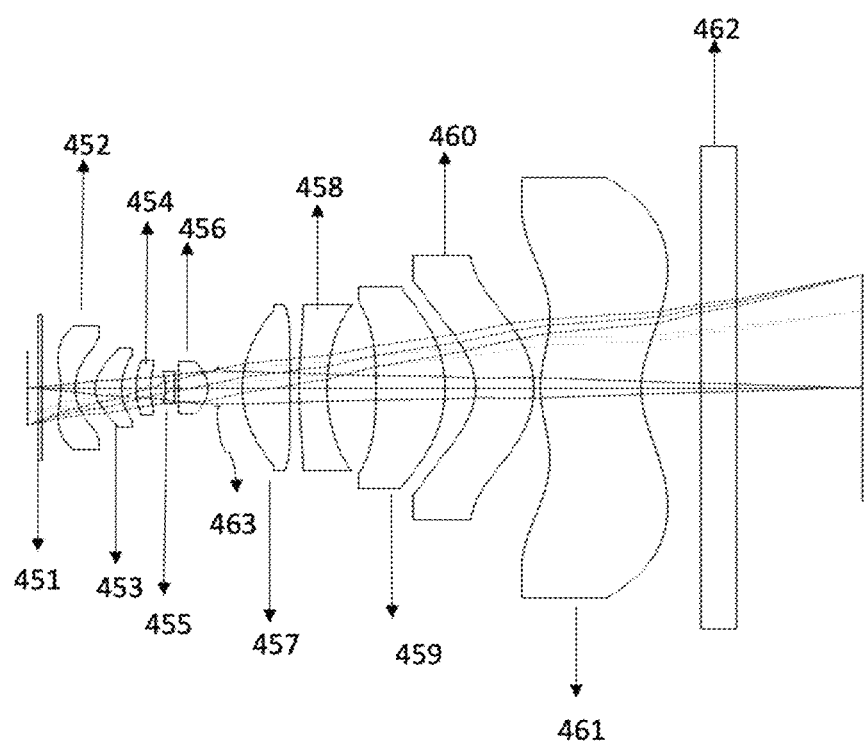

The optical lens assembly (2) in the seventh embodiment comprises twelve lens elements which are sequentially arranged from object side to image side. The aperture stop (463) is located between the sixth and seventh lens elements. First six elements can act as objective assembly. The layout diagram is shown in FIG. 10a.

Figure 10B:
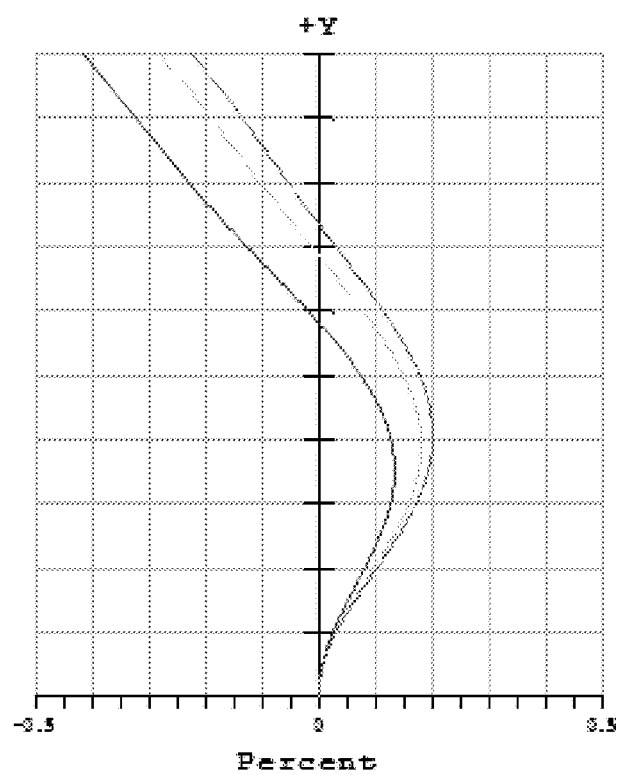
Figure 10C:
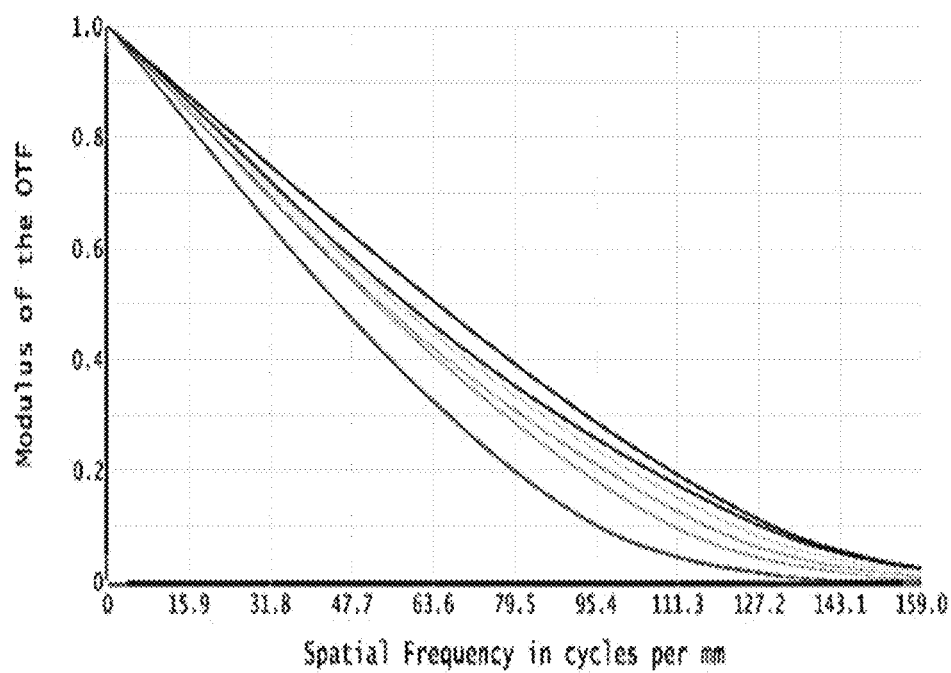

The first lens element (451) is a protective layer or a filter made of glass or plastic or polymer or composite materials having refractive index is greater than 1. The second lens element (452) has negative refractive power. The image side surface of the second lens element is Concave portion in vicinity of optical axis and the object side is concave in the vicinity of optical axis but convex in the vicinity of periphery. The third lens element (453) has positive refractive power. The object side surface of the third lens element is Convex and image side surface is Concave in vicinity of axis. The fourth lens element (454) has refractive power. The object side surface of fourth lens element is Convex portion in vicinity of axis and image side surface is concave. The fifth lens element (455) has negative refractive power. The object side surface of the fifth lens element is concave and image side surface is concave surface. The sixth lens element (456) has positive refractive power. The image side surface is Convex portion in vicinity of periphery. The seventh lens element (457) has positive refracting power. The object side surface is a convex surface. The eighth lens element (458) has negative refracting power. The object side surface is a convex surface, and the image side surface is a concave surface. The ninth lens element (459) has positive refracting power. The object side surface is a concave surface comprising a concave portion in the vicinity of the optical axis. The image side surface is a convex in vicinity of optical axis. The tenth lens element (460) has negative refracting power. The object side surface is a concave surface, and the image side surface is a convex surface. The eleventh lens element (461) has a refracting power. The object side surface comprises a convex portion in the vicinity of the optical axis and a concave portion in the vicinity of a periphery of the eleventh lens element. The image side surface comprises a concave portion in the vicinity of the optical axis and a convex portion in the vicinity of a periphery of the eleventh lens element. Twelfth lens element (462) is a filter or an IR filter. The optical lens assembly data of the seventh embodiment is shown in Table 7A and the aspheric data is shown in Table 7B. The distortion plot and the MTF plot are shown in FIGS. 10b and 10c. The optical lens assembly of the seventh embodiment has:

Magnification=3×; Numerical aperture=0.047; Focal Length=0.8999245 mm; System length=6.89459 mm; HFOV=25 degree; Airy radius=7.673 micron; Depth of field=28.8898 micron

TABLE 7A

The optical assembly data for seventh embodiment

| S. No. | Lens Element Number | Radius of curvature (mm) | Thickness (mm) of lens element OR air gap (mm) with the previous or next element | Refractive Index | Abbe No. |
|---|---|---|---|---|---|
| 0 | | Infinity | 8.77E−02 | | |
| 1 | 1 | Infinity | 3.75E−02 | 1.52 | 64.1 |
| 2 | | Infinity | 1.50E−01 | | |
| 3 | 2 | −1.19E+00 | 1.25E−01 | 1.54 | 56.2 |
| 4 | | 1.07E+00 | 1.68E−01 | | |
| 5 | 3 | 2.32E+00 | 2.23E−01 | 1.54 | 56.2 |
| 6 | | 1.07E+00 | 1.13E−01 | | |
| 7 | 4 | 7.46E−01 | 1.23E−01 | 1.63 | 23.4 |

TABLE 7A-continued

The optical assembly data for seventh embodiment

| S. No. | Lens Element Number | Radius of curvature (mm) | Thickness (mm) of lens element OR air gap (mm) with the previous or next element | Refractive Index | Abbe No. |
|---|---|---|---|---|---|
| 8 | | 5.13E−01 | 1.30E−01 | | |
| 9 | 5 | −1.28E+00 | 7.50E−02 | 1.63 | 23.4 |
| 10 | | 5.14E−02 | 2.50E−02 | | |
| 11 | 6 | 3.11E−01 | 2.48E−01 | 1.54 | 56.2 |
| 12 | | −2.14E+00 | 8.77E−02 | | |
| 13 | Aperture stop | Infinity | 2.00E−01 | | |
| 14 | 7 | 5.93E−01 | 4.03E−01 | 1.54 | 56.1 |
| 15 | | 6.03E−03 | 7.70E−02 | | |
| 16 | 8 | 1.30E−01 | 2.30E−01 | 1.64 | 23.4 |
| 17 | | 3.68E−01 | 4.09E−01 | | |
| 18 | 9 | −1.26E−01 | 5.80E−01 | 1.54 | 56.1 |
| 19 | | −5.12E−01 | 2.54E−01 | | |
| 20 | 10 | −1.10E+00 | 4.94E−01 | 1.64 | 23.4 |
| 21 | | −6.93E−01 | 5.20E−02 | | |
| 22 | 11 | 6.00E−01 | 8.42E−01 | 1.54 | 56.1 |
| 23 | | 6.76E−01 | 5.00E−01 | | |
| 24 | 12 | Infinity | 3.00E−01 | 1.517 | 64.2 |
| 25 | | Infinity | 1.05E+00 | | |

TABLE 7B

Aspheric data for the seventh embodiment

| S.No | Conic | order 4 | order 6 | order8 | order 10 | order 12 | order 14 | order 16 |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | −2.14E+01 | 1.87E+00 | −5.05E+00 | 1.12E+01 | −1.63E+01 | 1.85E+01 | −1.26E+01 | 0.00E+00 |
| 4 | −2.03E+00 | 2.26E+00 | −9.62E+00 | 6.67E+00 | 3.81E+01 | −1.12E+02 | 9.59E+01 | 0.00E+00 |
| 5 | −3.57E+00 | 2.30E+00 | −1.06E+01 | 3.36E+01 | −9.49E+01 | 1.37E+01 | 5.01E+01 | 0.00E+00 |
| 6 | 3.07E−01 | 5.47E−01 | −2.73E+00 | 1.13E+01 | −1.15E+01 | −3.76E+02 | −1.94E+01 | 0.00E+00 |
| 7 | 2.99E+00 | 1.44E+00 | −3.11E+00 | −3.59E+01 | 7.02E+01 | 6.12E+02 | −7.11E+03 | 0.00E+00 |
| 8 | 8.25E+00 | 2.77E+00 | 4.13E+00 | −2.57E+02 | 9.83E+02 | 3.72E+04 | −5.12E+05 | 0.00E+00 |
| 9 | −2.30E+00 | −1.45E+00 | −5.57E+01 | 5.39E+02 | −6.35E+03 | 5.13E+03 | −1.97E+04 | 0.00E+00 |
| 10 | −3.00E+01 | −5.29E−01 | −4.29E+01 | 4.35E+02 | 1.81E+03 | −4.01E+04 | −4.94E+03 | 0.00E+00 |
| 11 | −3.00E+01 | −2.86E−01 | −6.08E+00 | 3.42E+01 | 2.29E+03 | 2.09E+04 | −4.64E+05 | 0.00E+00 |
| 12 | 8.61E−02 | 2.36E−01 | 1.17E+00 | 4.79E+01 | −1.74E+02 | −1.48E+03 | 4.78E+04 | 0.00E+00 |
| 13 | 0.00E+00 | 0.00E+00 | 0.00E+00 | 0.00E+00 | 0.00E+00 | 0.00E+00 | 0.00E+00 | 0.00E+00 |
| 14 | −3.37E−01 | 6.14E−03 | 9.04E−03 | −2.16E−02 | 2.27E−02 | −2.81E−02 | 6.64E−03 | −6.60E−03 |
| 15 | 0.00E+00 | −5.30E−03 | −4.06E−02 | 2.14E−02 | −4.85E−02 | 4.50E−03 | −2.59E−03 | 8.88E−03 |
| 16 | 0.00E+00 | −1.74E−02 | −1.77E−02 | 2.22E−02 | −3.67E−02 | −3.22E−02 | 7.15E−03 | −1.85E−02 |
| 17 | −1.95E+00 | 1.43E−02 | 1.01E−02 | 6.00E−02 | −1.13E−01 | 8.13E−02 | 1.76E−02 | −1.75E−02 |
| 18 | 1.28E+01 | −7.43E−02 | −6.88E−03 | 5.88E−02 | −1.05E−01 | 5.02E−02 | −9.33E−03 | 1.59E−02 |
| 19 | −2.94E+01 | −3.63E−01 | 4.11E−01 | −2.96E−01 | 1.50E−01 | −4.73E−02 | −9.06E−03 | 1.08E−02 |
| 20 | −6.57E+00 | −3.22E−01 | 3.02E−01 | −1.73E−02 | −6.57E−02 | −1.57E−02 | 3.50E−02 | −9.88E−03 |
| 21 | −3.74E+00 | −1.50E−01 | 1.02E−01 | −1.39E−02 | 2.37E−03 | −2.86E−03 | 7.57E−04 | −5.47E−05 |
| 22 | −1.41E+01 | −1.46E−01 | 4.38E−02 | −3.63E−03 | −4.38E−04 | 1.03E−04 | −6.37E−06 | 1.16E−07 |
| 23 | −5.52E+00 | −7.82E−02 | 2.38E−02 | −5.50E−03 | 6.72E−04 | −1.31E−05 | −6.90E−06 | 5.82E−07 |
| 24 | 0.00E+00 | 0.00E+00 | 0.00E+00 | 0.00E+00 | 0.00E+00 | 0.00E+00 | 0.00E+00 | 0.00E+00 |
| 25 | 0.00E+00 | 0.00E+00 | 0.00E+00 | 0.00E+00 | 0.00E+00 | 0.00E+00 | 0.00E+00 | 0.00E+00 |

The optical lens assembly of the seventh embodiment includes:

a first lens element having a planar object side surface, a planar image side surface, a thickness of about 0.375 mm, a refractive index of about 1.52, and Abbe number of about 64.1;

a second lens element having an object side surface of a radius of curvature of about −1.19 mm, an image side surface of a radius of curvature of about 1.07 mm, a thickness of about 0.125 mm, a refractive index of about 1.54, and Abbe number of about 56.2;

a third lens element having an object side surface of a radius of curvature of about 2.32 mm, an image side surface of a radius of curvature of about 1.07 mm, a thickness of about 0.223 mm, a refractive index of about 1.54, and Abbe number of about 56.2;

a fourth lens element having an object side surface of a radius of curvature of about 0.746 mm, an image side surface of a radius of curvature of about 0.513 mm, a thickness of about 0.123 mm, a refractive index of about 1.63, and Abbe number of about 23.4;

a fifth lens element having an object side surface of a radius of curvature of about −1.28 mm, an image side surface of a radius of curvature of about 0.0514 mm, a thickness of about 0.075 mm, a refractive index of about 1.63, and Abbe number of about 23.4;

a sixth lens element having an object side surface of a radius of curvature of about 0.311 mm, an image side surface of a radius of curvature of about −2.14 mm, a thickness of about 0.248 mm, a refractive index of about 1.54, and Abbe number of about 56.2;

a seventh lens element having an object side surface of a radius of curvature of about 0.593 mm, an image side surface of a radius of curvature of about 0.00603 mm, a thickness of about 0.403 mm, a refractive index of about 1.54, and Abbe number of about 56.1;

an eighth lens element having an object side surface of a radius of curvature of about 0.13 mm, an image side surface of a radius of curvature of about 0.368 mm, a thickness of about 0.23 mm, a refractive index of about 1.64, and Abbe number of about 23.4;

a ninth lens element having an object side surface of a radius of curvature of about −0.126 mm, an image side surface of a radius of curvature of about −0.512 mm, a thickness of about 0.58 mm, a refractive index of about 1.54, and Abbe number of about 56.1;

a tenth lens element having an object side surface of a radius of curvature of about −1.1 mm, an image side surface of a radius of curvature of about −0.693 mm, a thickness of about 0.494 mm, a refractive index of about 1.64, and Abbe number of about 23.4;
an eleventh lens element having an object side surface of a radius of curvature of about 0.6 mm, an image side surface of a radius of curvature of about 0.676 mm, a thickness of about 0.842 mm, a refractive index of about 1.54, and Abbe number of about 56.1; and
a twelfth lens element having a planar object side surface, a planar image side surface, a thickness of about 0.30 mm, a refractive index of about 1.517, and Abbe number of about 64.2,
wherein the optical lens assembly comprises an aperture stop positioned between the sixth lens element and the seventh lens element, wherein the aperture stop is a planar element having a thickness of about 0.20 mm.

Example 8

Figure 11A:
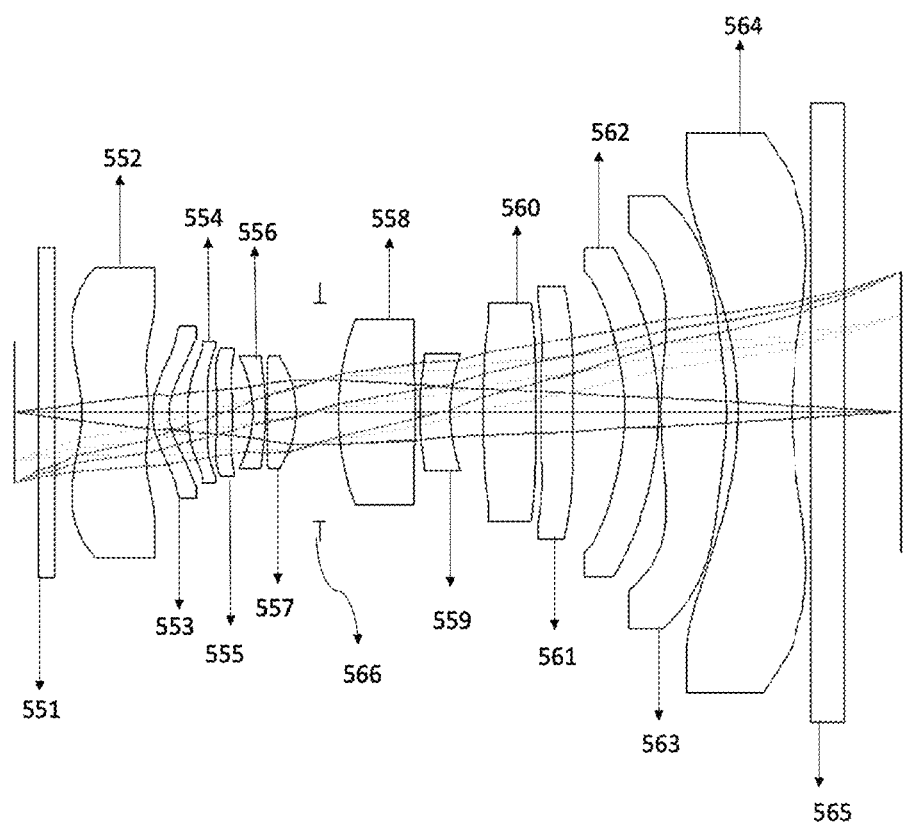

The optical lens assembly (2) in the eight embodiment comprises fifteen lens elements which are sequentially arranged from object side to image side. The aperture stop (566) is located between the seventh and eighth lens elements. First seven elements can act as objective assembly. The layout diagram is shown in FIG. 11a.

Figure 11B:
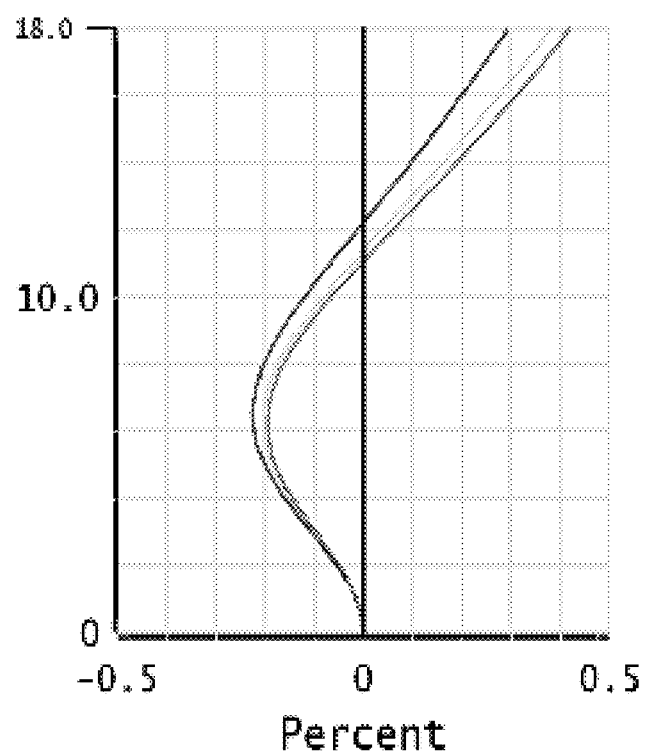
Figure 11C:
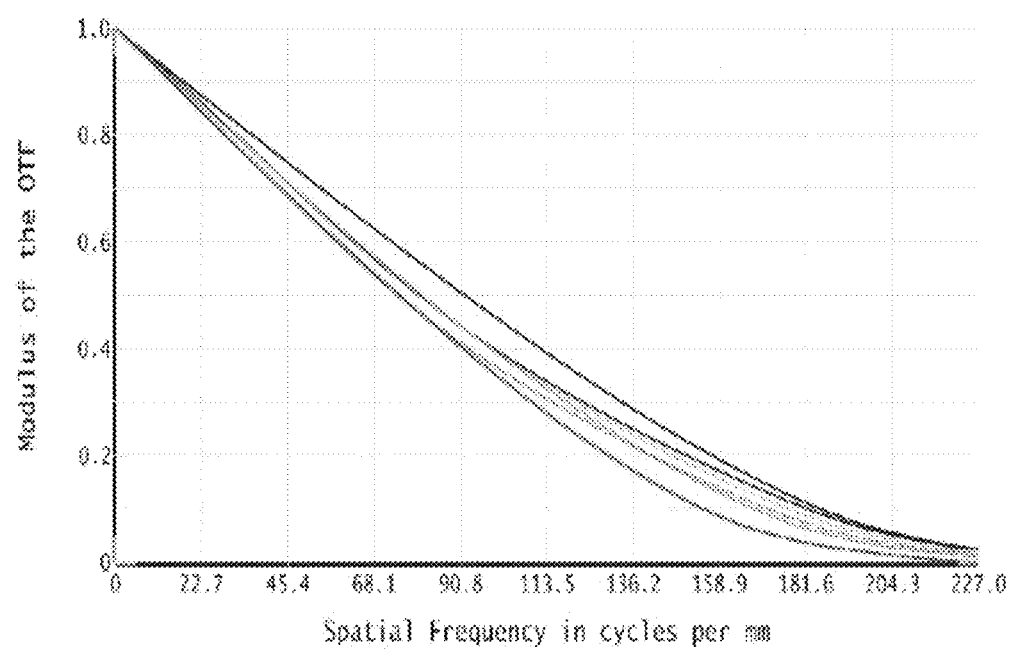

The first lens element (551) is a protective layer or a filter made of glass or plastic or polymer or composite materials having refractive index is greater than 1. The second lens element (552) has refractive power. The object side surface is concave in the vicinity of the axis and is convex near the periphery. The image side surface is convex near the optical axis and concave near the vicinity of the periphery. The third lens element (553) has negative refractive power. The object side surface is convex in the vicinity of the axis. The image side surface is concave near the optical axis. The fourth lens element (554) has refractive power. The object side surface of fourth lens element is convex and image side surface is concave. The fifth lens element (555) has a refractive power. The image side surface is a concave surface. The sixth lens element (556) has negative refractive power. The object side surface is a concave surface. The seventh lens element (557) has positive refracting power. The image side surface is a convex surface. The eighth lens element (558) has positive refractive power. The object side surface is a convex surface. The ninth lens element (559) has positive refractive power. The image side surface is a concave surface. The tenth lens element (560) element has negative refractive power. The eleventh lens element (561) has a refracting power. The object side surface is a concave surface. The twelfth lens element (562) has a refractive power. The object side surface is a concave surface, and the image side surface is a convex surface. The thirteenth lens element (563) has negative refracting power. The object side surface comprises a convex portion in the vicinity of the optical axis and is concave near the periphery. The image side surface comprises a convex surface. The fourteenth lens element (564) has a refracting power. The object side surface comprises a concave portion in the vicinity of the optical axis and a convex portion in the vicinity of the periphery. The image side surface comprises a concave portion in the vicinity of optical axis and a convex portion in the vicinity of the periphery of the lens element. The fifteenth lens element (565) is a filter or an IR filter. The optical lens assembly data of the eight embodiment is shown in Table 8A and the aspheric data is shown in Table 8B. The distortion plot and the MTF plot are shown in FIGS. 11b and 11c. The optical lens assembly of the eight embodiment has: Magnification=1×; Numerical aperture=0.068; Focal Length=1.0786; WFNO=7.501; System length=8.189 mm; HFOV=18 degree; HFOV; Depth of focus=132.11 micron; Airy radius=5.378 micron.

TABLE 8A

The optical assembly data for eighth embodiment

| S. No. | Lens Element Number | Radius of curvature (mm) | Thickness (mm) of lens element OR air gap (mm) with the previous or next element | Refractive Index | Abbe No. |
|---|---|---|---|---|---|
| 0 |  | Infinity | 2.25E−01 |  |  |
| 1 | 1 | Infinity | 1.50E−01 | 1.52 | 64.2 |
| 2 |  | Infinity | 2.50E−01 |  |  |
| 3 | 2 | −1.03E+00 | 6.15E−01 | 1.54 | 55.9 |
| 4 |  | −8.72E−01 | 3.60E−02 |  |  |
| 5 | 3 | 1.74E+00 | 1.50E−01 | 1.64 | 23.3 |
| 6 |  | 2.44E+00 | 1.74E−01 |  |  |
| 7 | 4 | 8.02E−01 | 1.80E−01 | 1.54 | 55.9 |
| 8 |  | 9.74E−03 | 9.30E−02 |  |  |
| 9 | 5 | −4.04E−01 | 1.37E−01 | 1.54 | 55.9 |
| 10 |  | −2.53E−01 | 1.90E−01 |  |  |
| 11 | 6 | −1.19E+00 | 1.20E−01 | 1.64 | 23.3 |
| 12 |  | −6.57E−01 | 1.80E−02 |  |  |
| 13 | 7 | −4.19E−02 | 2.62E−01 | 1.54 | 55.9 |
| 14 |  | −1.18E+00 | 2.25E−01 |  |  |
| 15 | Aperture stops | Infinity | 1.66E−01 |  |  |
| 16 | 8 | 4.72E−01 | 7.06E−01 | 1.53 | 56.2 |
| 17 |  | −1.19E−01 | 4.50E−02 |  |  |
| 18 | 9 | 4.30E−01 | 2.80E−01 | 1.64 | 23.9 |
| 19 |  | 7.87E−01 | 3.04E−01 |  |  |
| 20 | 10 | 8.70E−02 | 4.88E−01 | 1.53 | 56.2 |
| 21 |  | −6.77E−02 | 4.00E−02 |  |  |
| 22 | 11 | 1.40E−01 | 3.00E−01 | 1.53 | 56.2 |
| 23 |  | 3.58E−03 | 4.79E−01 |  |  |
| 24 | 12 | −5.80E−01 | 3.08E−01 | 1.64 | 23.9 |
| 25 |  | −4.08E−01 | 2.50E−02 |  |  |
| 26 | 13 | 3.05E−01 | 6.03E−01 | 1.53 | 56.2 |
| 27 |  | −4.39E−01 | 1.06E−01 |  |  |
| 28 | 14 | −3.61E−01 | 5.00E−01 | 1.53 | 56.2 |
| 29 |  | 5.16E−01 | 2.00E−01 |  |  |
| 30 | 15 | Infinity | 3.00E−01 | 1.52 | 64.2 |
| 31 |  | Infinity | 5.17E−01 |  |  |

TABLE 8B

The Aspheric data for eighth embodiment

| S. No. | Conic | Order 2 | Order 4 | Order 6 | Order 8 | Order 10 | Order 12 | Order 14 | Order 16 |
|---|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 | 0.00E+00 |
| 3 | −9.11E+00 | 0.00E+00 | 4.15E−01 | −6.53E−01 | 1.06E+00 | −1.15E+00 | 7.89E−01 | −3.00E−01 | 4.70E−02 |
| 4 | −3.16E+01 | 0.00E+00 | 1.03E+00 | −2.24E+00 | 5.36E+00 | −1.08E+01 | 1.21E+01 | −6.73E+00 | 1.47E+00 |
| 5 | −8.17E−01 | 0.00E+00 | −1.08E+00 | 1.21E+00 | −2.26E+00 | −4.32E+00 | 6.56E+00 | 2.08E+01 | −2.68E+01 |

TABLE 8B-continued

The Aspheric data for eighth embodiment

| S. No. | Conic | Order 2 | Order 4 | Order 6 | Order 8 | Order 10 | Order 12 | Order 14 | Order 16 |
|---|---|---|---|---|---|---|---|---|---|
| 6 | −3.79E+00 | 0.00E+00 | 3.97E−01 | 4.54E−01 | −1.55E+01 | 2.70E+01 | 2.18E+01 | −3.95E+01 | −1.31E+01 |
| 7 | 1.64E+00 | 0.00E+00 | 3.52E−01 | 5.65E−01 | −3.49E+00 | −1.87E+01 | 7.33E+00 | 5.40E+01 | 0.00E+00 |
| 8 | −4.00E+01 | 0.00E+00 | 7.77E−01 | 1.79E−01 | −8.55E−01 | 1.87E+01 | 1.67E+01 | −7.50E+02 | 1.59E+03 |
| 9 | 0.00E+00 | 0.00E+00 | 6.28E−01 | 3.47E−01 | 3.39E+00 | −7.31E−01 | 5.34E−07 | 0.00E+00 | 0.00E+00 |
| 10 | 0.00E+00 | 0.00E+00 | 5.64E−01 | 1.37E+00 | −7.81E+00 | 2.17E+01 | 8.19E−08 | 0.00E+00 | 0.00E+00 |
| 11 | −5.06E+00 | 0.00E+00 | −2.03E−02 | −1.35E+00 | −1.21E+01 | 1.17E+02 | −3.14E+02 | 1.99E+02 | 0.00E+00 |
| 12 | −2.08E+01 | 0.00E+00 | 5.70E−01 | −4.05E+00 | 4.61E+00 | 6.25E+01 | −9.19E+01 | −1.24E+02 | 0.00E+00 |
| 13 | 5.00E+00 | 0.00E+00 | 3.64E−01 | −4.04E+00 | 1.39E+01 | 5.71E+00 | −8.78E+01 | 2.99E+02 | 0.00E+00 |
| 14 | 1.87E−01 | 0.00E+00 | 4.95E−03 | −9.07E−01 | 6.41E+00 | 1.75E+00 | −2.04E+02 | 6.35E+02 | 0.00E+00 |
| 15 | 0.00E+00 | 0.00E+00 | 0.00E+00 | 0.00E+00 | 0.00E+00 | 0.00E+00 | 0.00E+00 | 0.00E+00 | 0.00E+00 |
| 16 | −2.61E−01 | 0.00E+00 | 3.25E−03 | −5.11E−04 | −3.40E−03 | −1.19E−03 | 2.92E−03 | −1.26E−03 | 0.00E+00 |
| 17 | 0.00E+00 | 0.00E+00 | 4.13E−02 | −1.58E−02 | −3.81E−03 | 4.40E−03 | 7.49E−04 | −1.30E−03 | 0.00E+00 |
| 18 | −1.34E+01 | 0.00E+00 | −9.52E−03 | −1.84E−02 | 2.12E−02 | −2.90E−03 | −3.17E−03 | 4.17E−04 | 5.04E−07 |
| 19 | −3.68E+00 | 0.00E+00 | 8.58E−04 | 1.71E−03 | 2.51E−02 | −2.48E−02 | 8.75E−03 | 3.16E−04 | −5.85E−08 |
| 20 | 4.18E+01 | 0.00E+00 | 6.04E−02 | −2.28E−02 | 2.34E−02 | −3.67E−02 | 2.80E−02 | −1.07E−02 | −8.10E−06 |
| 21 | 0.00E+00 | 0.00E+00 | −1.03E−02 | −1.35E−02 | 1.73E−02 | −8.88E−03 | −7.40E−03 | −8.86E−12 | 6.14E−13 |
| 22 | 0.00E+00 | 0.00E+00 | −9.73E−02 | −2.89E−02 | 3.96E−03 | 3.91E−02 | −1.46E−02 | 1.59E−11 | 9.79E−13 |
| 23 | 0.00E+00 | 0.00E+00 | −4.14E−02 | −4.82E−02 | −3.18E−03 | 4.30E−02 | −1.93E−02 | 5.57E−03 | 2.18E−06 |
| 24 | 7.24E−01 | 0.00E+00 | 2.25E−01 | −1.63E−01 | 8.52E−02 | −1.88E−02 | −3.12E−03 | 2.39E−03 | 0.00E+00 |
| 25 | −1.80E+01 | 0.00E+00 | −1.13E−02 | 1.41E−02 | −7.16E−03 | −2.79E−04 | 4.71E−04 | 0.00E+00 | 0.00E+00 |
| 26 | −1.32E+01 | 0.00E+00 | −9.80E−02 | 2.57E−02 | −1.85E−02 | 1.27E−03 | 8.92E−04 | 0.00E+00 | 0.00E+00 |
| 27 | −2.58E+01 | 0.00E+00 | 5.30E−02 | −4.13E−02 | 3.90E−03 | 1.42E−03 | −2.73E−04 | 0.00E+00 | 0.00E+00 |
| 28 | −3.71E+00 | 0.00E+00 | −2.62E−03 | 1.49E−03 | 1.23E−04 | 3.75E−05 | −2.63E−06 | −1.78E−06 | 1.88E−07 |
| 29 | −1.82E+01 | 0.00E+00 | −3.21E−02 | 5.14E−03 | −7.90E−04 | −1.13E−05 | 4.63E−06 | 6.44E−07 | −4.67E−09 |
| 30 | 0.00E+00 | 0.00E+00 | 0.00E+00 | 0.00E+00 | 0.00E+00 | 0.00E+00 | 0.00E+00 | 0.00E+00 | 0.00E+00 |
| 31 | 0.00E+00 | 0.00E+00 | 0.00E+00 | 0.00E+00 | 0.00E+00 | 0.00E+00 | 0.00E+00 | 0.00E+00 | 0.00E+00 |

The optical lens assembly of the eighth embodiment includes:
a first lens element having a planar object side surface, a planar image side surface, a thickness of about 0.15 mm, a refractive index of about 1.52, and Abbe number of about 64.2;
a second lens element having an object side surface of a radius of curvature of about −1.03 mm, an image side surface of a radius of curvature of about −0.872 mm, a thickness of about 0.615 mm, a refractive index of about 1.54, and Abbe number of about 55.9;
a third lens element having an object side surface of a radius of curvature of about 1.74 mm, an image side surface of a radius of curvature of about 2.44 mm, a thickness of about 0.15 mm, a refractive index of about 1.64, and Abbe number of about 23.3;
a fourth lens element having an object side surface of a radius of curvature of about 0.802 mm, an image side surface of a radius of curvature of about 0.00974 mm, a thickness of about 0.18 mm, a refractive index of about 1.54, and Abbe number of about 55.9;
a fifth lens element having an object side surface of a radius of curvature of about −0.404 mm, an image side surface of a radius of curvature of about −0.253 mm, a thickness of about 0.137 mm, a refractive index of about 1.54, and Abbe number of about 55.9;
a sixth lens element having an object side surface of a radius of curvature of about −1.19 mm, an image side surface of a radius of curvature of about −0.657 mm, a thickness of about 0.12 mm, a refractive index of about 1.64, and Abbe number of about 23.3;
a seventh lens element having an object side surface of a radius of curvature of about −0.0419 mm, an image side surface of a radius of curvature of about −1.18 mm, a thickness of about 0.262 mm, a refractive index of about 1.54, and Abbe number of about 55.9;
an eighth lens element having an object side surface of a radius of curvature of about 0.472 mm, an image side surface of a radius of curvature of about −0.119 mm, a thickness of about 0.706 mm, a refractive index of about 1.53, and Abbe number of about 56.2;
a ninth lens element having an object side surface of a radius of curvature of about 0.43 mm, an image side surface of a radius of curvature of about 0.787 mm, a thickness of about 0.28 mm, a refractive index of about 1.64, and Abbe number of about 23.9;
a tenth lens element having an object side surface of a radius of curvature of about 0.087 mm, an image side surface of a radius of curvature of about −0.0677 mm, a thickness of about 0.488 mm, a refractive index of about 1.53, and Abbe number of about 56.2;
an eleventh lens element having an object side surface of a radius of curvature of about 0.14 mm, an image side surface of a radius of curvature of about 0.00358 mm, a thickness of about 0.3 mm, a refractive index of about 1.53, and Abbe number of about 56.2;
a twelfth lens element having an object side surface of a radius of curvature of about −0.58 mm, an image side surface of a radius of curvature of about −0.408 mm, a thickness of about 0.308 mm, a refractive index of about 1.64, and Abbe number of about 23.9;
a thirteenth lens element having an object side surface of a radius of curvature of about 0.305 mm, an image side surface of a radius of curvature of about −0.439 mm, a thickness of about 0.603 mm, a refractive index of about 1.53, and Abbe number of about 56.2;
a fourteenth lens element having an object side surface of a radius of curvature of about −0.0361 mm, an image side surface of a radius of curvature of about 0.516 mm, a thickness of about 0.5 mm, a refractive index of about 1.53, and Abbe number of about 56.2; and
a fifteenth lens element having a planar object side surface, a planar image side surface, a thickness of about 0.3 mm, a refractive index of about 1.52, and Abbe number of about 64.2, wherein the optical lens assembly comprises an aperture stop positioned between the seventh lens element and the eighth lens element, wherein the aperture stop is a planar element having a thickness of about 0.166 mm.

Example 9

Figure 12A:
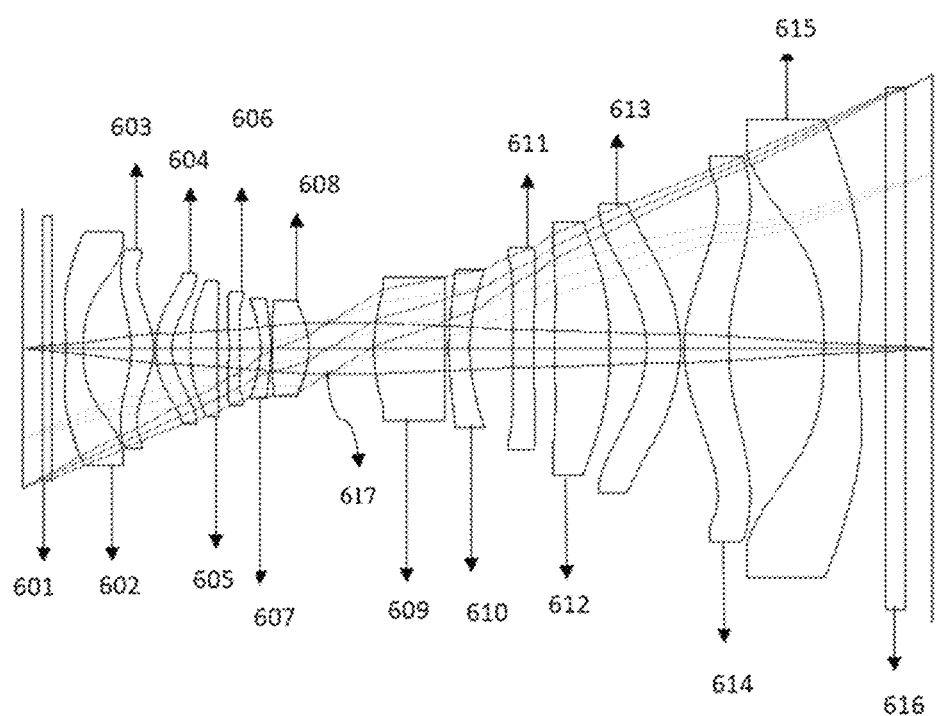

The optical lens assembly (2) in the ninth embodiment comprises sixteen lens elements which are sequentially arranged from object side to image side. The aperture stop (617) is located between the eighth and ninth lens elements. First eight elements can act as objective assembly. The layout diagram is shown in FIG. 12a.

Figure 12B:
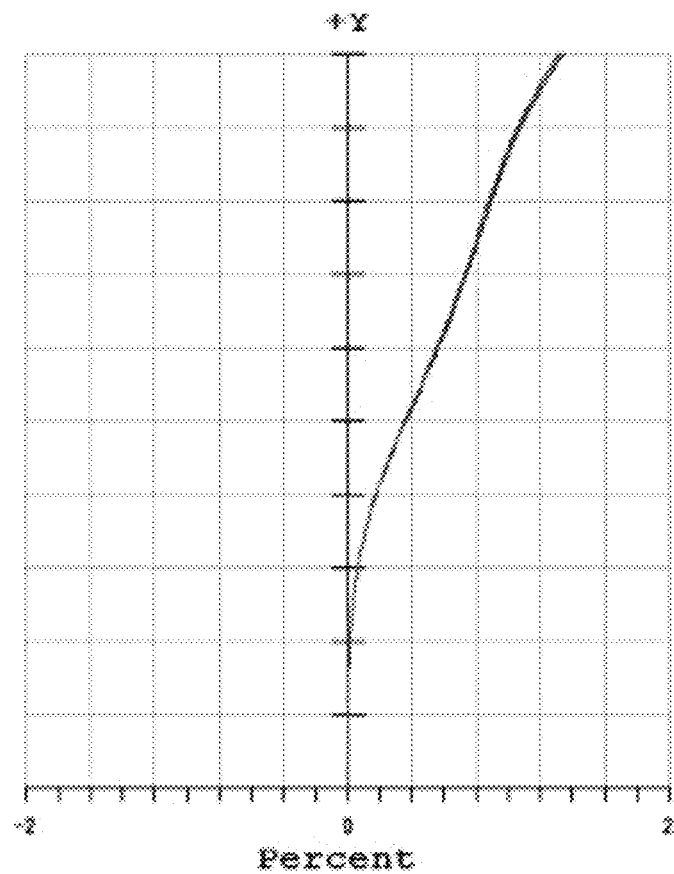
Figure 12C:
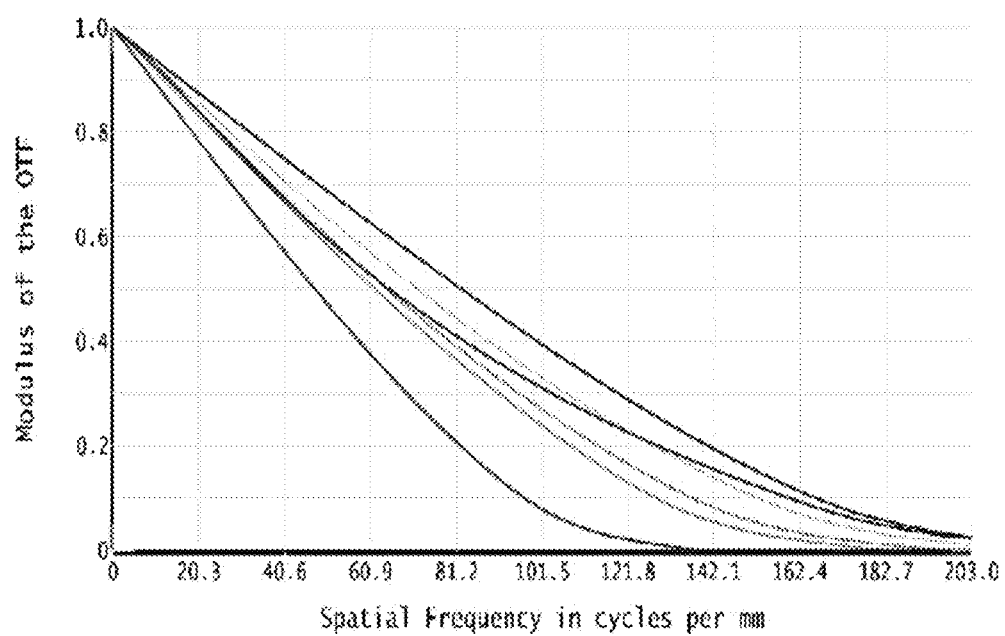

The first lens element (601) is a protective layer or a filter made of glass or plastic or polymer or composite materials having refractive index is greater than 1. The second lens element (602) has a refracting power. The object side surface comprises concave portion in the vicinity of the optical axis and a convex portion in the vicinity of a periphery of the second lens element. The image side surface comprises a concave portion in the vicinity of the optical axis. The third lens element (603) has a positive refracting power. The image side surface comprises a convex portion in the vicinity of the optical axis and a concave portion in the vicinity of a periphery of the lens element. The object side surface comprises a concave portion in the vicinity of the optical axis and a convex portion in a peripheral vicinity. The fourth lens element (604) has a positive refracting power. The image side surface comprises a concave portion and is meniscus in the vicinity of the optical axis. The object side surface comprises of a convex portion and is meniscus in the vicinity of the optical axis. The fifth lens element (605) has positive refracting power. The object side surface is convex surface. The sixth lens element (606) has negative refracting power. The image side surface is a concave surface comprising a concave portion in the vicinity of the optical axis. The seventh lens element (607) has refracting power. The object side surface is a concave surface. The eighth lens element (608) has positive refracting power. The image side surface is convex surface. The ninth lens element (609) has positive refracting power. The object side surface is convex surfaces. The tenth lens element (610) has a refracting power. The object side surface is a convex surface, and the image side surface is a concave surface. The eleventh lens element (611) has negative refracting power. The object side surface is a concave surface comprising a concave portion in the vicinity of the optical axis. The twelve lens element (612) has positive refracting power. The image side surface is convex surface. The thirteenth lens element (613) has a refracting power. The object side surface comprises a concave portion and is meniscus in the vicinity of the optical axis. The image side surface comprises of a convex portion and is meniscus in the vicinity of the optical axis. The fourteenth lens element (614) has positive refracting power. The object side surface comprises a convex portion in the vicinity of the optical axis and a concave portion in the vicinity of a periphery of the fourteenth lens element. The image side surface comprises a concave portion in the vicinity of the optical axis and a convex portion in the vicinity of a periphery of the lens element. The fifteenth lens (element 615) has a refracting power. The object side surface comprises concave portion in the vicinity of the optical axis and a convex portion in the vicinity of a periphery of the fifteenth lens element. The image side surface comprises a concave portion in the vicinity of the optical axis and a convex portion in the vicinity of a periphery of the fifteenth lens element. The sixteenth lens element (616) is a filter or an IR filter. The optical lens assembly data of the ninth embodiment is shown in Table 9A and the aspheric data is shown in Table 9B. The distortion plot and the MTF plot are shown in FIGS. 12b and 12c. The optical lens assembly (2) of the ninth embodiment has:

Magnification=1×; Numerical aperture=0.176; Focal Length=1.35439; WFNO=8.36712 System length=10.00917 mm; HFOV=38.35 degree; Depth of field=164.5377 micron; Airy radius=5.998 micron.

TABLE 9A

The optical assembly data for nineth embodiment

| S. No. | Lens Element Number | Radius of curvature (mm) | Thickness (mm) of lens element OR air gap (mm) with the previous or next element | Refractive Index | Abbe No. |
|---|---|---|---|---|---|
| 0 | | Infinity | 2.24E−01 | | |
| 1 | 1 | Infinity | 1.05E−01 | 1.52 | 64.2 |
| 2 | | Infinity | 1.50E−01 | | |
| 3 | 2 | −3.31E−01 | 1.90E−01 | 1.51 | 56.5 |
| 4 | | 4.24E−01 | 5.25E−01 | | |
| 5 | 3 | −6.06E−01 | 2.49E−01 | 1.54 | 56 |
| 6 | | −1.28E+00 | 2.00E−02 | | |
| 7 | 4 | 1.08E+00 | 1.85E−01 | 1.61 | 26.9 |
| 8 | | 1.64E+00 | 2.02E−01 | | |
| 9 | 5 | 4.04E−01 | 3.03E−01 | 1.54 | 56 |
| 10 | | −1.24E−01 | 1.19E−01 | | |
| 11 | 6 | −2.33E−01 | 1.16E−01 | 1.67 | 19.5 |
| 12 | | −1.07E−01 | 2.33E−01 | | |
| 13 | 7 | −9.11E−01 | 1.15E−01 | 1.61 | 26.9 |
| 14 | | −5.21E−01 | 2.00E−02 | | |
| 15 | 8 | −2.25E−02 | 3.92E−01 | 1.54 | 56 |
| 16 | | −8.68E−01 | 2.24E−01 | | |
| 17 | Aperture stop | Infinity | 5.00E−01 | | |
| 18 | 9 | 4.34E−01 | 7.83E−01 | 1.54 | 56 |
| 19 | | 1.12E−02 | 4.00E−02 | | |
| 20 | 10 | 2.60E−01 | 2.30E−01 | 1.61 | 26.9 |
| 21 | | 4.56E−01 | 4.66E−01 | | |
| 22 | 11 | 5.34E−02 | 2.31E−01 | 1.67 | 19.5 |
| 23 | | 1.17E−01 | 2.38E−01 | | |
| 24 | 12 | 6.21E−02 | 6.06E−01 | 1.54 | 56 |
| 25 | | −2.02E−01 | 4.04E−01 | | |
| 26 | 13 | −8.22E−01 | 3.70E−01 | 1.61 | 26.9 |
| 27 | | −5.42E−01 | 4.00E−02 | | |
| 28 | 14 | 6.40E−01 | 4.98E−01 | 1.54 | 56 |
| 29 | | 3.03E−01 | 1.05E+00 | | |
| 30 | 15 | −2.12E−01 | 3.80E−01 | 1.51 | 56.5 |
| 31 | | 1.65E−01 | 3.00E−01 | | |
| 32 | 16 | Infinity | 2.10E−01 | 1.52 | 64.2 |
| 33 | | Infinity | 2.94E−01 | | |

TABLE 9B

The Aspheric data for nineth embodiment

| S. No | Conic | Order 4 | Order 6 | Order 8 | Order 10 | Order 12 | Order 14 | Order 16 |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |

TABLE 9B-continued

The Aspheric data for nineth embodiment

| S. No | Conic | Order 4 | Order 6 | Order 8 | Order 10 | Order 12 | Order 14 | Order 16 |
|---|---|---|---|---|---|---|---|---|
| 3 | 2.04E−01 | 5.30E−01 | −3.19E−01 | −9.68E−02 | 2.30E−01 | −1.19E−01 | 2.64E−02 | −2.19E−03 |
| 4 | −1.25E+01 | 6.03E−01 | −2.30E−01 | −5.58E−01 | 6.37E−01 | −2.86E−01 | 6.10E−02 | −5.07E−03 |
| 5 | −6.66E+00 | −2.21E−01 | 1.27E+00 | −2.13E+00 | 2.03E+00 | −1.13E+00 | 3.37E−01 | −4.18E−02 |
| 6 | −7.07E+00 | −2.04E−01 | 1.11E+00 | −1.80E+00 | 1.67E+00 | −7.59E−01 | 1.27E−01 | 9.00E−04 |
| 7 | −8.26E−01 | −3.68E−01 | 1.96E+00 | −6.79E+00 | 1.20E+01 | −1.23E+01 | 6.67E+00 | −1.43E+00 |
| 8 | −5.26E+00 | 1.68E−01 | 1.02E+00 | −3.52E+00 | −2.01E+00 | 1.52E+01 | −1.70E+01 | 6.04E+00 |
| 9 | −8.83E−01 | 4.15E−01 | −1.15E+00 | 6.46E+00 | −2.22E+01 | 3.09E+01 | −1.49E+01 | 0.00E+00 |
| 10 | −3.43E+01 | 4.64E−01 | −1.67E+00 | 8.39E+00 | −2.67E+01 | 3.82E+01 | −1.98E+01 | 0.00E+00 |
| 11 | −6.74E+01 | 2.72E−01 | −9.05E−01 | 8.00E+00 | −2.92E+01 | 4.78E+01 | −3.23E+01 | 0.00E+00 |
| 12 | −9.90E+01 | 3.45E−01 | 6.47E−01 | 9.97E+00 | −3.92E+01 | 7.88E+01 | −6.37E+01 | 0.00E+00 |
| 13 | −5.82E+00 | 1.50E−01 | −1.11E+00 | 4.32E+00 | −1.28E+01 | 2.31E+01 | −1.66E+01 | 0.00E+00 |
| 14 | −5.91E+00 | 8.03E−01 | −3.81E+00 | 1.19E+01 | −2.61E+01 | 3.27E+01 | −1.99E+01 | 0.00E+00 |
| 15 | 5.82E+01 | 3.40E−01 | −2.11E+00 | 7.57E+00 | −1.45E+01 | 1.48E+01 | −5.86E+00 | 0.00E+00 |
| 16 | −3.05E−01 | −4.83E−03 | −2.03E−01 | 1.24E+00 | −3.13E+00 | 4.64E+00 | −1.81E+00 | 0.00E+00 |
| 17 | 0.00E+00 | 0.00E+00 | 0.00E+00 | 0.00E+00 | 0.00E+00 | 0.00E+00 | 0.00E+00 | 0.00E+00 |
| 18 | −3.05E−01 | 6.03E−04 | 6.34E−03 | −9.72E−03 | 6.11E−03 | −2.27E−03 | 2.21E−04 | 0.00E+00 |
| 19 | 5.82E+01 | −4.25E−02 | 6.59E−02 | −5.91E−02 | 2.83E−02 | −7.22E−03 | 7.16E−04 | 0.00E+00 |
| 20 | −5.91E+00 | −1.00E−01 | 1.19E−01 | −9.27E−02 | 5.10E−02 | −1.60E−02 | 2.43E−03 | 0.00E+00 |
| 21 | −5.82E+00 | −1.87E−02 | 3.48E−02 | −3.37E−02 | 2.51E−02 | −1.13E−02 | 2.02E−03 | 0.00E+00 |
| 22 | −9.90E+01 | −4.32E−02 | 2.02E−02 | −7.79E−02 | 7.66E−02 | −3.85E−02 | 7.77E−03 | 0.00E+00 |
| 23 | −6.74E+01 | −3.40E−02 | 2.83E−02 | −6.25E−02 | 5.70E−02 | −2.33E−02 | 3.94E−03 | 0.00E+00 |
| 24 | −3.43E+01 | −5.80E−02 | 5.22E−02 | −6.55E−02 | 5.22E−02 | −1.87E−02 | 2.42E−03 | 0.00E+00 |
| 25 | −8.83E−01 | −5.18E−02 | 3.59E−02 | −5.05E−02 | 4.33E−02 | −1.51E−02 | 1.82E−03 | 0.00E+00 |
| 26 | −5.26E+00 | −2.10E−02 | −3.18E−02 | 2.75E−02 | 3.92E−03 | −7.41E−03 | 2.07E−03 | −1.84E−04 |
| 27 | −8.26E−01 | 4.59E−02 | −6.11E−02 | 5.30E−02 | −2.35E−02 | 6.03E−03 | −8.15E−04 | 4.38E−05 |
| 28 | −7.07E+00 | 2.55E−02 | −3.47E−02 | 1.41E−02 | −3.26E−03 | 3.70E−04 | −1.55E−05 | −2.75E−08 |
| 29 | −6.66E+00 | 2.76E−02 | −3.97E−02 | 1.66E−02 | −3.96E−03 | 5.50E−04 | −4.11E−05 | 1.27E−06 |
| 30 | −1.25E+01 | −7.53E−02 | 7.20E−03 | 4.36E−03 | −1.24E−03 | 1.40E−04 | −7.44E−06 | 1.55E−07 |
| 31 | 2.04E−01 | −6.63E−02 | 9.97E−03 | 7.56E−04 | −4.48E−04 | 5.80E−05 | −3.23E−06 | 6.70E−08 |
| 32 | 0.00E+00 | 0.00E+00 | 0.00E+00 | 0.00E+00 | 0.00E+00 | 0.00E+00 | 0.00E+00 | 0.00E+00 |
| 33 | 0.00E+00 | 0.00E+00 | 0.00E+00 | 0.00E+00 | 0.00E+00 | 0.00E+00 | 0.00E+00 | 0.00E+00 |

The optical lens assembly of the ninth embodiment includes:
a first lens element having a planar object side surface, a planar image side surface, a thickness of about 0.105 mm, a refractive index of about 1.52, and Abbe number of about 64.2;
a second lens element having an object side surface of a radius of curvature of about −0.331 mm, an image side surface of a radius of curvature of about −0.424 mm, a thickness of about 0.19 mm, a refractive index of about 1.51, and Abbe number of about 56.5;
a third lens element having an object side surface of a radius of curvature of about −0.606 mm, an image side surface of a radius of curvature of about −1.28 mm, a thickness of about 0.249 mm, a refractive index of about 1.54, and Abbe number of about 56;
a fourth lens element having an object side surface of a radius of curvature of about 1.08 mm, an image side surface of a radius of curvature of about 1.64 mm, a thickness of about 0.185 mm, a refractive index of about 1.61, and Abbe number of about 26.9;
a fifth lens element having an object side surface of a radius of curvature of about 0.404 mm, an image side surface of a radius of curvature of about −0.124 mm, a thickness of about 0.303 mm, a refractive index of about 1.54, and Abbe number of about 56;
a sixth lens element having an object side surface of a radius of curvature of about −0.233 mm, an image side surface of a radius of curvature of about −0.107 mm, a thickness of about 0.116 mm, a refractive index of about 1.67, and Abbe number of about 19.5;
a seventh lens element having an object side surface of a radius of curvature of about −0.911 mm, an image side surface of a radius of curvature of about −0.521 mm, a thickness of about 0.115 mm, a refractive index of about 1.61, and Abbe number of about 26.9;
an eighth lens element having an object side surface of a radius of curvature of about −0.0225 mm, an image side surface of a radius of curvature of about −0.868 mm, a thickness of about 0.392 mm, a refractive index of about 1.54, and Abbe number of about 56;
a ninth lens element having an object side surface of a radius of curvature of about 0.434 mm, an image side surface of a radius of curvature of about −0.0112 mm, a thickness of about 0.783 mm, a refractive index of about 1.54, and Abbe number of about 56;
a tenth lens element having an object side surface of a radius of curvature of about 0.26 mm, an image side surface of a radius of curvature of about 0.456 mm, a thickness of about 0.23 mm, a refractive index of about 1.61, and Abbe number of about 26.9;
an eleventh lens element having an object side surface of a radius of curvature of about 0.0534 mm, an image side surface of a radius of curvature of about 0.117 mm, a thickness of about 0231 mm, a refractive index of about 1.67, and Abbe number of about 19.5;
a twelfth lens element having an object side surface of a radius of curvature of about 0.0621 mm, an image side surface of a radius of curvature of about −0.202 mm, a thickness of about 0.606 mm, a refractive index of about 1.54, and Abbe number of about 56;
a thirteenth lens element having an object side surface of a radius of curvature of about −0.822 mm, an image side surface of a radius of curvature of about −0.542 mm, a thickness of about 0.37 mm, a refractive index of about 1.61, and Abbe number of about 26.9;
a fourteenth lens element having an object side surface of a radius of curvature of about 0.64 mm, an image side surface of a radius of curvature of about 0.303 mm, a thickness of about 0.498 mm, a refractive index of about 1.54, and Abbe number of about 56;

a fifteenth lens element having an object side surface of a radius of curvature of about −0.212 mm, an image side surface of a radius of curvature of about 0.165 mm, a thickness of about 0.38 mm, a refractive index of about 1.51, and Abbe number of about 56.5; and a sixteenth lens element having a planar object side surface, a planar image side surface, a thickness of about 0.21 mm, a refractive index of about 1.52, and Abbe number of about 64.2, wherein the optical lens assembly comprises an aperture stop positioned between the eighth lens element and the ninth lens element, wherein the aperture stop is a planar element having a thickness of about 0.5 mm.

Example 10

Figure 13A:
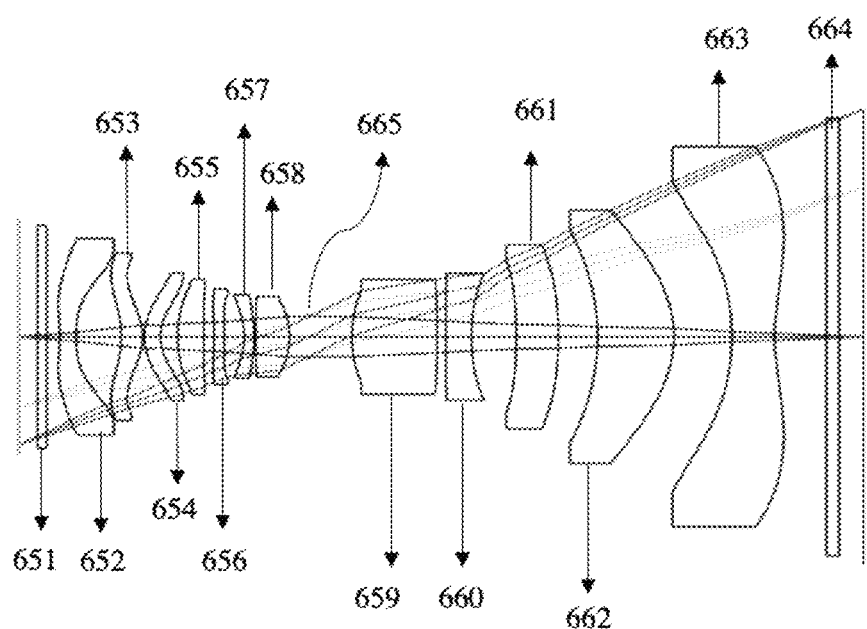

The optical lens assembly (2) in the tenth embodiment comprises fourteen lens elements which are sequentially arranged from object side to image side. The aperture stop (664) is located between the eighth and ninth lens elements. First eight elements can act as objective assembly. The layout diagram is shown in FIG. 13a.

Figure 13B:
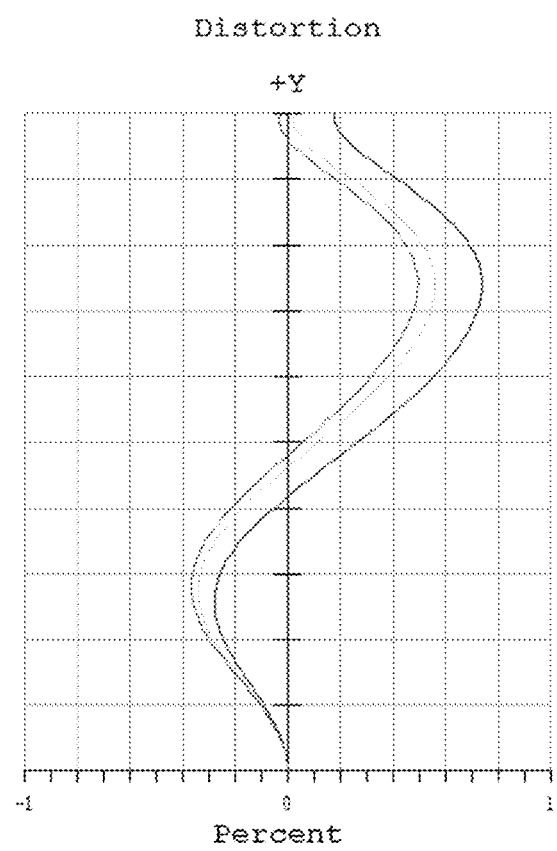
Figure 13C:
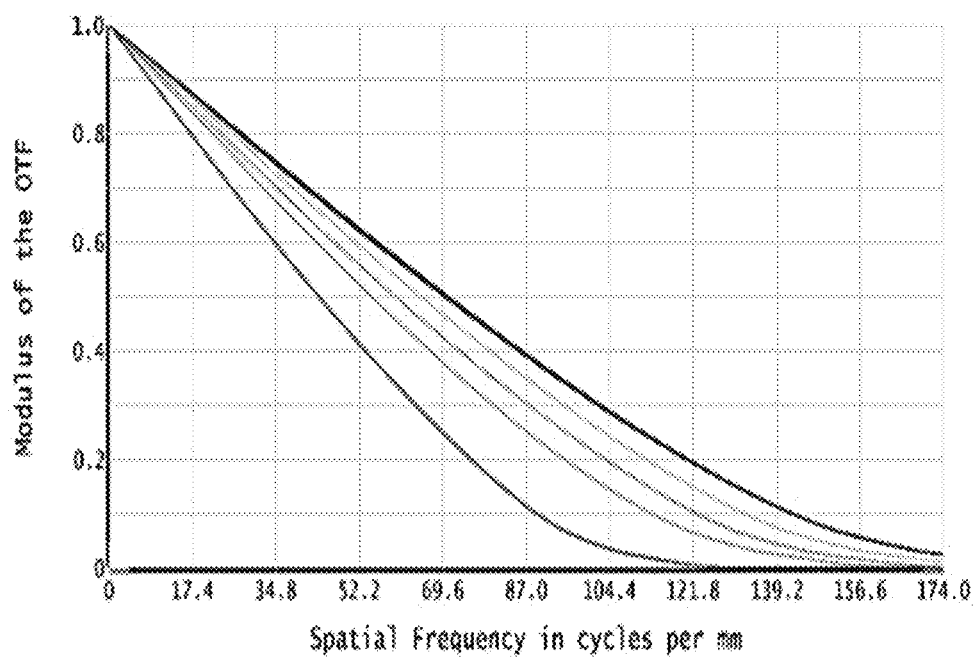

The first lens element (651) is a protective layer or a filter made of glass or plastic or polymer or composite materials having refractive index is greater than 1. The second lens element (652) has a refracting power. The object side surface comprises concave portion in the vicinity of the optical axis and a convex portion in the vicinity of a periphery of the second lens element. The image side surface comprises a concave portion in the vicinity of the optical axis. The third lens element (653) has a positive refracting power. The image side surface comprises a convex portion in the vicinity of the optical axis and a concave portion in the vicinity of a periphery of the fifth lens element. The object side surface comprises a concave portion in the vicinity of the optical axis and a convex portion in a peripheral vicinity. The fourth lens element (654) has a positive refracting power. The image side surface comprises a concave portion and is meniscus in the vicinity of the optical axis. The object side surface comprises of a convex portion and is meniscus in the vicinity of the optical axis. The fifth lens element (655) has positive refracting power. The object side surface is convex surface. The sixth lens element (656) has negative refracting power. The image side surface is a concave surface comprising a concave portion in the vicinity of the optical axis. The seventh lens element (657) has refracting power. The object side surface is a concave surface. The eighth lens element (658) has positive refracting power. The image side surface is convex surface. The ninth lens element (659) has positive refracting power. The object-side surface is convex surface. The tenth lens element (660) has negative refracting power. The image side surface is a concave surface. The eleventh lens element (661) has a refracting power. The object side surface is a concave surface, and the image-side surface is a convex surface. The twelfth lens element (662) has positive refracting power. The object side surface is a concave surface near the vicinity of the optical axis and the image-side surface is a convex surface near the optical axis. The thirteenth lens element (663) has negative refracting power. The object side surface comprises a concave portion in the vicinity of the optical axis. The image side surface comprises a concave portion in the vicinity of the optical axis and a convex portion in the vicinity of a periphery of the thirteen-lens element. The fourteenth lens element (664) is a filter or an IR filter. The optical lens assembly data of the tenth embodiment is shown in Table 10A and the aspheric data is shown in Table 10B. The distortion plot and the MTF plot are shown in FIGS. 13b and 13c. The optical lens assembly of the tenth embodiment has: Magnification=2×; Numerical aperture=0.052; Focal Length=1.244 mm; WFNO=9.74505; System length=9.58348 mm; HFOV=36 degree; Airy radius=6.985 micron; Depth of field=55.68 micron.

TABLE 10A

The optical assembly data for tenth embodiment

| S. No. | Lens Element Number | Radius of curvature (mm) | Thickness (mm) of lens element OR air gap (mm) with the previous or next element | Refractive Index | Abbe No. |
| --- | --- | --- | --- | --- | --- |
| 0 |  | Infinity | 2.24E−01 |  |  |
| 1 | 1 | Infinity | 1.05E−01 | 1.52 | 64.2 |
| 2 |  | Infinity | 1.50E−01 |  |  |
| 3 | 2 | −3.31E−01 | 1.90E−01 | 1.51 | 56.5 |
| 4 |  | 4.24E−01 | 5.25E−01 |  |  |
| 5 | 3 | −6.06E−01 | 2.49E−01 | 1.54 | 56 |
| 6 |  | −1.28E+00 | 2.00E−02 |  |  |
| 7 | 4 | 1.08E+00 | 1.85E−01 | 1.61 | 26.9 |
| 8 |  | 1.64E+00 | 2.02E−01 |  |  |
| 9 | 5 | 4.04E−01 | 3.03E−01 | 1.54 | 56 |
| 10 |  | −1.24E−01 | 1.19E−01 |  |  |
| 11 | 6 | −2.33E−01 | 1.16E−01 | 1.67 | 19.5 |
| 12 |  | −1.07E−01 | 2.33E−01 |  |  |
| 13 | 7 | −9.11E−01 | 1.15E−01 | 1.61 | 26.9 |
| 14 |  | −5.21E−01 | 2.00E−02 |  |  |
| 15 | 8 | −2.25E−02 | 3.92E−01 | 1.54 | 56 |
| 16 |  | −8.68E−01 | 2.24E−01 |  |  |
| 17 | Aperture stop | Infinity | 5.00E−01 |  |  |
| 18 | 9 | 5.35E−01 | 9.90E−01 | 1.54 | 56.2 |
| 19 |  | −7.77E−02 | 1.00E−01 |  |  |
| 20 | 10 | −1.29E−02 | 3.00E−01 | 1.63 | 23.4 |
| 21 |  | 3.19E−01 | 5.20E−01 |  |  |
| 22 | 11 | −1.28E−01 | 4.90E−01 | 1.63 | 23.4 |
| 23 |  | −1.86E−01 | 4.50E−01 |  |  |
| 24 | 12 | −2.68E−01 | 8.90E−01 | 1.54 | 56.2 |
| 25 |  | −5.79E−01 | 6.70E−01 |  |  |
| 26 | 13 | −2.67E−01 | 5.00E−01 | 1.54 | 56.2 |
| 27 |  | 2.98E−01 | 6.00E−01 |  |  |
| 28 | 14 | Infinity | 1.50E−01 | 1.52 | 64.1 |
| 29 |  | Infinity | 2.77E−01 |  |  |

TABLE 10B

The aspheric data of optical assembly for tenth embodiment

| S. No. | Conic | Order 4 | Order 6 | Order 8 | Order 10 | Order 12 | Order 14 |
| --- | --- | --- | --- | --- | --- | --- | --- |
| 0 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 |
| 3 | 2.04E−01 | 5.30E−01 | −3.19E−01 | −9.68E−02 | 2.30E−01 | −1.19E−01 | 2.64E−02 |
| 4 | −1.25E+01 | 6.03E−01 | −2.30E−01 | −5.58E−01 | 6.37E−01 | −2.86E−01 | 6.10E−02 |

TABLE 10B-continued

The aspheric data of optical assembly for tenth embodiment

| S. No. | Conic | Order 4 | Order 6 | Order 8 | Order 10 | Order 12 | Order 14 |
|---|---|---|---|---|---|---|---|
| 5  | −6.66E+00 | −2.21E−01 | 1.27E+00  | −2.13E+00 | 2.03E+00  | −1.13E+00 | 3.37E−01 |
| 6  | −7.07E+00 | −2.04E−01 | 1.11E+00  | −1.80E+00 | 1.67E+00  | −7.59E−01 | 1.27E−01 |
| 7  | −8.26E−01 | −3.68E−01 | 1.96E+00  | −6.79E+00 | 1.20E+01  | −1.23E+01 | 6.67E+00 |
| 8  | −5.26E+00 | 1.68E−01  | 1.02E+00  | −3.52E+00 | −2.01E+00 | 1.52E+01  | −1.70E+01 |
| 9  | −8.83E−01 | 4.15E−01  | −1.15E+00 | 6.46E+00  | −2.22E+01 | 3.09E+01  | −1.49E+01 |
| 10 | −3.43E+01 | 4.64E−01  | −1.67E+00 | 8.39E+00  | −2.67E+01 | 3.82E+01  | −1.98E+01 |
| 11 | −6.74E+01 | 2.72E−01  | −9.05E−01 | 8.00E+00  | −2.92E+01 | 4.78E+01  | −3.23E+01 |
| 12 | −9.90E+01 | 3.45E−01  | −6.47E−01 | 9.97E+00  | −3.92E+01 | 7.88E+01  | −6.37E+01 |
| 13 | −5.82E+00 | 1.50E−01  | −1.11E+00 | 4.32E+00  | −1.28E+01 | 2.31E+01  | −1.66E+01 |
| 14 | −5.91E+00 | 8.03E−01  | −3.81E+00 | 1.19E+01  | −2.61E+01 | 3.27E+01  | −1.99E+01 |
| 15 | 5.82E+01  | 3.40E−01  | −2.11E+00 | 7.57E+00  | −1.45E+01 | 1.48E+01  | −5.86E+00 |
| 16 | −3.05E−01 | −4.83E−03 | −2.03E−01 | 1.24E+00  | −3.13E+00 | 4.64E+00  | −1.81E+00 |
| 17 | 0.00E+00  | 0.00E+00  | 0.00E+00  | 0.00E+00  | 0.00E+00  | 0.00E+00  | 0.00E+00 |
| 18 | −2.35E+00 | −3.69E−03 | −1.14E−03 | −2.92E−03 | 6.64E−04  | 3.53E−04  | −7.12E−04 |
| 19 | 1.00E+00  | 4.47E−03  | 5.94E−03  | −2.09E−03 | −8.74E−03 | −4.98E−03 | 6.91E−03 |
| 20 | 4.79E−01  | 8.27E−03  | 4.19E−02  | −2.66E−02 | −6.90E−03 | 9.56E−03  | 7.35E−05 |
| 21 | 1.00E+00  | 2.27E−02  | 5.44E−02  | −3.29E−02 | 2.42E−02  | −1.22E−03 | 2.94E−04 |
| 22 | −9.88E+00 | −4.32E−02 | −4.03E−02 | 1.57E−02  | −3.75E−03 | −8.88E−03 | 7.63E−03 |
| 23 | −1.09E+00 | −2.26E−02 | 3.04E−03  | 2.19E−03  | −2.68E−04 | −1.46E−04 | 1.06E−04 |
| 24 | −7.55E+00 | −8.54E−03 | 2.67E−03  | −6.87E−04 | 4.38E−05  | 8.97E−05  | 2.90E−07 |
| 25 | −5.54E+00 | −3.59E−02 | 1.03E−02  | −2.05E−03 | 3.62E−04  | −3.27E−06 | −7.47E−07 |
| 26 | −4.10E+00 | −3.54E−02 | 9.40E−03  | −4.07E−04 | −1.45E−04 | 2.68E−05  | −1.43E−06 |
| 27 | −4.10E+00 | −2.92E−02 | 4.93E−03  | −6.84E−04 | 6.24E−05  | −4.40E−06 | 1.88E−07 |
| 28 | 0.00E+00  | 0.00E+00  | 0.00E+00  | 0.00E+00  | 0.00E+00  | 0.00E+00  | 0.00E+00 |
| 29 | 0.00E+00  | 0.00E+00  | 0.00E+00  | 0.00E+00  | 0.00E+00  | 0.00E+00  | 0.00E+00 |

The optical lens assembly of the tenth embodiment includes:

a first lens element having a planar object side surface, a planar image side surface, a thickness of about 0.105 mm, a refractive index of about 1.52, and Abbe number of about 64.2;

a second lens element having an object side surface of a radius of curvature of about −0.331 mm, an image side surface of a radius of curvature of about 0.424 mm, a thickness of about 0.19 mm, a refractive index of about 1.51, and Abbe number of about 56.5;

a third lens element having an object side surface of a radius of curvature of about −0.606 mm, an image side surface of a radius of curvature of about −1.28 mm, a thickness of about 0.249 mm, a refractive index of about 1.54, and Abbe number of about 56; a fourth lens element having an object side surface of a radius of curvature of about 1.08 mm, an image side surface of a radius of curvature of about 1.64 mm, a thickness of about 0.185 mm, a refractive index of about 1.61, and Abbe number of about 26.9; a fifth lens element having an object side surface of a radius of curvature of about 0.404 mm, an image side surface of a radius of curvature of about −0.124 mm, a thickness of about 0.303 mm, a refractive index of about 1.54, and Abbe number of about 56; a sixth lens element having an object side surface of a radius of curvature of about −0.233 mm, an image side surface of a radius of curvature of about −0.107 mm, a thickness of about 0.116 mm, a refractive index of about 1.67, and Abbe number of about 19.5;

a seventh lens element having an object side surface of a radius of curvature of about −0.911 mm, an image side surface of a radius of curvature of about −0.521 mm, a thickness of about 0.115 mm, a refractive index of about 1.61, and Abbe number of about 26.9;

an eighth lens element having an object side surface of a radius of curvature of about −0.0225 mm, an image side surface of a radius of curvature of about −0.868 mm, a thickness of about 0.392 mm, a refractive index of about 1.54, and Abbe number of about 56;

a ninth lens element having an object side surface of a radius of curvature of about 0.535 mm, an image side surface of a radius of curvature of about −0.0777 mm, a thickness of about 0.99 mm, a refractive index of about 1.54, and Abbe number of about 56.2;

a tenth lens element having an object side surface of a radius of curvature of about −0.0129 mm, an image side surface of a radius of curvature of about 0.319 mm, a thickness of about 0.3 mm, a refractive index of about 1.63, and Abbe number of about 23.4;

an eleventh lens element having an object side surface of a radius of curvature of about −0.128 mm, an image side surface of a radius of curvature of about −0.186 mm, a thickness of about 0.49 mm, a refractive index of about 1.63, and Abbe number of about 23.4;

a twelfth lens element having an object side surface of a radius of curvature of about −0.268 mm, an image side surface of a radius of curvature of about −0.579 mm, a thickness of about 0.89 mm, a refractive index of about 1.54, and Abbe number of about 56.2;

a thirteenth lens element having an object side surface of a radius of curvature of about −0.267 mm, an image side surface of a radius of curvature of about 0.298 mm, a thickness of about 0.5 mm, a refractive index of about 1.54, and Abbe number of about 56.2; and a fourteenth lens element having a planar object side surface, a planar image side surface, a thickness of about 0.15 mm, a refractive index of about 1.52, and Abbe number of about 64.1, wherein the optical lens assembly comprises an aperture stop positioned between the eighth lens element and the ninth lens element, wherein the aperture stop is a planar element having a thickness of about 0.5 mm.

Example 11

Figure 14A:
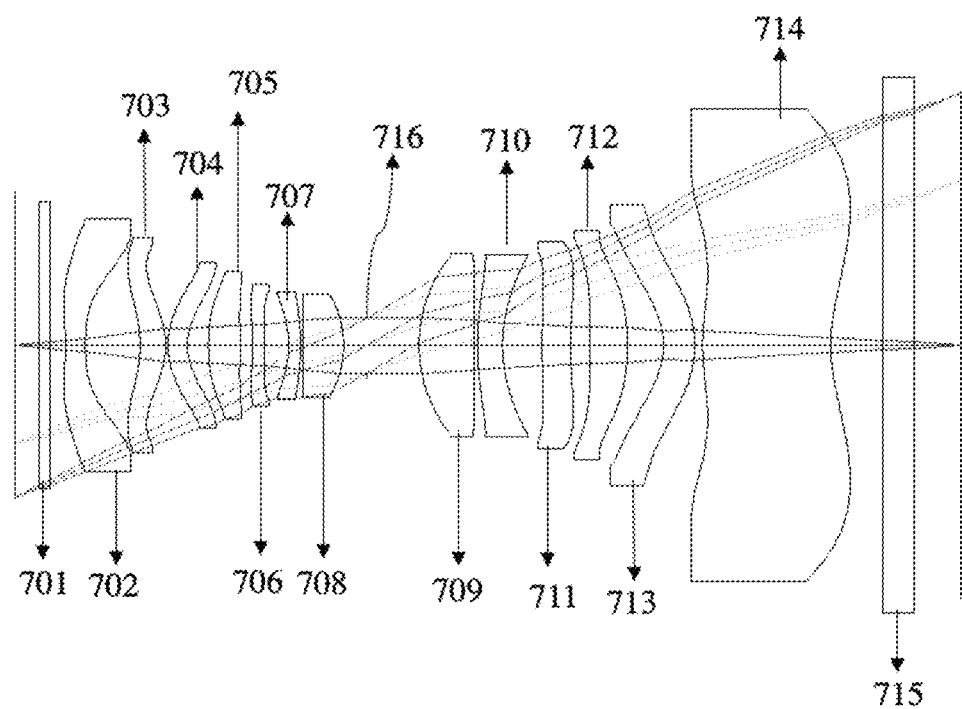

The optical lens assembly (2) in the eleventh embodiment comprises fifteen lens elements which are sequentially arranged from object side to image side. The aperture stop (716) is located between the eighth and ninth lens elements. First eight elements can act as objective assembly. The layout diagram is shown in FIG. 14*a*.

Figure 14B:
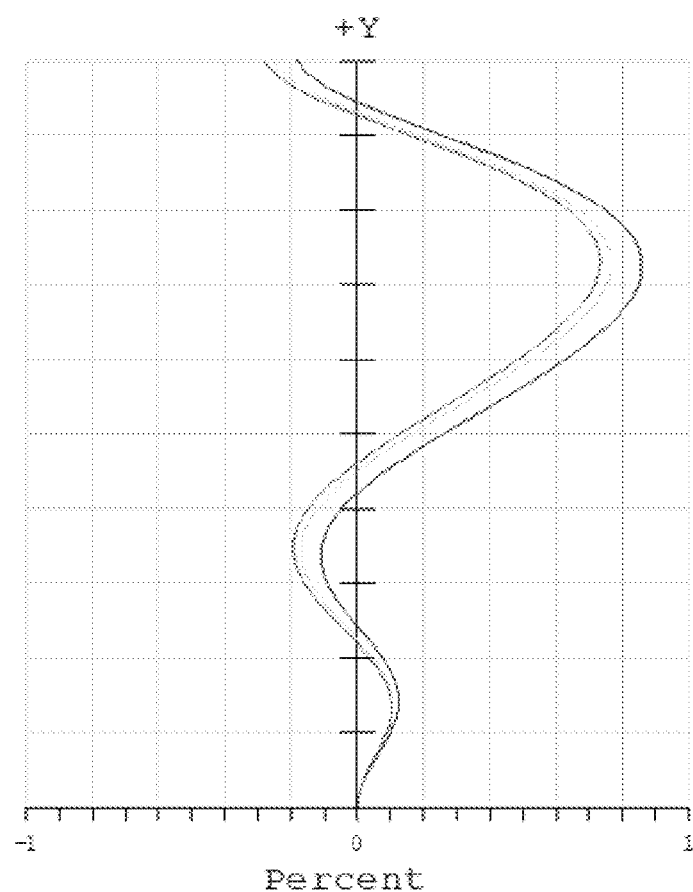
Figure 14C:
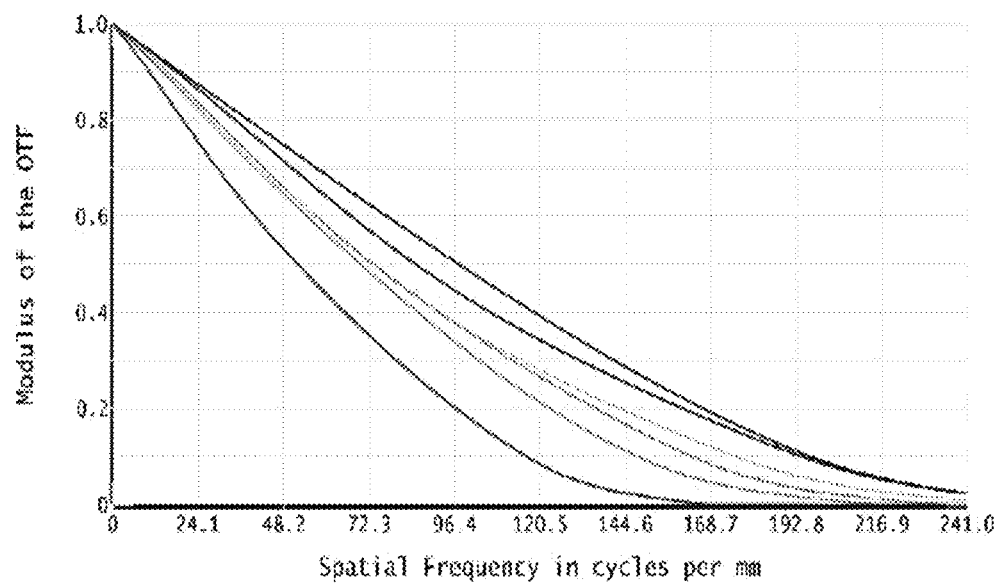

The first lens element (701) is a protective layer or a filter made of glass or plastic or polymer or composite materials having refractive index is greater than 1. The second lens element (702) has a refracting power. The object side surface comprises concave portion in the vicinity of the optical axis and a convex portion in the vicinity of a periphery of the second lens element. The image side surface comprises a concave portion in the vicinity of the optical axis. The third lens element (703) has a positive refracting power. The image side surface comprises a convex portion in the vicinity of the optical axis and a concave portion in the vicinity of a periphery of the fifth lens element. The object side surface comprises a concave portion in the vicinity of the optical axis and a convex portion in a peripheral vicinity. The fourth lens element (704) has a positive refracting power. The image side surface comprises a concave portion and is meniscus in the vicinity of the optical axis. The object side surface comprises of a convex portion and is meniscus in the vicinity of the optical axis. The fifth lens element (705) has positive refracting power. The object side surface is convex surface. The sixth lens element (706) has negative refracting power. The image side surface is a concave surface comprising a concave portion in the vicinity of the optical axis. The seventh lens element (707) has refracting power. The object side surface is a concave surface. The eighth lens element (708) has positive refracting power. The image side surface is convex surface. The ninth lens element (709) has positive refracting power. The object side surface is a convex surface, and the image side surface is a concave surface. The tenth lens element (710) has negative refracting power. The image side surface is a concave surface comprising a concave portion in the vicinity of the optical axis. The eleventh lens element (711) has refracting power. The object side surface is a convex surface near the optical axis and the image side surface is a concave surface and is meniscus near the optical axis. The twelfth lens element (712) has refracting power. The object side surface comprises a concave portion and is meniscus in the vicinity of the optical axis. The image side surface comprises a convex portion and is meniscus in the vicinity of the optical. The thirteenth lens element (713) has negative refracting power. The object side surface comprises a concave portion in the vicinity of the optical axis. The image side surface comprises a convex portion in the vicinity of the optical axis. The fourteenth lens element (714) has refracting power. The object side surface comprises a convex portion in the vicinity of the optical axis and a concave portion in the vicinity of a periphery of the fourteenth lens element. The image side surface comprises a concave portion in the vicinity of the optical axis and a convex portion in the vicinity of a periphery of the fourteenth lens element. The fifteenth lens element (715) is a filter or an IR filter. The optical lens assembly data of the eleventh embodiment is shown in Table 11A and the aspheric data is shown in Table 11B. The distortion plot and the MTF plot are shown in FIGS. 14*b* and 14*c*. The optical lens assembly (2) of the eleventh embodiment has:

Magnification=1×, Numerical aperture=0.072, Focal length=1.34814, WFNO=7.06268, System length: 8.8425 mm, HFOV: 38.35 degree, Airy Radius: 5.063 micron, Depth of field: 117.12 micron.

TABLE 11A

The optical assembly data of eleventh embodiment

| S. No. | Lens Element Number | Radius of curvature (mm) | Thickness (mm) of lens element OR air gap (mm) with the previous or next element | Refractive Index | Abbe No. |
|---|---|---|---|---|---|
| 0 | | Infinity | 2.24E-01 | | |
| 1 | 1 | Infinity | 1.05E-01 | 1.52 | 64.2 |
| 2 | | Infinity | 1.50E-01 | | |
| 3 | 2 | -3.31E-01 | 1.90E-01 | 1.51 | 56.5 |
| 4 | | 4.24E-01 | 5.25E-01 | | |
| 5 | 3 | -6.06E-01 | 2.49E-01 | 1.54 | 56 |
| 6 | | -1.28E+00 | 2.00E-02 | | |
| 7 | 4 | 1.08E+00 | 1.85E-01 | 1.61 | 26.9 |
| 8 | | 1.64E+00 | 2.02E-01 | | |
| 9 | 5 | 4.04E-01 | 3.03E-01 | 1.54 | 56 |
| 10 | | -1.24E-01 | 1.19E-01 | | |
| 11 | 6 | -2.33E-01 | 1.16E-01 | 1.67 | 19.5 |
| 12 | | -1.07E-01 | 2.33E-01 | | |
| 13 | 7 | -9.11E-01 | 1.15E-01 | 1.61 | 26.9 |
| 14 | | -5.21E-01 | 2.00E-02 | | |
| 15 | 8 | -2.25E-02 | 3.92E-01 | 1.54 | 56 |
| 16 | | -8.68E-01 | 2.24E-01 | | |
| 17 | Aperture Stop | Infinity | 5.00E-01 | | |
| 18 | 9 | 5.92E-01 | 5.23E-01 | 1.54 | 55.9 |
| 19 | | 2.09E-02 | 3.60E-02 | | |
| 20 | 10 | 3.29E-01 | 2.40E-01 | 1.64 | 23.3 |
| 21 | | 5.93E-01 | 3.80E-01 | | |
| 22 | 11 | 1.26E-01 | 2.74E-01 | 1.54 | 55.9 |
| 23 | | 2.02E-01 | 1.86E-01 | | |
| 24 | 12 | -4.87E-03 | 3.60E-01 | 1.54 | 55.9 |
| 25 | | -4.01E-01 | 3.47E-01 | | |
| 26 | 13 | -1.22E+00 | 3.00E-01 | 1.64 | 23.3 |
| 27 | | -8.70E-01 | 7.20E-02 | | |
| 28 | 14 | 4.36E-01 | 1.23E+00 | 1.54 | 55.9 |
| 29 | | 5.14E-01 | 5.00E-01 | | |
| 30 | 15 | Infinity | 3.00E-01 | 1.52 | 64.2 |
| 31 | | Infinity | 4.49E-01 | | |

TABLE 11B

The aspheric data of eleventh embodiment

| S.No. | Conic | 4th order | 6th order | 8th order | 10th order | 12th order | 14th order | 16th order |
|---|---|---|---|---|---|---|---|---|
| 0 | 0.00E+00 | 0.00E+00 | 0.00E+00 | 0.00E+00 | 0.00E+00 | 0.00E+00 | 0.00E+00 | 0.00E+00 |
| 1 | 0.00E+00 | 0.00E+00 | 0.00E+00 | 0.00E+00 | 0.00E+00 | 0.00E+00 | 0.00E+00 | 0.00E+00 |
| 2 | 0.00E+00 | 0.00E+00 | 0.00E+00 | 0.00E+00 | 0.00E+00 | 0.00E+00 | 0.00E+00 | 0.00E+00 |
| 3 | 2.04E-01 | 5.30E-01 | -3.19E-01 | -9.68E-02 | 2.30E-01 | -1.19E-01 | 2.64E-02 | -2.19E-03 |
| 4 | -1.25E+01 | 6.03E-01 | -2.30E-01 | -5.58E-01 | 6.37E-01 | -2.86E-01 | 6.10E-02 | -5.07E-03 |
| 5 | -6.66E+00 | -2.21E-01 | 1.27E+00 | 2.13E+00 | 2.03E+00 | -1.13E+00 | 3.37E-01 | -4.18E-02 |
| 6 | -7.07E+00 | -2.04E-01 | 1.11E+00 | -1.80E+00 | 1.67E+00 | -7.59E-01 | 1.27E-01 | 9.00E-04 |
| 7 | -8.26E-01 | -3.68E-01 | 1.96E+00 | -6.79E+00 | 1.20E+01 | -1.23E+01 | 6.67E+00 | -1.43E+00 |
| 8 | -5.26E+00 | 1.68E-01 | 1.02E+00 | -3.52E+00 | -2.01E+00 | 1.52E+01 | -1.70E+01 | 6.04E+00 |
| 9 | -8.83E-01 | 4.15E-01 | 1.15E+00 | 6.46E+00 | -2.22E+01 | 3.09E+01 | -1.49E+01 | 0.00E+00 |

TABLE 11B-continued

The aspheric data of eleventh embodiment

| S.No. | Conic | 4th order | 6th order | 8th order | 10th order | 12th order | 14th order | 16th order |
|---|---|---|---|---|---|---|---|---|
| 10 | −3.43E+01 | 4.64E−01 | 1.67E+00 | 8.39E+00 | −2.67E+01 | 3.82E+01 | −1.98E+01 | 0.00E+00 |
| 11 | −6.74E+01 | 2.72E−01 | −9.05E−01 | 8.00E+00 | −2.92E+01 | 4.78E+01 | −3.23E+01 | 0.00E+00 |
| 12 | −9.90E+01 | 3.45E−01 | −6.47E−01 | 9.97E+00 | −3.92E+01 | 7.88E+01 | −6.37E+01 | 0.00E+00 |
| 13 | −5.82E+00 | 1.50E−01 | 1.11E+00 | 4.32E+00 | −1.28E+01 | 2.31E+01 | −1.66E+01 | 0.00E+00 |
| 14 | −5.91E+00 | 8.03E−01 | 3.81E+00 | 1.19E+01 | −2.61E+01 | 3.27E+01 | −1.99E+01 | 0.00E+00 |
| 15 | 5.82E+01 | 3.40E−01 | 2.11E+00 | 7.57E+00 | −1.45E+01 | 1.48E+01 | −5.86E+00 | 0.00E+00 |
| 16 | −3.05E−01 | −4.83E−03 | −2.03E−01 | 1.24E+00 | −3.13E+00 | 4.64E+00 | −1.81E+00 | 0.00E+00 |
| 17 | 0.00E+00 | 0.00E+00 | 0.00E+00 | 0.00E+00 | 0.00E+00 | 0.00E+00 | 0.00E+00 | 0.00E+00 |
| 18 | 1.87E−01 | −6.19E−04 | 2.84E−02 | −5.01E−02 | −3.41E−03 | 9.96E−02 | −7.75E−02 | 0.00E+00 |
| 19 | 5.00E+00 | −4.55E−02 | 1.26E−01 | −1.08E−01 | −1.12E−02 | 4.29E−02 | −3.65E−02 | 0.00E+00 |
| 20 | 2.08E+01 | −7.12E−02 | 1.27E−01 | −3.61E−02 | −1.22E−01 | 4.49E−02 | 1.52E−02 | 0.00E+00 |
| 21 | −5.06E+00 | 2.54E−03 | 4.21E−02 | 9.49E−02 | −2.29E−01 | 1.53E−01 | −2.43E−02 | 0.00E+00 |
| 22 | 0.00E+00 | −7.05E−02 | −4.28E−02 | 6.10E−02 | −4.24E−02 | −4.00E−11 | 0.00E+00 | 0.00E+00 |
| 23 | 0.00E+00 | −7.85E−02 | −1.09E−02 | −2.65E−02 | 1.43E−03 | −2.61E−10 | 0.00E+00 | 0.00E+00 |
| 24 | −4.00E+01 | −9.72E−02 | −5.61E−03 | 6.68E−03 | −3.66E−02 | −8.14E−03 | 9.16E−02 | −4.85E−02 |
| 25 | 1.64E+00 | −4.40E−02 | −1.77E−02 | 2.72E−02 | 3.65E−02 | −3.58E−03 | −6.59E−03 | 0.00E+00 |
| 26 | −3.79E+00 | −4.96E−02 | −1.42E−02 | 1.21E−01 | −5.28E−02 | −1.06E−02 | 4.82E−03 | 4.01E−04 |
| 27 | −8.17E−01 | 1.35E−01 | −3.79E−02 | 1.77E−02 | 8.43E−03 | −3.20E−02 | −2.54E−03 | 8.16E−04 |
| 28 | −3.16E+01 | −1.28E−01 | 7.01E−02 | −4.19E−02 | 2.10E−02 | −5.90E−03 | 8.22E−04 | −4.49E−05 |
| 29 | −9.11E+00 | −5.19E−02 | 2.04E−02 | −8.27E−03 | 2.25E−03 | −3.85E−04 | 3.66E−05 | −1.43E−06 |
| 30 | 0.00E+00 | 0.00E+00 | 0.00E+00 | 0.00E+00 | 0.00E+00 | 0.00E+00 | 0.00E+00 | 0.00E+00 |
| 31 | 0.00E+00 | 0.00E+00 | 0.00E+00 | 0.00E+00 | 0.00E+00 | 0.00E+00 | 0.00E+00 | 0.00E+00 |

The optical lens assembly of the eleventh embodiment includes:
a first lens element having a planar object side surface, a planar image side surface, a thickness of about 0.105 mm, a refractive index of about 1.52, and Abbe number of about 64.2;
a second lens element having an object side surface of a radius of curvature of about −0.331 mm, an image side surface of a radius of curvature of about 0.424 mm, a thickness of about 0.19 mm, a refractive index of about 1.51, and Abbe number of about 56.5;
a third lens element having an object side surface of a radius of curvature of about −0.606 mm, an image side surface of a radius of curvature of about −1.28 mm, a thickness of about 0.249 mm, a refractive index of about 1.54, and Abbe number of about 56;
a fourth lens element having an object side surface of a radius of curvature of about 1.08 mm, an image side surface of a radius of curvature of about 1.64 mm, a thickness of about 0.185 mm, a refractive index of about 1.61, and Abbe number of about 26.9;
a fifth lens element having an object side surface of a radius of curvature of about 0.404 mm, an image side surface of a radius of curvature of about −0.124 mm, a thickness of about 0.303 mm, a refractive index of about 1.54, and Abbe number of about 56;
a sixth lens element having an object side surface of a radius of curvature of about −0.233 mm, an image side surface of a radius of curvature of about −0.107 mm, a thickness of about 0.116 mm, a refractive index of about 1.67, and Abbe number of about 19.5;
a seventh lens element having an object side surface of a radius of curvature of about −0.911 mm, an image side surface of a radius of curvature of about −0.521 mm, a thickness of about 0.115 mm, a refractive index of about 1.61, and Abbe number of about 26.9;
an eighth lens element having an object side surface of a radius of curvature of about −0.0225 mm, an image side surface of a radius of curvature of about −0.868 mm, a thickness of about 0.392 mm, a refractive index of about 1.54, and Abbe number of about 56;
a ninth lens element having an object side surface of a radius of curvature of about 0.592 mm, an image side surface of a radius of curvature of about 0.0209 mm, a thickness of about 0.523 mm, a refractive index of about 1.54, and Abbe number of about 55.9;
a tenth lens element having an object side surface of a radius of curvature of about 0.329 mm, an image side surface of a radius of curvature of about 0.593 mm, a thickness of about 0.24 mm, a refractive index of about 1.64, and Abbe number of about 23.3;
an eleventh lens element having an object side surface of a radius of curvature of about 0.126 mm, an image side surface of a radius of curvature of about 0.202 mm, a thickness of about 0.274 mm, a refractive index of about 1.54, and Abbe number of about 55.9;
a twelfth lens element having an object side surface of a radius of curvature of about −0.00487 mm, an image side surface of a radius of curvature of about −0.401 mm, a thickness of about 0.36 mm, a refractive index of about 1.54, and Abbe number of about 55.9;
a thirteenth lens element having an object side surface of a radius of curvature of about −1.22 mm, an image side surface of a radius of curvature of about −0.87 mm, a thickness of about 0.3 mm, a refractive index of about 1.64, and Abbe number of about 23.3;
a fourteenth lens element having an object side surface of a radius of curvature of about 0.436 mm, an image side surface of a radius of curvature of about 0.514 mm, a thickness of about 1.23 mm, a refractive index of about 1.54, and Abbe number of about 55.9; and
a fifteenth lens element having a planar object side surface, a planar image side surface, a thickness of about 0.3 mm, a refractive index of about 1.52, and Abbe number of about 64.2,
wherein the optical lens assembly comprises an aperture stop positioned between the eighth lens element and the ninth lens element, wherein the aperture stop is a planar element having a thickness of about 0.5.

Table 12 tabulates the optical parameters of the twelve example embodiments described herein.

TABLE 12

Optical parameter of all embodiments

| Embodiment | HFOV (degree) | NA | Optical magnification | System length (mm) | Depth of field (micron) | Airy radius (micron) |
|---|---|---|---|---|---|---|
| 1 | 12.6 | 0.035 | 2X | 17.9 | 121.38 | 10.31 |
| 2 | 20 | 0.046 | 2X | 8.76 | 69.99 | 7.82 |
| 3 | 10 | 0.097 | 1X | 9.512 | 64.47 | 3.75 |
| 4 | 25 | 0.025 | 3X | 8.44 | 109.85 | 14.71 |
| 5 | 20 | 0.041 | 2X | 7.635 | 88.83 | 8.81 |
| 6 | 21 | 0.103 | 1X | 8.33 | 55.55 | 3.487 |
| 7 | 25 | 0.047 | 3X | 6.89 | 28.89 | 7.67 |
| 8 | 18 | 0.068 | 1X | 8.18 | 132.11 | 5.38 |
| 9 | 38.35 | 0.176 | 1X | 10 | 164.1 | 5.99 |
| 10 | 36 | 0.052 | 2X | 9.58 | 55.68 | 6.98 |
| 11 | 38.35 | 0.072 | 1X | 8.84 | 117.12 | 5.06 |

In an example, a portable imaging system includes an optical microscopy device as described in the description herein. The portable imaging system is one of a smartphone, a portable computing device, a portable medical device, a portable microscope, and a portable analytical instrument.

We claim:

1. An optical microscopy device for a portable imaging system, the optical microscope device comprising:
    an optical lens assembly with ten to sixteen lens elements, wherein the optical lens assembly has:
    an optical magnification in a range of about 1× to about 3×;
    an airy radius in a range of about 3.2 micron to about 15 micron;
    a depth of field in a range of about 28 micron to about 133 micron;
    a numerical aperture in a range of about 0.025 to about 0.176;
    a half field of view in a range of about 10 degrees to about 39 degrees; and
    a length in a range of about 6.8 millimeter (mm) to about 18 mm.

2. The optical microscopy device as claimed in claim 1, the optical microscopy device comprising a focusing unit having a barrel, wherein the optical lens assembly is disposed within the barrel of the focusing unit, and wherein the focusing unit is to operate the optical lens assembly for focusing while imaging an object.

3. The optical microscopy device as claimed in claim 1, the optical microscopy device comprising a light source placed adjacent to the optical lens assembly to emit light such that the emitted light is incident on a sample held within a sample holder, when the sample holder is placed over the optical lens assembly.

4. The optical microscopy device as claimed in claim 1, the optical microscopy device comprising an image capturing unit adjacent to the optical lens assembly to image an object in field of view of the optical lens assembly.

5. The optical microscopy device as claimed in claim 4, wherein the image capturing unit is a photo sensor or a camera with a pixel size in a range of 0.5 micron to 5 micron, and wherein the image capturing unit is of 0.3 megapixel (MP) to 350 MP.

6. The optical microscopy device as claimed in claim 1, wherein the optical lens assembly has an optical magnification of about 2×, a numerical aperture of about 0.035, a length of about 17.9 mm, a half field of view of about 12.6 degree, a depth of field of about 121.38 micron, and an airy radius of about 10.31 micron, wherein the optical lens assembly comprises ten lens elements having:
    a first lens element having a planar object side surface, a planar image side surface, a thickness of about 0.40 mm, a refractive index of about 1.52, and Abbe number of about 64.2;
    a second lens element having an object side surface of a radius of curvature of about 13.10 mm, an image side surface of a radius of curvature of about −1.80 mm, a thickness of about 1.35 mm, a refractive index of about 1.53, and Abbe number of about 55.8;
    a third lens element having an object side surface of a radius of curvature of about 1.02 mm, an image side surface of a radius of curvature of about 0.508 mm, a thickness of about 0.345 mm, a refractive index of about 1.63, and Abbe number of about 23.4;
    a fourth lens element having an object side surface of a radius of curvature of about 1.28 mm, an image side surface of a radius of curvature of about 5.20 mm, a thickness of about 1.03 mm, a refractive index of about 1.52, and Abbe number of about 52.2;
    a fifth lens element having an object side surface of a radius of curvature of about 3.37 mm, an image side surface of a radius of curvature of about 332 mm, a thickness of about 0.806 mm, a refractive index of about 1.54, and Abbe number of about 56.1;
    a sixth lens element having an object side surface of a radius of curvature of about 15.4 mm, an image side surface of a radius of curvature of about 5.43 mm, a thickness of about 0.46 mm, a refractive index of about 1.64, and Abbe number of about 23.3;
    a seventh lens element having an object side surface of a radius of curvature of about −15.8 mm, an image side surface of a radius of curvature of about −3.91 mm, a thickness of about 1.16 mm, a refractive index of about 1.54, and Abbe number of about 56.1;
    an eighth lens element having an object side surface of a radius of curvature of about −1.82 mm, an image side surface of a radius of curvature of about −2.88 mm, a thickness of about 0.988 mm, a refractive index of about 1.64, and Abbe number of about 23.3;
    a ninth lens element having an object side surface of a radius of curvature of about 3.33 mm, an image side surface of a radius of curvature of about 2.96 mm, a thickness of about 1.68 mm, a refractive index of about 1.54, and Abbe number of about 56.1; and
    a tenth lens element having a planar object side surface, a planar image side surface, a thickness of about 0.6 mm, a refractive index of about 1.517, and Abbe number of about 64.2,
    wherein the optical lens assembly comprises an aperture stop positioned between the fourth lens element and the fifth lens element, wherein the aperture stop is a planar element having a thickness of about 0.321 mm.

7. The optical microscopy device as claimed in claim 1, wherein the optical lens assembly has an optical magnification of about 2×, a numerical aperture of about 0.046, a length of about 8.76 mm, a half field of view of about 20 degree, a depth of field of about 69.99 micron, and an airy radius of about 7.82 micron, wherein the optical lens assembly comprises ten lens elements having:
  a first lens element having a planar object side surface, a planar image side surface, a thickness of about 0.40 mm, a refractive index of about 1.52, and Abbe number of about 64.2;
  a second lens element having an object side surface of a radius of curvature of about −1.42 mm, an image side surface of a radius of curvature of about −1.24 mm, a thickness of about 0.31 mm, a refractive index of about 1.51, and Abbe number of about 56.4;
  a third lens element having an object side surface of a radius of curvature of about 1.92 mm, an image side surface of a radius of curvature of about 2.11 mm, a thickness of about 0.365 mm, a refractive index of about 1.51, and Abbe number of about 56.4;
  a fourth lens element having an object side surface of a radius of curvature of about −0.0387 mm, an image side surface of a radius of curvature of about −0.695 mm, a thickness of about 0.2 mm, a refractive index of about 1.85, and Abbe number of about 23.8;
  a fifth lens element juxtaposed with the fourth lens and having an object side surface of a radius of curvature of about 0.695 mm, an image side surface of a radius of curvature of about −0.695 mm, a thickness of about 0.67 mm, a refractive index of about 1.74, and Abbe number of about 49.2;
  a sixth lens element having an object side surface of a radius of curvature of about 0.333 mm, an image side surface of a radius of curvature of about −0.243 mm, a thickness of about 0.949 mm, a refractive index of about 1.54, and Abbe number of about 56.1;
  a seventh lens element having an object side surface of a radius of curvature of about −0.685 mm, an image side surface of a radius of curvature of about −0.299 mm, a thickness of about 0.581 mm, a refractive index of about 1.64, and Abbe number of about 23;
  an eighth lens element having an object side surface of a radius of curvature of about 0.104 mm, an image side surface of a radius of curvature of about −0.241 mm, a thickness of about 1.17 mm, a refractive index of about 1.54, and Abbe number of about 56.1;
  a ninth lens element having an object side surface of a radius of curvature of about 0.611 mm, an image side surface of a radius of curvature of about 0.881 mm, a thickness of about 0.616 mm, a refractive index of about 1.53, and Abbe number of about 56;
  a tenth lens element having a planar object side surface, a planar image side surface, a thickness of about 0.42 mm, a refractive index of about 1.52, and Abbe number of about 64.2,
  wherein the optical lens assembly comprises an aperture stop positioned between the fifth lens element and the sixth lens element, wherein the aperture stop is a planar element having a thickness of about 0.1 mm.

8. The optical microscopy device as claimed in claim 1, wherein the optical lens assembly has an optical magnification of about 1×, a numerical aperture of about 0.097, a length of about 9.512 mm, a half field of view of about 10 degree, a depth of field of about 64.47 micron, and an airy radius of about 3.75 micron, wherein the optical lens assembly comprises eleven lens elements having:
  a first lens element having a planar object side surface, a planar image side surface, a thickness of about 0.8 mm, a refractive index of about 1.5168, and Abbe number of about 64.2;
  a second lens element having an object side surface of a radius of curvature of about −1.41 mm, an image side surface of a radius of curvature of about −1.61 mm, a thickness of about 0.62 mm, a refractive index of about 1.50914, and Abbe number of about 56.4;
  a third lens element having an object side surface of a radius of curvature of about 1.04 mm, an image side surface of a radius of curvature of about 0.949 mm, a thickness of about 0.73 mm, a refractive index of about 1.50914, and Abbe number of about 56.4;
  a fourth lens element having an object side surface of a radius of curvature of about −51.7 mm, an image side surface of a radius of curvature of about −2.88 mm, a thickness of about 0.4 mm, a refractive index of about 1.84666, and Abbe number of about 23.8;
  a fifth lens element juxtaposed with the fourth lens and having an object side surface of a radius of curvature of about 2.88 mm, an image side surface of a radius of curvature of about −2.88 mm, a thickness of about 1.34 mm, a refractive index of about 1.743, and Abbe number of about 49.2;
  a sixth lens element having an object side surface of a radius of curvature of about 1.87 mm, an image side surface of a radius of curvature of about −12.90 mm, a thickness of about 0.99 mm, a refractive index of about 1.5447, and Abbe number of about 56.2;
  a seventh lens element having an object side surface of a radius of curvature of about −77.8 mm, an image side surface of a radius of curvature of about 3.13 mm, a thickness of about 0.30 mm, a refractive index of about 1.632, and Abbe number of about 23.4;
  an eighth lens element having an object side surface of a radius of curvature of about −7.80 mm, an image side surface of a radius of curvature of about −5.36 mm, a thickness of about 0.49 mm, a refractive index of about 1.632, and Abbe number of about 23.4;
  a ninth lens element having an object side surface of a radius of curvature of about −3.73 mm, an image side surface of a radius of curvature of about −1.73 mm, a thickness of about 0.89 mm, a refractive index of about 1.5447, and Abbe number of about 56.2;
  a tenth lens element having an object side surface of a radius of curvature of about −3.74 mm, an image side surface of a radius of curvature of about 3.35 mm, a thickness of about 0.50 mm, a refractive index of about 1.5447, and Abbe number of about 56.2; and
  an eleventh lens element having a planar object side surface, a planar image side surface, a thickness of about 0.15 mm, a refractive index of about 1.5163, and Abbe number of about 64.1,
  wherein the optical lens assembly comprises an aperture stop positioned between the fifth lens element and the sixth lens element, wherein the aperture stop is a planar element having a thickness of about 0.40 mm.

9. The optical microscopy device as claimed in claim 1, wherein the optical lens assembly has an optical magnification of about 3×, a numerical aperture of about 0.025, a length of about 7.635 mm, a half field of view of about 25 degree, a depth of field of about 109.85 micron, and an airy radius of about 14.71 micron, wherein the optical lens assembly comprises twelve lens elements having:

a first lens element having a planar object side surface, a planar image side surface, a thickness of about 0.105 mm, a refractive index of about 1.52, and Abbe number of about 64.2;

a second lens element having an object side surface of a radius of curvature of about −1.7 mm, an image side surface of a radius of curvature of about −2.11 mm, a thickness of about 0.23 mm, a refractive index of about 1.53, and Abbe number of about 55.8;

a third lens element having an object side surface of a radius of curvature of about −2.08 mm, an image side surface of a radius of curvature of about −1.37 mm, a thickness of about 0.187 mm, a refractive index of about 1.53, and Abbe number of about 55.8;

a fourth lens element having an object side surface of a radius of curvature of about 1.53 mm, an image side surface of a radius of curvature of about 1.28 mm, a thickness of about 0.292 mm, a refractive index of about 1.53, and Abbe number of about 55.8;

a fifth lens element having an object side surface of a radius of curvature of about 0.0897 mm, an image side surface of a radius of curvature of about 0.0545 mm, a thickness of about 0.15 mm, a refractive index of about 1.63, and Abbe number of about 23.4;

a sixth lens element having an object side surface of a radius of curvature of about 0.0656 mm, an image side surface of a radius of curvature of about −0.963 mm, a thickness of about 0.202 mm, a refractive index of about 1.54, and Abbe number of about 55.9;

a seventh lens element having an object side surface of a radius of curvature of about 0.535 mm, an image side surface of a radius of curvature of about −0.0777 mm, a thickness of about 0.99 mm, a refractive index of about 1.54, and Abbe number of about 56.2;

an eighth lens element having an object side surface of a radius of curvature of about −0.0129 mm, an image side surface of a radius of curvature of about 0.319 mm, a thickness of about 0.3 mm, a refractive index of about 1.63, and Abbe number of about 23.4;

a ninth lens element having an object side surface of a radius of curvature of about −0.128 mm, an image side surface of a radius of curvature of about −0.186 mm, a thickness of about 0.49 mm, a refractive index of about 1.63, and Abbe number of about 23.4;

a tenth lens element having an object side surface of a radius of curvature of about −0.268 mm, an image side surface of a radius of curvature of about −0.579 mm, a thickness of about 0.89 mm, a refractive index of about 1.54, and Abbe number of about 56.2;

an eleventh lens element having an object side surface of a radius of curvature of about −0.267 mm, an image side surface of a radius of curvature of about 0.298 mm, a thickness of about 0.5 mm, a refractive index of about 1.54, and Abbe number of about 56.2; and a twelfth lens element having a planar object side surface, a planar image side surface, a thickness of about 0.15 mm, a refractive index of about 1.52, and Abbe number of about 64.1, wherein the optical lens assembly comprises an aperture stop positioned between the sixth lens element and the seventh lens element, wherein the aperture stop is a planar element having a thickness of about 0.186 mm.

10. The optical microscopy device as claimed in claim 1, wherein the optical lens assembly has an optical magnification of about 2×, a numerical aperture of about 0.041, a length of about 7.635 mm, a half field of view of about 20 degree, a depth of field of about 88.83 micron, and an airy radius of about 8.81 micron, wherein the optical lens assembly comprises twelve lens elements having:

a first lens element having a planar object side surface, a planar image side surface, a thickness of about 0.105 mm, a refractive index of about 1.52, and Abbe number of about 64.2;

a second lens element having an object side surface of a radius of curvature of about −1.70 mm, an image side surface of a radius of curvature of about −2.11 mm, a thickness of about 0.23 mm, a refractive index of about 1.53, and Abbe number of about 55.8;

a third lens element having an object side surface of a radius of curvature of about −2.08 mm, an image side surface of a radius of curvature of about −1.37 mm, a thickness of about 0.187 mm, a refractive index of about 1.53, and Abbe number of about 55.8;

a fourth lens element having an object side surface of a radius of curvature of about 1.53 mm, an image side surface of a radius of curvature of about 1.28 mm, a thickness of about 0.292 mm, a refractive index of about 1.53, and Abbe number of about 55.8;

a fifth lens element having an object side surface of a radius of curvature of about 0.0897 mm, an image side surface of a radius of curvature of about 0.545 mm, a thickness of about 0.15 mm, a refractive index of about 1.63, and Abbe number of about 23.4;

a sixth lens element having an object side surface of a radius of curvature of about 0.0656 mm, an image side surface of a radius of curvature of about −0.963 mm, a thickness of about 0.202 mm, a refractive index of about 1.54, and Abbe number of about 55.9;

a seventh lens element having an object side surface of a radius of curvature of about 0.593 mm, an image side surface of a radius of curvature of about 0.00603 mm, a thickness of about 0.403 mm, a refractive index of about 1.54, and Abbe number of about 56.1;

an eighth lens element having an object side surface of a radius of curvature of about 0.13 mm, an image side surface of a radius of curvature of about 0.368 mm, a thickness of about 0.23 mm, a refractive index of about 1.64, and Abbe number of about 23.3;

a ninth lens element having an object side surface of a radius of curvature of about −0.126 mm, an image side surface of a radius of curvature of about −0.512 mm, a thickness of about 0.58 mm, a refractive index of about 1.54, and Abbe number of about 56.1;

a tenth lens element having an object side surface of a radius of curvature of about −1.1 mm, an image side surface of a radius of curvature of about −0.693 mm, a thickness of about 0.494 mm, a refractive index of about 1.64, and Abbe number of about 23.3;

an eleventh lens element having an object side surface of a radius of curvature of about 0.6 mm, an image side surface of a radius of curvature of about 0.676 mm, a thickness of about 0.842 mm, a refractive index of about 1.54, and Abbe number of about 56.1; and a twelfth lens element having a planar object side surface, a planar image side surface, a thickness of about 0.3 mm, a refractive index of about 1.517, and Abbe number of about 64.2, wherein the optical lens assembly comprises an aperture stop positioned between the sixth lens element and the seventh lens element, wherein the aperture stop is a planar element having a thickness of about 0.2 mm.

11. The optical microscopy device as claimed in claim 1, wherein the optical lens assembly has an optical magnification of about 1×, a numerical aperture of about 0.103, a length of about 8.33 mm, a half field of view of about 21 degree, a depth of field of about 55.55 micron, and an airy radius of about 3.487 micron, wherein the optical lens assembly comprises twelve lens elements having:
- a first lens element having a planar object side surface, a planar image side surface, a thickness of about 0.075 mm, a refractive index of about 1.52, and Abbe number of about 64.1;
- a second lens element having an object side surface of a radius of curvature of about −0.596 mm, an image side surface of a radius of curvature of about 0.535 mm, a thickness of about 0.25 mm, a refractive index of about 1.54, and Abbe number of about 56.2;
- a third lens element having an object side surface of a radius of curvature of about 1.16 mm, an image side surface of a radius of curvature of about 0.536 mm, a thickness of about 0.445 mm, a refractive index of about 1.54, and Abbe number of about 56.2;
- a fourth lens element having an object side surface of a radius of curvature of about 0.373 mm, an image side surface of a radius of curvature of about 0.256 mm, a thickness of about 0.245 mm, a refractive index of about 1.63, and Abbe number of about 23.4;
- a fifth lens element having an object side surface of a radius of curvature of about −0.639 mm, an image side surface of a radius of curvature of about 0.0257 mm, a thickness of about 0.15 mm, a refractive index of about 1.63, and Abbe number of about 23.4;
- a sixth lens element having an object side surface of a radius of curvature of about 0.155 mm, an image side surface of a radius of curvature of about −1.07 mm, a thickness of about 0.495 mm, a refractive index of about 1.54, and Abbe number of about 56.2;
- a seventh lens element having an object side surface of a radius of curvature of about 0.481 mm, an image side surface of a radius of curvature of about −0.0328 mm, a thickness of about 0.403 mm, a refractive index of about 1.54, and Abbe number of about 55.9;
- an eighth lens element having an object side surface of a radius of curvature of about −0.272 mm, an image side surface of a radius of curvature of about −0.0448 mm, a thickness of about 0.30 mm, a refractive index of about 1.63, and Abbe number of about 23.4;
- a ninth lens element having an object side surface of a radius of curvature of about −0.64 mm, an image side surface of a radius of curvature of about −0.763 mm, a thickness of about 0.583 mm, a refractive index of about 1.53, and Abbe number of about 55.8;
- a tenth lens element having an object side surface of a radius of curvature of about 0.686 mm, an image side surface of a radius of curvature of about 1.04 mm, a thickness of about 0.373 mm, a refractive index of about 1.53, and Abbe number of about 55.8;
- an eleventh lens element having an object side surface of a radius of curvature of about 1.05 mm, an image side surface of a radius of curvature of about 0.849 mm, a thickness of about 0.46 mm, a refractive index of about 1.53, and Abbe number of about 55.8; and
- a twelfth lens element having a planar object side surface, a planar image side surface, a thickness of about 0.21 mm, a refractive index of about 1.52, and Abbe number of about 64.2,
- wherein the optical lens assembly comprises an aperture stop positioned between the sixth lens element and the seventh lens element, wherein the aperture stop is a planar element having a thickness of about 0.50 mm.

12. The optical microscopy device as claimed in claim 1, wherein the optical lens assembly has an optical magnification of about 3×, a numerical aperture of about 0.0.47, a length of about 6.89 mm, a half field of view of about 25 degree, a depth of field of about 28.89 micron, and an airy radius of about 7.67 micron, wherein the optical lens assembly comprises twelve lens elements having:
- a first lens element having a planar object side surface, a planar image side surface, a thickness of about 0.375 mm, a refractive index of about 1.52, and Abbe number of about 64.1;
- a second lens element having an object side surface of a radius of curvature of about −1.19 mm, an image side surface of a radius of curvature of about 1.07 mm, a thickness of about 0.125 mm, a refractive index of about 1.54, and Abbe number of about 56.2;
- a third lens element having an object side surface of a radius of curvature of about 2.32 mm, an image side surface of a radius of curvature of about 1.07 mm, a thickness of about 0.223 mm, a refractive index of about 1.54, and Abbe number of about 56.2;
- a fourth lens element having an object side surface of a radius of curvature of about 0.746 mm, an image side surface of a radius of curvature of about 0.513 mm, a thickness of about 0.123 mm, a refractive index of about 1.63, and Abbe number of about 23.4;
- a fifth lens element having an object side surface of a radius of curvature of about −1.28 mm, an image side surface of a radius of curvature of about 0.0514 mm, a thickness of about 0.075 mm, a refractive index of about 1.63, and Abbe number of about 23.4;
- a sixth lens element having an object side surface of a radius of curvature of about 0.311 mm, an image side surface of a radius of curvature of about −2.14 mm, a thickness of about 0.248 mm, a refractive index of about 1.54, and Abbe number of about 56.2;
- a seventh lens element having an object side surface of a radius of curvature of about 0.593 mm, an image side surface of a radius of curvature of about 0.00603 mm, a thickness of about 0.403 mm, a refractive index of about 1.54, and Abbe number of about 56.1;
- an eighth lens element having an object side surface of a radius of curvature of about 0.13 mm, an image side surface of a radius of curvature of about 0.368 mm, a thickness of about 0.23 mm, a refractive index of about 1.64, and Abbe number of about 23.4;
- a ninth lens element having an object side surface of a radius of curvature of about −0.126 mm, an image side surface of a radius of curvature of about −0.512 mm, a thickness of about 0.58 mm, a refractive index of about 1.54, and Abbe number of about 56.1;
- a tenth lens element having an object side surface of a radius of curvature of about −1.1 mm, an image side surface of a radius of curvature of about −0.693 mm, a thickness of about 0.494 mm, a refractive index of about 1.64, and Abbe number of about 23.4;
- an eleventh lens element having an object side surface of a radius of curvature of about 0.6 mm, an image side surface of a radius of curvature of about 0.676 mm, a thickness of about 0.842 mm, a refractive index of about 1.54, and Abbe number of about 56.1; and
- a twelfth lens element having a planar object side surface, a planar image side surface, a thickness of about 0.30 mm, a refractive index of about 1.517, and Abbe number of about 64.2,
- wherein the optical lens assembly comprises an aperture stop positioned between the sixth lens element and the seventh lens element, wherein the aperture stop is a planar element having a thickness of about 0.20 mm.

13. The optical microscopy device as claimed in claim 1, wherein the optical lens assembly has an optical magnification of about 1×, a numerical aperture of about 0.068, a length of about 8.18 mm, a half field of view of about 18 degree, a depth of field of about 132.11 micron, and an airy radius of about 5.38 micron, wherein the optical lens assembly comprises fifteen lens elements having:
- a first lens element having a planar object side surface, a planar image side surface, a thickness of about 0.15 mm, a refractive index of about 1.52, and Abbe number of about 64.2;
- a second lens element having an object side surface of a radius of curvature of about −1.03 mm, an image side surface of a radius of curvature of about −0.872 mm, a thickness of about 0.615 mm, a refractive index of about 1.54, and Abbe number of about 55.9;
- a third lens element having an object side surface of a radius of curvature of about 1.74 mm, an image side surface of a radius of curvature of about 2.44 mm, a thickness of about 0.15 mm, a refractive index of about 1.64, and Abbe number of about 23.3;
- a fourth lens element having an object side surface of a radius of curvature of about 0.802 mm, an image side surface of a radius of curvature of about 0.00974 mm, a thickness of about 0.18 mm, a refractive index of about 1.54, and Abbe number of about 55.9;
- a fifth lens element having an object side surface of a radius of curvature of about −0.404 mm, an image side surface of a radius of curvature of about −0.253 mm, a thickness of about 0.137 mm, a refractive index of about 1.54, and Abbe number of about 55.9;
- a sixth lens element having an object side surface of a radius of curvature of about −1.19 mm, an image side surface of a radius of curvature of about −0.657 mm, a thickness of about 0.12 mm, a refractive index of about 1.64, and Abbe number of about 23.3;
- a seventh lens element having an object side surface of a radius of curvature of about −0.0419 mm, an image side surface of a radius of curvature of about −1.18 mm, a thickness of about 0.262 mm, a refractive index of about 1.54, and Abbe number of about 55.9;
- an eighth lens element having an object side surface of a radius of curvature of about 0.472 mm, an image side surface of a radius of curvature of about −0.119 mm, a thickness of about 0.706 mm, a refractive index of about 1.53, and Abbe number of about 56.2;
- a ninth lens element having an object side surface of a radius of curvature of about 0.43 mm, an image side surface of a radius of curvature of about 0.787 mm, a thickness of about 0.28 mm, a refractive index of about 1.64, and Abbe number of about 23.9;
- a tenth lens element having an object side surface of a radius of curvature of about 0.087 mm, an image side surface of a radius of curvature of about −0.0677 mm, a thickness of about 0.488 mm, a refractive index of about 1.53, and Abbe number of about 56.2;
- an eleventh lens element having an object side surface of a radius of curvature of about 0.14 mm, an image side surface of a radius of curvature of about 0.00358 mm, a thickness of about 0.3 mm, a refractive index of about 1.53, and Abbe number of about 56.2;
- a twelfth lens element having an object side surface of a radius of curvature of about −0.58 mm, an image side surface of a radius of curvature of about −0.408 mm, a thickness of about 0.308 mm, a refractive index of about 1.64, and Abbe number of about 23.9;
- a thirteenth lens element having an object side surface of a radius of curvature of about 0.305 mm, an image side surface of a radius of curvature of about −0.439 mm, a thickness of about 0.603 mm, a refractive index of about 1.53, and Abbe number of about 56.2;
- a fourteenth lens element having an object side surface of a radius of curvature of about −0.0361 mm, an image side surface of a radius of curvature of about 0.516 mm, a thickness of about 0.5 mm, a refractive index of about 1.53, and Abbe number of about 56.2; and
- a fifteenth lens element having a planar object side surface, a planar image side surface, a thickness of about 0.3 mm, a refractive index of about 1.52, and Abbe number of about 64.2, wherein the optical lens assembly comprises an aperture stop positioned between the seventh lens element and the eighth lens element, wherein the aperture stop is a planar element having a thickness of about 0.166 mm.

14. The optical microscopy device as claimed in claim 1, wherein the optical lens assembly has an optical magnification of about 1×, a numerical aperture of about 0.176, a length of about 10 mm, a half field of view of about 38.35 degree, a depth of field of about 164.1 micron, and an airy radius of about 5.99 micron, wherein the optical lens assembly comprises sixteen lens elements having:
- a first lens element having a planar object side surface, a planar image side surface, a thickness of about 0.105 mm, a refractive index of about 1.52, and Abbe number of about 64.2;
- a second lens element having an object side surface of a radius of curvature of about −0.331 mm, an image side surface of a radius of curvature of about −0.424 mm, a thickness of about 0.19 mm, a refractive index of about 1.51, and Abbe number of about 56.5;
- a third lens element having an object side surface of a radius of curvature of about −0.606 mm, an image side surface of a radius of curvature of about −1.28 mm, a thickness of about 0.249 mm, a refractive index of about 1.54, and Abbe number of about 56;
- a fourth lens element having an object side surface of a radius of curvature of about 1.08 mm, an image side surface of a radius of curvature of about 1.64 mm, a thickness of about 0.185 mm, a refractive index of about 1.61, and Abbe number of about 26.9;
- a fifth lens element having an object side surface of a radius of curvature of about 0.404 mm, an image side surface of a radius of curvature of about −0.124 mm, a thickness of about 0.303 mm, a refractive index of about 1.54, and Abbe number of about 56;
- a sixth lens element having an object side surface of a radius of curvature of about −0.233 mm, an image side surface of a radius of curvature of about −0.107 mm, a thickness of about 0.116 mm, a refractive index of about 1.67, and Abbe number of about 19.5;
- a seventh lens element having an object side surface of a radius of curvature of about −0.911 mm, an image side surface of a radius of curvature of about −0.521 mm, a thickness of about 0.115 mm, a refractive index of about 1.61, and Abbe number of about 26.9;
- an eighth lens element having an object side surface of a radius of curvature of about −0.0225 mm, an image side surface of a radius of curvature of about −0.868 mm, a thickness of about 0.392 mm, a refractive index of about 1.54, and Abbe number of about 56;

a ninth lens element having an object side surface of a radius of curvature of about 0.434 mm, an image side surface of a radius of curvature of about −0.0112 mm, a thickness of about 0.783 mm, a refractive index of about 1.54, and Abbe number of about 56;

a tenth lens element having an object side surface of a radius of curvature of about 0.26 mm, an image side surface of a radius of curvature of about 0.456 mm, a thickness of about 0.23 mm, a refractive index of about 1.61, and Abbe number of about 26.9;

an eleventh lens element having an object side surface of a radius of curvature of about 0.0534 mm, an image side surface of a radius of curvature of about 0.117 mm, a thickness of about 0231 mm, a refractive index of about 1.67, and Abbe number of about 19.5;

a twelfth lens element having an object side surface of a radius of curvature of about 0.0621 mm, an image side surface of a radius of curvature of about −0.202 mm, a thickness of about 0.606 mm, a refractive index of about 1.54, and Abbe number of about 56;

a thirteenth lens element having an object side surface of a radius of curvature of about −0.822 mm, an image side surface of a radius of curvature of about −0.542 mm, a thickness of about 0.37 mm, a refractive index of about 1.61, and Abbe number of about 26.9;

a fourteenth lens element having an object side surface of a radius of curvature of about 0.64 mm, an image side surface of a radius of curvature of about 0.303 mm, a thickness of about 0.498 mm, a refractive index of about 1.54, and Abbe number of about 56;

a fifteenth lens element having an object side surface of a radius of curvature of about −0.212 mm, an image side surface of a radius of curvature of about 0.165 mm, a thickness of about 0.38 mm, a refractive index of about 1.51, and Abbe number of about 56.5; and a sixteenth lens element having a planar object side surface, a planar image side surface, a thickness of about 0.21 mm, a refractive index of about 1.52, and Abbe number of about 64.2, wherein the optical lens assembly comprises an aperture stop positioned between the eighth lens element and the ninth lens element, wherein the aperture stop is a planar element having a thickness of about 0.5 mm.

15. The optical microscopy device as claimed in claim 1, wherein the optical lens assembly has an optical magnification of about 2×, a numerical aperture of about 0.052, a length of about 9.58 mm, a half field of view of about 36 degree, a depth of field of about 55.68 micron, and an airy radius of about 6.98 micron, wherein the optical lens assembly comprises fourteen lens elements having:

a first lens element having a planar object side surface, a planar image side surface, a thickness of about 0.105 mm, a refractive index of about 1.52, and Abbe number of about 64.2;

a second lens element having an object side surface of a radius of curvature of about −0.331 mm, an image side surface of a radius of curvature of about 0.424 mm, a thickness of about 0.19 mm, a refractive index of about 1.51, and Abbe number of about 56.5;

a third lens element having an object side surface of a radius of curvature of about −0.606 mm, an image side surface of a radius of curvature of about −1.28 mm, a thickness of about 0.249 mm, a refractive index of about 1.54, and Abbe number of about 56;

a fourth lens element having an object side surface of a radius of curvature of about 1.08 mm, an image side surface of a radius of curvature of about 1.64 mm, a thickness of about 0.185 mm, a refractive index of about 1.61, and Abbe number of about 26.9;

a fifth lens element having an object side surface of a radius of curvature of about 0.404 mm, an image side surface of a radius of curvature of about −0.124 mm, a thickness of about 0.303 mm, a refractive index of about 1.54, and Abbe number of about 56;

a sixth lens element having an object side surface of a radius of curvature of about −0.233 mm, an image side surface of a radius of curvature of about −0.107 mm, a thickness of about 0.116 mm, a refractive index of about 1.67, and Abbe number of about 19.5;

a seventh lens element having an object side surface of a radius of curvature of about −0.911 mm, an image side surface of a radius of curvature of about −0.521 mm, a thickness of about 0.115 mm, a refractive index of about 1.61, and Abbe number of about 26.9;

an eighth lens element having an object side surface of a radius of curvature of about −0.0225 mm, an image side surface of a radius of curvature of about −0.868 mm, a thickness of about 0.392 mm, a refractive index of about 1.54, and Abbe number of about 56;

a ninth lens element having an object side surface of a radius of curvature of about 0.535 mm, an image side surface of a radius of curvature of about −0.0777 mm, a thickness of about 0.99 mm, a refractive index of about 1.54, and Abbe number of about 56.2;

a tenth lens element having an object side surface of a radius of curvature of about −0.0129 mm, an image side surface of a radius of curvature of about 0.319 mm, a thickness of about 0.3 mm, a refractive index of about 1.63, and Abbe number of about 23.4;

an eleventh lens element having an object side surface of a radius of curvature of about −0.128 mm, an image side surface of a radius of curvature of about −0.186 mm, a thickness of about 0.49 mm, a refractive index of about 1.63, and Abbe number of about 23.4;

a twelfth lens element having an object side surface of a radius of curvature of about −0.268 mm, an image side surface of a radius of curvature of about −0.579 mm, a thickness of about 0.89 mm, a refractive index of about 1.54, and Abbe number of about 56.2;

a thirteenth lens element having an object side surface of a radius of curvature of about −0.267 mm, an image side surface of a radius of curvature of about 0.298 mm, a thickness of about 0.5 mm, a refractive index of about 1.54, and Abbe number of about 56.2; and a fourteenth lens element having a planar object side surface, a planar image side surface, a thickness of about 0.15 mm, a refractive index of about 1.52, and Abbe number of about 64.1, wherein the optical lens assembly comprises an aperture stop positioned between the eighth lens element and the ninth lens element, wherein the aperture stop is a planar element having a thickness of about 0.5 mm.

16. The optical microscopy device as claimed in claim 1, wherein the optical lens assembly has an optical magnification of about 1×, a numerical aperture of about 0.072, a length of about 8.84 mm, a half field of view of about 38.35 degree, a depth of field of about 117.12 micron, and an airy radius of about 8.84 micron, wherein the optical lens assembly comprises fifteen lens elements having:

a first lens element having a planar object side surface, a planar image side surface, a thickness of about 0.105 mm, a refractive index of about 1.52, and Abbe number of about 64.2;

a second lens element having an object side surface of a radius of curvature of about −0.331 mm, an image side surface of a radius of curvature of about 0.424 mm, a thickness of about 0.19 mm, a refractive index of about 1.51, and Abbe number of about 56.5;

a third lens element having an object side surface of a radius of curvature of about −0.606 mm, an image side surface of a radius of curvature of about −1.28 mm, a thickness of about 0.249 mm, a refractive index of about 1.54, and Abbe number of about 56;

a fourth lens element having an object side surface of a radius of curvature of about 1.08 mm, an image side surface of a radius of curvature of about 1.64 mm, a thickness of about 0.185 mm, a refractive index of about 1.61, and Abbe number of about 26.9;

a fifth lens element having an object side surface of a radius of curvature of about 0.404 mm, an image side surface of a radius of curvature of about −0.124 mm, a thickness of about 0.303 mm, a refractive index of about 1.54, and Abbe number of about 56;

a sixth lens element having an object side surface of a radius of curvature of about −0.233 mm, an image side surface of a radius of curvature of about −0.107 mm, a thickness of about 0.116 mm, a refractive index of about 1.67, and Abbe number of about 19.5;

a seventh lens element having an object side surface of a radius of curvature of about −0.911 mm, an image side surface of a radius of curvature of about −0.521 mm, a thickness of about 0.115 mm, a refractive index of about 1.61, and Abbe number of about 26.9;

an eighth lens element having an object side surface of a radius of curvature of about −0.0225 mm, an image side surface of a radius of curvature of about −0.868 mm, a thickness of about 0.392 mm, a refractive index of about 1.54, and Abbe number of about 56;

a ninth lens element having an object side surface of a radius of curvature of about 0.592 mm, an image side surface of a radius of curvature of about 0.0209 mm, a thickness of about 0.523 mm, a refractive index of about 1.54, and Abbe number of about 55.9;

a tenth lens element having an object side surface of a radius of curvature of about 0.329 mm, an image side surface of a radius of curvature of about 0.593 mm, a thickness of about 0.24 mm, a refractive index of about 1.64, and Abbe number of about 23.3;

an eleventh lens element having an object side surface of a radius of curvature of about 0.126 mm, an image side surface of a radius of curvature of about 0.202 mm, a thickness of about 0.274 mm, a refractive index of about 1.54, and Abbe number of about 55.9;

a twelfth lens element having an object side surface of a radius of curvature of about −0.00487 mm, an image side surface of a radius of curvature of about −0.401 mm, a thickness of about 0.36 mm, a refractive index of about 1.54, and Abbe number of about 55.9;

a thirteenth lens element having an object side surface of a radius of curvature of about −1.22 mm, an image side surface of a radius of curvature of about −0.87 mm, a thickness of about 0.3 mm, a refractive index of about 1.64, and Abbe number of about 23.3;

a fourteenth lens element having an object side surface of a radius of curvature of about 0.436 mm, an image side surface of a radius of curvature of about 0.514 mm, a thickness of about 1.23 mm, a refractive index of about 1.54, and Abbe number of about 55.9; and a fifteenth lens element having a planar object side surface, a planar image side surface, a thickness of about 0.3 mm, a refractive index of about 1.52, and Abbe number of about 64.2, wherein the optical lens assembly comprises an aperture stop positioned between the eighth lens element and the ninth lens element, wherein the aperture stop is a planar element having a thickness of about 0.5.

17. A portable imaging system comprising an optical microscopy device as claimed in claim 1.

18. The portable imaging system as claimed in claim 17, wherein the portable imaging system is one of a smartphone, a portable computing device, a portable medical device, a portable microscopic, and a portable analytical instrument.

\* \* \* \* \*